(12) United States Patent
Imamura et al.

(10) Patent No.: US 9,383,199 B2
(45) Date of Patent: Jul. 5, 2016

(54) IMAGING APPARATUS

(71) Applicant: Panasonic Corporation, Osaka (JP)

(72) Inventors: Norihiro Imamura, Osaka (JP);
Takamasa Ando, Osaka (JP);
Tsuguhiro Korenaga, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 162 days.

(21) Appl. No.: 13/936,232

(22) Filed: Jul. 8, 2013

(65) Prior Publication Data

US 2013/0293704 A1   Nov. 7, 2013

Related U.S. Application Data

(63) Continuation of application No. PCT/JP2012/007667, filed on Nov. 29, 2012.

(30) Foreign Application Priority Data

Nov. 30, 2011   (JP) .................................. 2011-261593
Dec. 15, 2011   (JP) .................................. 2011-274680

(51) Int. Cl.
| | |
|---|---|
| H04N 5/225 | (2006.01) |
| G02B 13/16 | (2006.01) |
| G03B 13/00 | (2006.01) |
| G01C 3/08 | (2006.01) |

(52) U.S. Cl.
CPC .......................................... G01C 3/08 (2013.01)

(58) Field of Classification Search
None
See application file for complete search history.

(56) References Cited

U.S. PATENT DOCUMENTS

| | | | |
|---|---|---|---|
| 5,576,975 A | 11/1996 | Sasaki et al. | |
| 7,242,478 B1 | 7/2007 | Dombrowski et al. | |
| 7,433,042 B1 | 10/2008 | Cavanaugh et al. | |
| 8,345,144 B1 | 1/2013 | Georgiev et al. | |
| 2001/0015763 A1 | 8/2001 | Miwa et al. | |

(Continued)

FOREIGN PATENT DOCUMENTS

| | | |
|---|---|---|
| GB | 2 092 330 A | 8/1982 |
| JP | 3110095 B | 9/2000 |

(Continued)

OTHER PUBLICATIONS

Co-pending U.S. Appl. No. 14/015,142, filed Aug. 30, 2013.

(Continued)

*Primary Examiner* — Lin Ye
*Assistant Examiner* — Euel Cowan
(74) *Attorney, Agent, or Firm* — Renner, Otto, Boisselle & Sklar, LLP

(57) ABSTRACT

An imaging apparatus disclosed in the present application includes a lens optical system, an imaging element and an optical array element. The lens optical system includes first and second areas having different optical characteristics with each other. The imaging element includes first and second pixels each including a filter of a first spectral transmittance characteristic, third pixels including a filter of a second spectral transmittance characteristic, and fourth pixels including a filter of a third spectral transmittance characteristic. The optical array element causes the light passing through the first area to be incident on the first pixels and one of the third and fourth pixels and causes the light passing through the second area to be incident on the second pixels and the other of third and fourth pixels.

21 Claims, 37 Drawing Sheets

(56) References Cited

U.S. PATENT DOCUMENTS

| | | | |
|---|---|---|---|
| 2001/0017649 A1 | 8/2001 | Yaron | |
| 2002/0054208 A1* | 5/2002 | Goldstein | G02B 21/22 348/59 |
| 2006/0209292 A1* | 9/2006 | Dowski et al. | 356/121 |
| 2009/0022396 A1* | 1/2009 | Watanabe | G06K 9/4633 382/167 |
| 2009/0027542 A1 | 1/2009 | Yamamoto et al. | |
| 2010/0118142 A1 | 5/2010 | Ohsawa | |
| 2010/0194921 A1* | 8/2010 | Yoshioka | H04N 5/2254 348/231.99 |
| 2010/0283863 A1 | 11/2010 | Yamamoto | |
| 2010/0283884 A1 | 11/2010 | Hayasaka et al. | |
| 2010/0295973 A1* | 11/2010 | Aubuchon | G02B 13/20 348/241 |
| 2011/0073752 A1 | 3/2011 | Berkner et al. | |
| 2011/0085050 A1* | 4/2011 | Dowski, Jr. | G02B 27/0075 348/222.1 |
| 2012/0033094 A1* | 2/2012 | Ishii | G02B 27/646 348/208.6 |
| 2012/0182438 A1 | 7/2012 | Berkner et al. | |
| 2012/0226480 A1 | 9/2012 | Berkner et al. | |
| 2012/0300041 A1 | 11/2012 | Hamashima | |
| 2013/0120564 A1 | 5/2013 | Imamura | |
| 2013/0222676 A1 | 8/2013 | Ono | |

FOREIGN PATENT DOCUMENTS

| | | |
|---|---|---|
| JP | 2001-227914 A | 8/2001 |
| JP | 2003-523646 T | 8/2003 |
| JP | 2006-184065 A | 7/2006 |
| JP | 2011-182317 A | 9/2009 |
| JP | 2010-039448 A | 2/2010 |
| WO | WO 2012/017577 A1 | 2/2012 |
| WO | WO 2012/066741 A1 | 5/2012 |

OTHER PUBLICATIONS

International Search Report for corresponding International Application No. PCT/JP2012/007667 mailed Jan. 29, 2013.

Xue Tu et al., "Depth and Focused Image Recovery from Defocused Images for Cameras Operating in Macro Mode", Proceedings of the SPIE, Two- and Three-Dimensional Methods for Inspection and Metrology V, vol. 6762, pp. 676203 (2007).

* cited by examiner

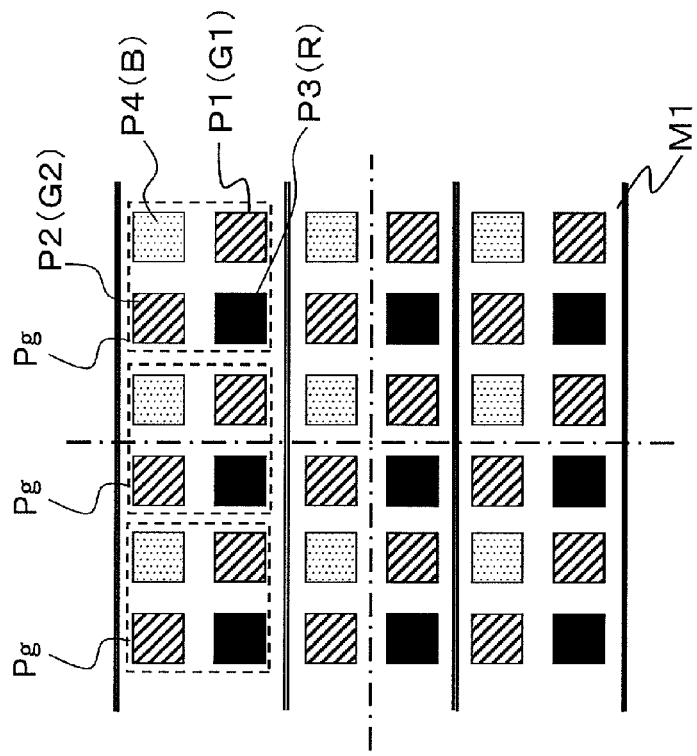
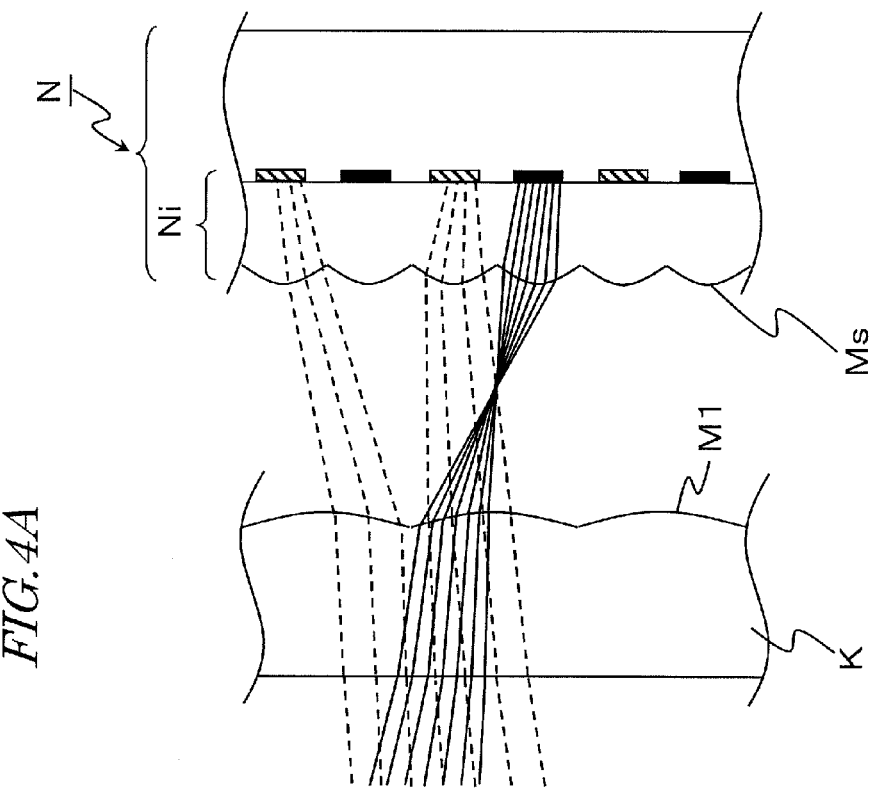

SUBJECT IMAGE

DEPTH MAP

FIG.31  PSF CROSS-SECTION STRENGTH DISTRIBUTION
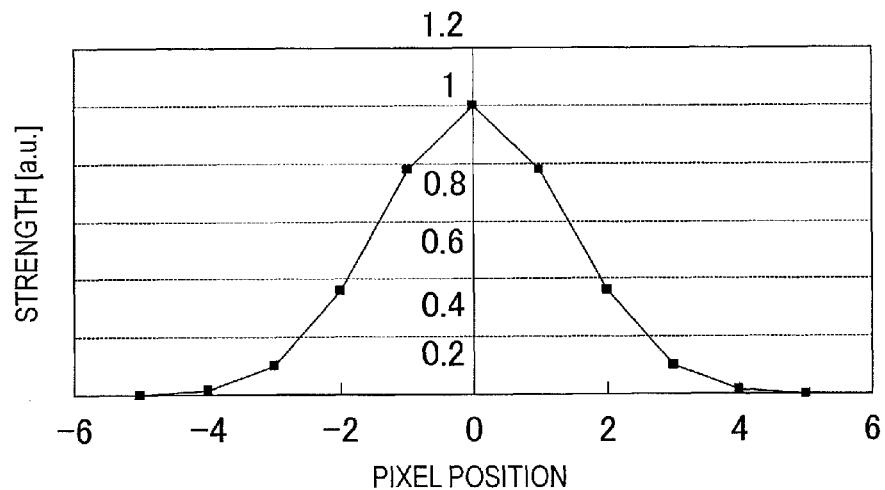
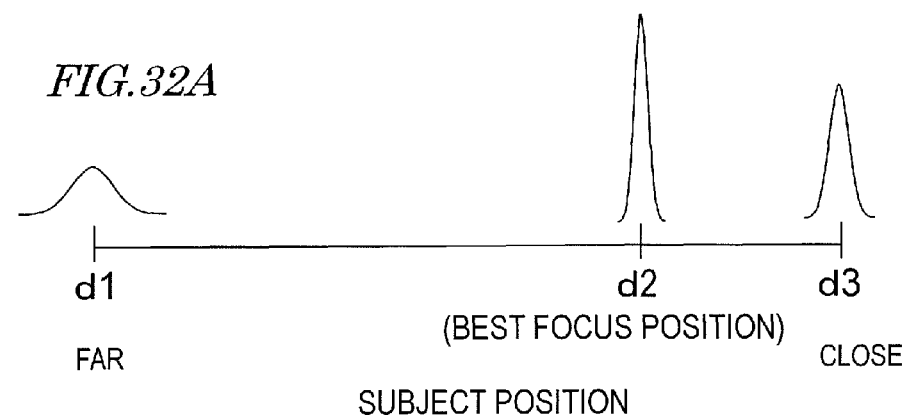
FIG.32A
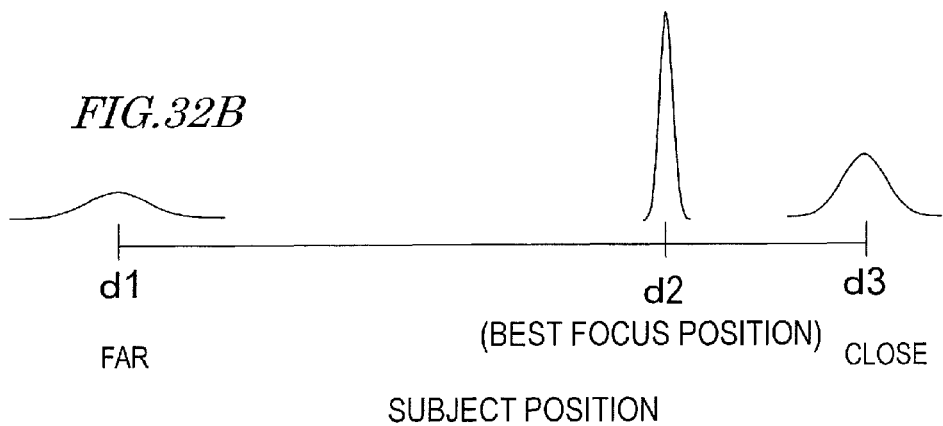
FIG.32B

FIG.33A

| 0.092 | 0.119 | 0.092 |
|---|---|---|
| 0.119 | 0.154 | 0.119 |
| 0.092 | 0.119 | 0.092 |

| 0.012 | 0.026 | 0.034 | 0.026 | 0.012 |
|---|---|---|---|---|
| 0.026 | 0.056 | 0.072 | 0.056 | 0.026 |
| 0.034 | 0.072 | 0.093 | 0.072 | 0.034 |
| 0.026 | 0.056 | 0.072 | 0.056 | 0.026 |
| 0.012 | 0.026 | 0.034 | 0.026 | 0.012 |

| 0.001 | 0.003 | 0.006 | 0.008 | 0.006 | 0.003 | 0.001 |
|---|---|---|---|---|---|---|
| 0.003 | 0.011 | 0.023 | 0.030 | 0.023 | 0.011 | 0.003 |
| 0.006 | 0.023 | 0.050 | 0.064 | 0.050 | 0.023 | 0.006 |
| 0.008 | 0.030 | 0.064 | 0.083 | 0.064 | 0.030 | 0.008 |
| 0.006 | 0.023 | 0.050 | 0.064 | 0.050 | 0.023 | 0.006 |
| 0.003 | 0.011 | 0.023 | 0.030 | 0.023 | 0.011 | 0.003 |
| 0.001 | 0.003 | 0.006 | 0.008 | 0.006 | 0.003 | 0.001 |

7 × 7

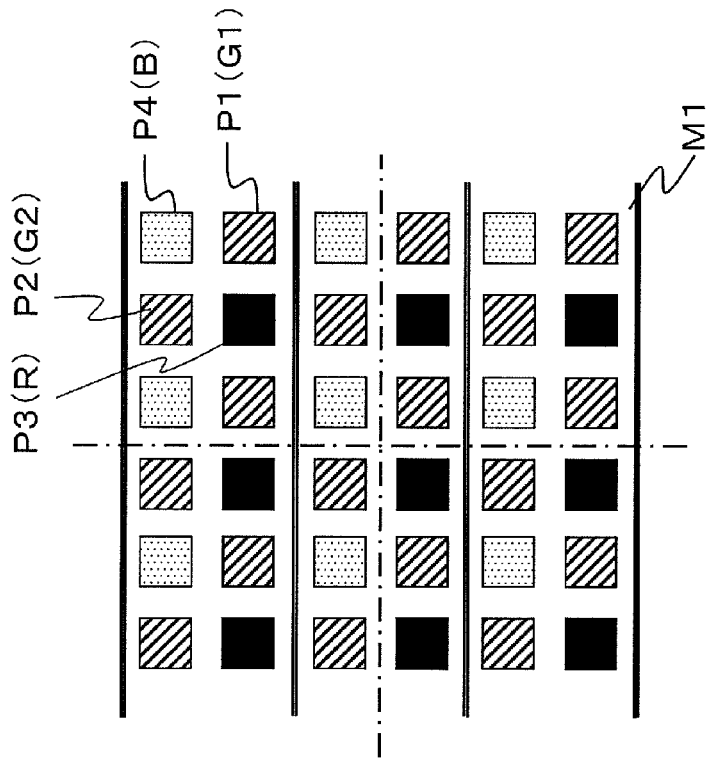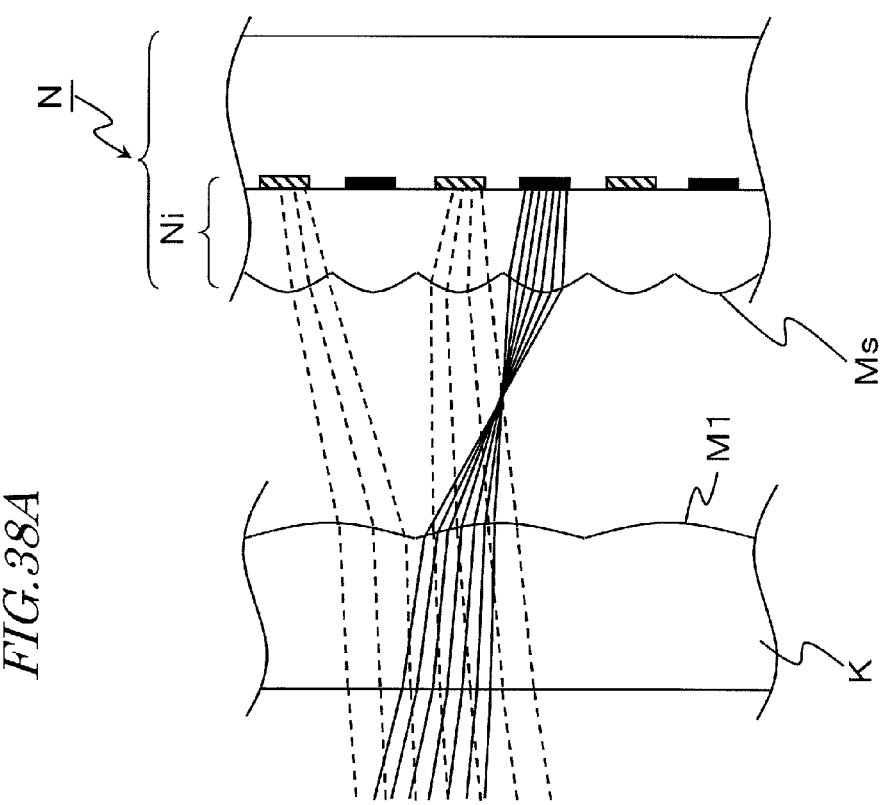

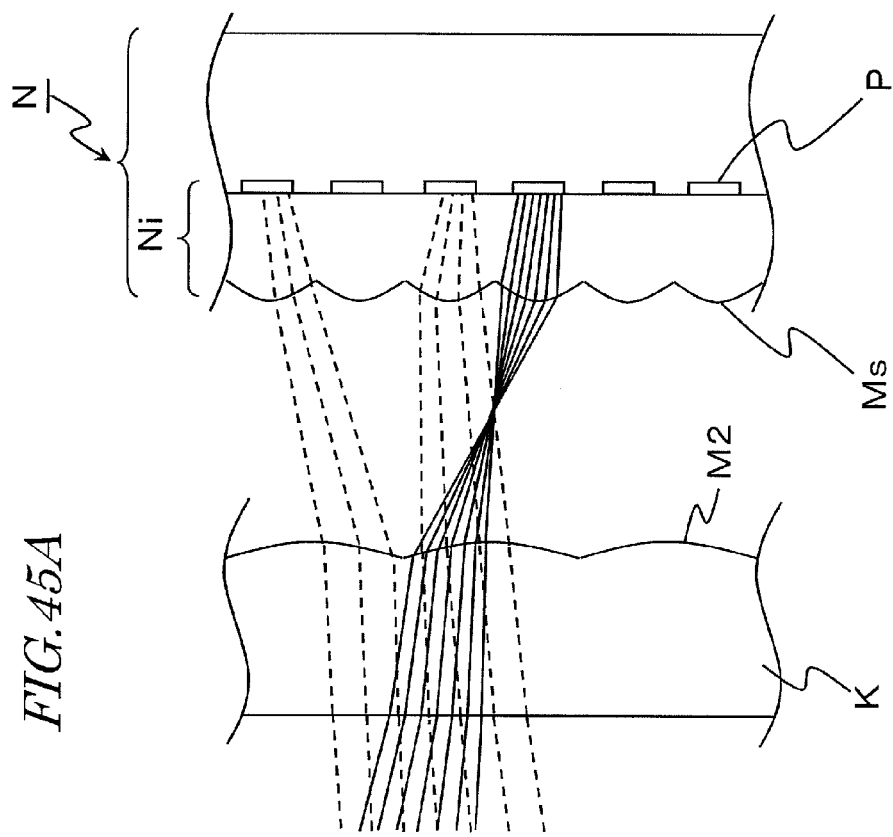
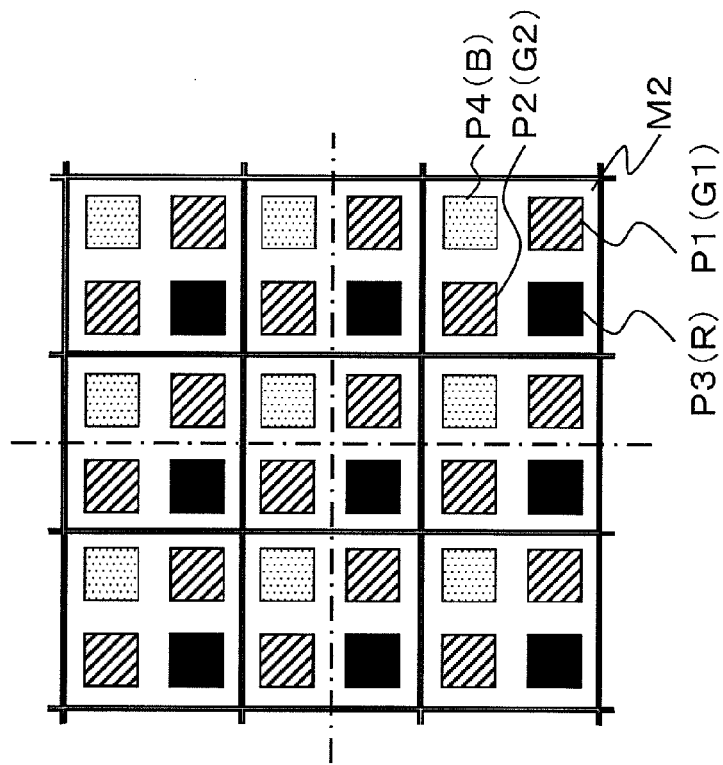
FIG. 45A
FIG. 45B

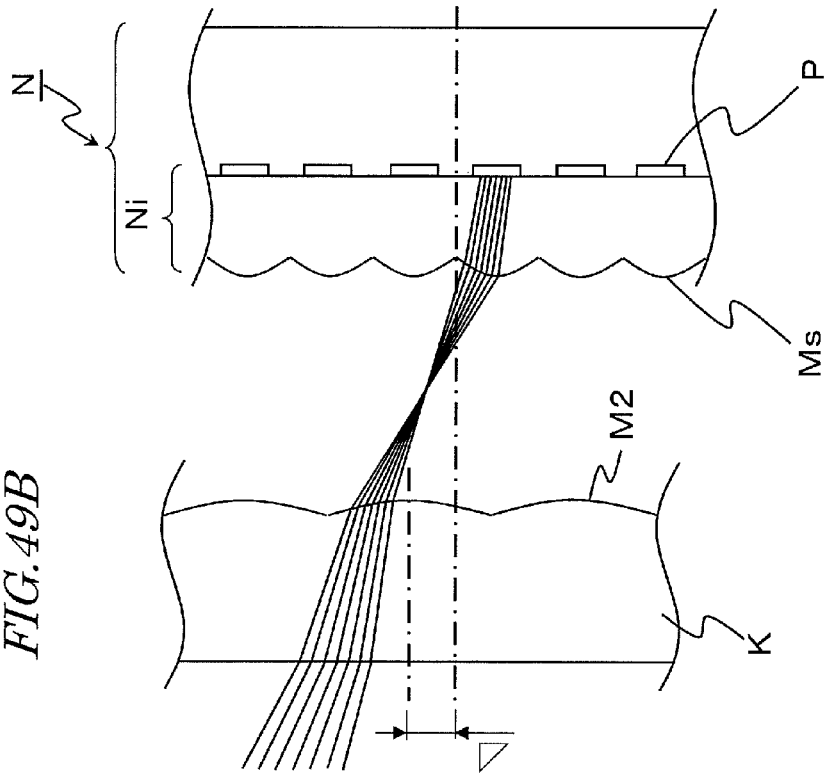
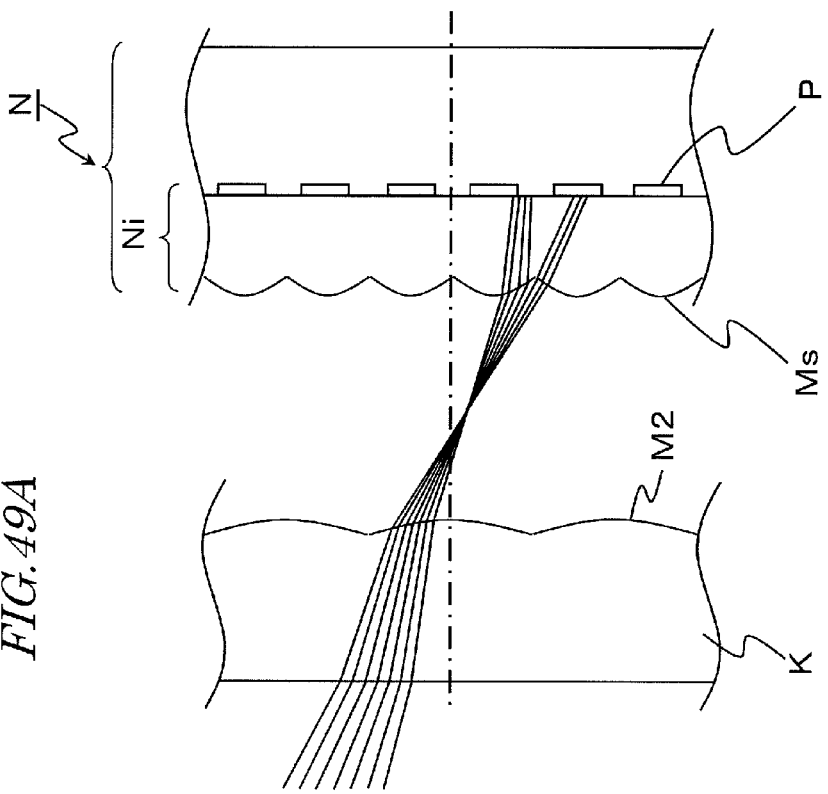
FIG.49A
FIG.49B

FIG.50
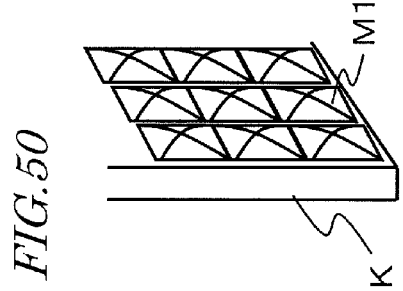
(a1)
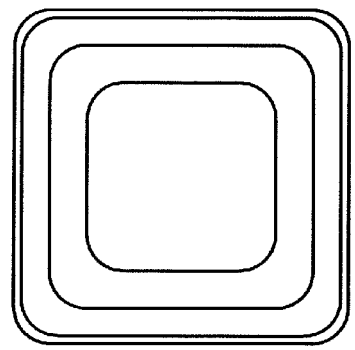
(a2)
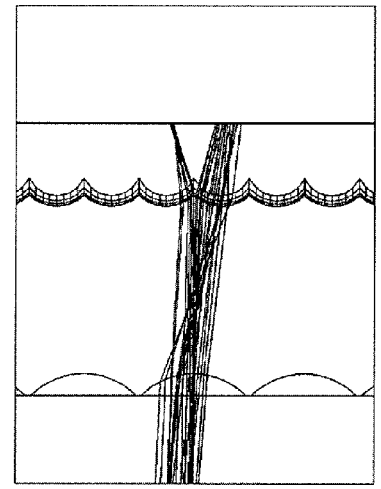
(a3)
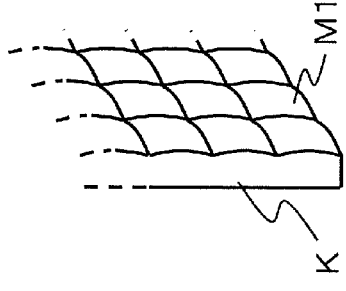
(b1)
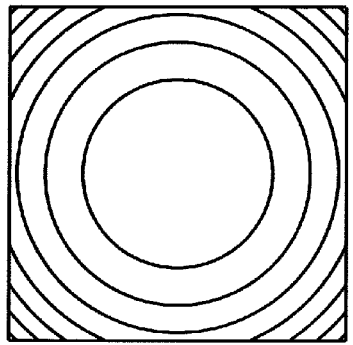
(b2)
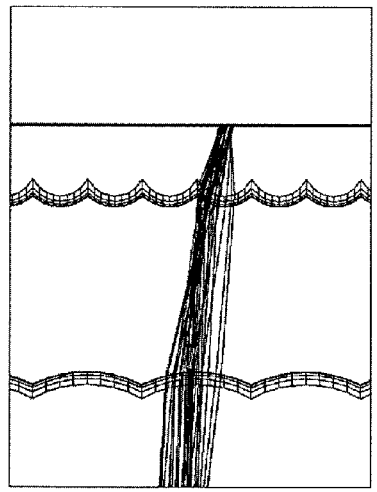
(b3)

IMAGING APPARATUS

This is a continuation of International Application No. PCT/JP2012/007667, with an international filing date of Nov. 29, 2012, which claims priorities of Japanese Patent Application No. 2011-261593, filed on Nov. 30, 2011 and Japanese Patent Application No. 2011-274680, filed on Dec. 15, 2011, the contents of which are hereby incorporated by reference.

BACKGROUND

1. Technical Field

The present application relates to an imaging apparatus such as a camera or the like.

2. Description of the Related Art

Recently, an inter-vehicle distance measurement for an automobile, an automatic focusing system of a camera, and a three-dimensional shape measuring system use a distance measuring device for measuring a distance to a subject (distance measuring target) by use of parallax between a plurality of imaging optical systems.

In such a distance measuring device, a pair of imaging optical systems located in a left-right or up-down positional relationship form images in respective imaging areas, and a distance to the subject is detected based on parallax between the images by triangulation.

As a method for measuring a distance to the subject from a single imaging optical system, a DFD (Depth From Defocus) method is known. DFD is a technique of calculating a distance based on analysis on an amount of blur of an obtained image. However, with a single image, it cannot be distinguished whether the blur is a pattern of the subject itself or the blur occurs because of the subject distance. Therefore, a technique of estimating the distance based on a plurality of images is used as disclosed in Japanese Patent No. 3110095 (herein after, referred to as Patent Document 1) and in Proceedings of the SPIE, Two- and Three-Dimensional Methods for Inspection and Metrology V, Volume 6762, pp. 676203 (2007), entitled "Depth and Focused Image Recovery from Defocused Images for Cameras Operating in Micro Mode" by Xue Tu, Youn-sik Kang and Murali Subbarao.

SUMMARY

However, with the above-described conventional technologies, it is required to, for example, reduce the size of the imaging apparatus, decrease the cost, and improve the distance measuring precision. A non-limiting illustrative embodiment of the present application provides a compact imaging apparatus capable of measuring a distance with high precision.

An imaging apparatus in an embodiment of the present invention includes a lens optical system including a first area and a second area, the second area having an optical characteristic which provides a focusing characteristic different from the focusing characteristic by light rays which have passed the first area; an imaging element including a plurality of first pixels and a plurality of second pixels on which light which has passed the lens optical system is incident and which includes a filter having a first spectral transmittance characteristic, a plurality of third pixels on which light which has passed the lens optical system is incident and which include a filter having a second spectral transmittance characteristic, and a plurality of fourth pixels on which light which has passed the lens optical system is incident and which include a filter having a third spectral transmittance characteristic; and an optical array element located between the lens optical system and the imaging element, the optical array element causing the light which has passed the first area to be incident on the plurality of first pixels and causing the light which has passed the second area to be incident on the plurality of second pixels. The optical array element causes the light which has passed one of the first area and the second area to be incident on the plurality of third pixels, and causes the light which has passed one of the first area and the second area to be incident on the plurality of fourth pixels.

According to a imaging apparatus in an embodiment of the present invention, distance measurement can be made with high precision by use of a single imaging system.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF DRAWINGS

FIG. 4A is an enlarged view of the optical array element K and an imaging element N shown in FIG. 1; and FIG. 4B shows the positional relationship between the optical array element K and the pixels of the imaging element N.

FIG. 31 shows a distribution of the PSF (point spread function) cross-section strength represented by the Gaussian distribution in Embodiment 5 according to the present invention.

FIGS. 32A and 32B show the relationship between the subject position and the PSF in Embodiment 5 according to the present invention.

FIGS. 33A through 33C show PSF two-dimensional data in Embodiment 5 according to the present invention.

FIG. 38A is an enlarged view of the optical array element K and an imaging element N shown in FIG. 37; and FIG. 38B shows the positional relationship between the optical array element K and the pixels of the imaging element N.

FIG. 45A is an enlarged view of the optical array element K and an imaging element N in Embodiment 8 according to the present invention; and FIG. 45B shows the positional relationship between the optical array element K and the pixels of the imaging element N.

FIG. 49A is an enlarged view of an imaging plane and the vicinity thereof when crosstalk is caused in an embodiment according to the present invention; and FIG. 49B is an enlarged view of the imaging plane and the vicinity thereof when the crosstalk is alleviated.

FIG. 50($a1$) is an isometric view of a microlens array having a rotationally asymmetric shape with respect to an optical axis thereof; FIG. 50($a2$) shows a contour line of the microlens array shown in FIG. 50($a1$); FIG. 50($a3$) shows the results of light ray tracing simulation when the microlenses shown in FIG. 50($a2$) are applied to an optical array element according to the present invention; FIG. 50($b1$) is an isometric view of a microlens array having a rotationally symmetric shape with respect to an optical axis thereof; FIG. 50(b2) shows a contour line of the microlens array shown in FIG. 50(b1); and FIG. 50(b3) shows the results of light ray tracing simulation when the microlenses shown in FIG. 50(b2) are applied to an optical array element in an embodiment according to the present invention.

DESCRIPTION OF EMBODIMENTS

Figure 1:
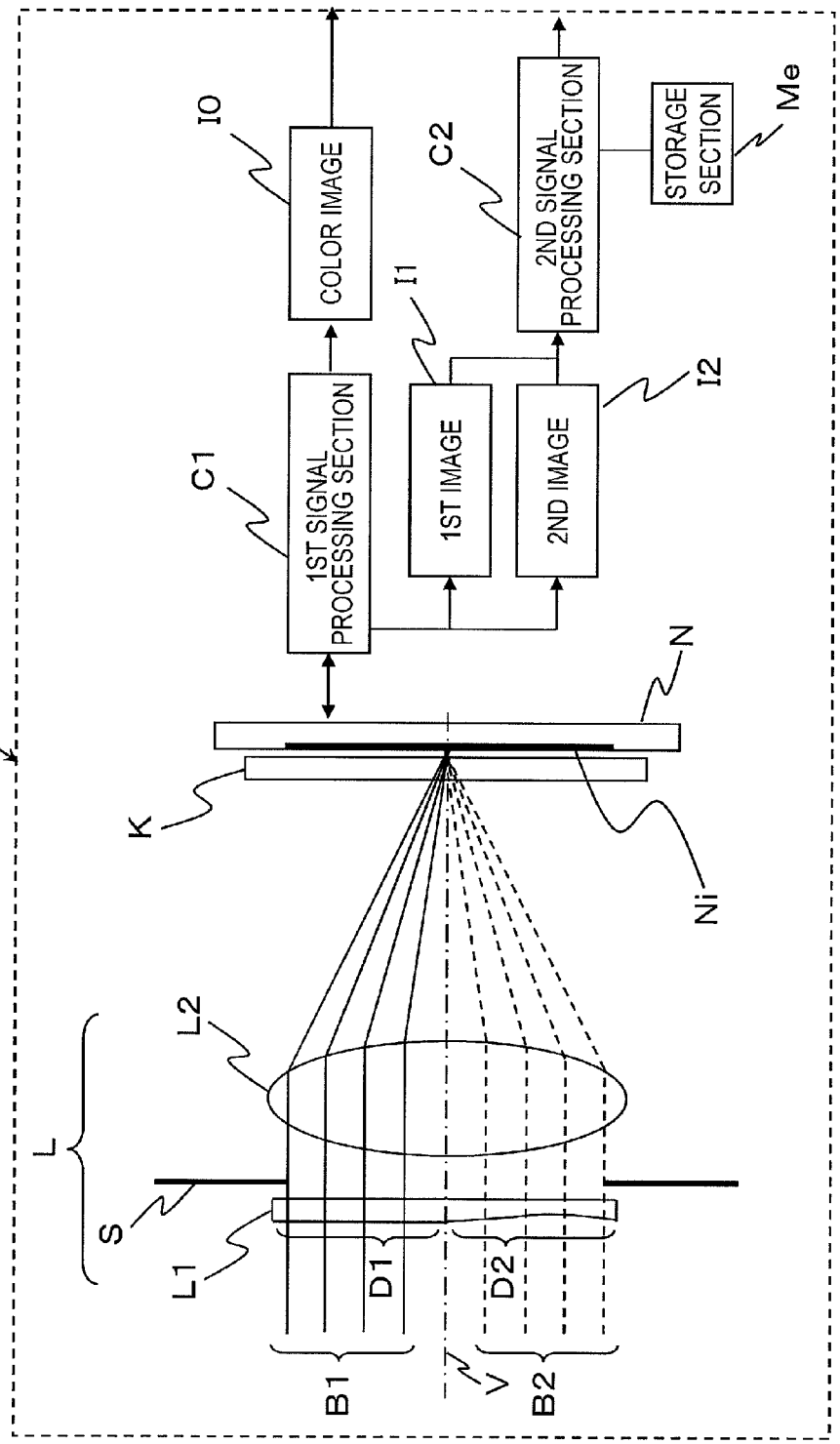
FIG. 1 is a schematic view showing an imaging apparatus A in Embodiment 1 according to the present invention.

According to the studies made for the present invention, a conventional imaging apparatus using a plurality of imaging optical systems has a large size and costs high. In addition, since such an imaging apparatus is difficult to produce because the characteristics of the plurality imaging optical systems need to be matched and also the optical axes of the two imaging optical systems need to be parallel to each other with high precision. Furthermore, the production of such an imaging apparatus is considered to require many steps because a calibration step for finding camera parameters is needed.

The DFD method disclosed in Patent Document 1 and Non-patent Document 1 can allow the distance to a subject to be calculated by one imaging optical system. However, with the method as described in Patent Document 1 and Non-patent Document 1, the distance to the subject at which the subject is focused (focus distance) needs to be changed so that a plurality of images are obtained in a time division manner. When such a technique is applied to a moving image, images are shifted due to the image capture time difference. This causes a problem that the distance measuring precision is decreased.

Patent Document 1 discloses an imaging apparatus in which an optical path is divided by a prism and image capture is performed by two imaging planes having different backfocuses, so that the distance to the subject can be measured by a single image capture. However, such a method needs two imaging planes, which causes a problem that the imaging apparatus is enlarged and the cost is significantly raised.

In light of such problems, the present inventors conceived a novel imaging apparatus. An embodiment of the present invention is as follows.

An imaging apparatus in an embodiment of the present invention includes a lens optical system including a first area and a second area, the second area having an optical characteristic which provides a focusing characteristic different from the focusing characteristic by light rays which have passed the first area; an imaging element including a plurality of first pixels and a plurality of second pixels on which light which has passed the lens optical system is incident and which includes a filter having a first spectral transmittance characteristic, a plurality of third pixels on which light which has passed the lens optical system is incident and which include a filter having a second spectral transmittance characteristic, and a plurality of fourth pixels on which light which has passed the lens optical system is incident and which include a filter having a third spectral transmittance characteristic; and an optical array element located between the lens optical system and the imaging element, the optical array element causing the light which has passed the first area to be incident on the plurality of first pixels and causing the light which has passed the second area to be incident on the plurality of second pixels. The optical array element causes the light which has passed one of the first area and the second area to be incident on the plurality of third pixels, and causes the light which has passed one of the first area and the second area to be incident on the plurality of fourth pixels.

The optical array element may cause only the light which has passed one of the first area and the second area to be incident on the plurality of third pixels, and cause only the light which has passed one of the first area and the second area to be incident on the plurality of fourth pixels.

The optical array element may be a lenticular lens; and the optical array element may cause the light which has passed one of the first area and the second area to be incident on the plurality of third pixels, and cause the light which has passed the other of the first area and the second area to be incident on the plurality of fourth pixels.

The optical array element may be a microlens array; and the optical array element may cause the light which has passed one of the first area and the second area to be incident on the plurality of third pixels and the plurality of fourth pixels.

An imaging apparatus in another embodiment of the present invention includes a lens optical system including a first area and a second area, the second area having an optical characteristic which provides a focusing characteristic different from the focusing characteristic by light rays which have passed the first area; an imaging element including a plurality of first pixels and a plurality of second pixels on which light which has passed the lens optical system is incident and which includes a filter having a first spectral transmittance characteristic, a plurality of third pixels on which light which has passed the lens optical system is incident and which include a filter having a second spectral transmittance characteristic, and a plurality of fourth pixels on which the light which has passed the lens optical system is incident and which include a filter having a third spectral transmittance characteristic; and an optical array element located between the lens optical system and the imaging element, the optical array element causing the light which has passed the first area to be incident on the first pixel and causing the light which has passed the second area to be incident on the second pixel. In a pixel group including one of the plurality of first pixels, one of the plurality of second pixels, one of the plurality of third pixels and one of the plurality of fourth pixels which are arrayed in two rows by two columns, the first pixel and the second pixel are respectively located at positions of (1,1) and (2,2) or (2,2) and (1,1) or are respectively located at positions of (1,2) and (2,1) or (2,1) and (1,2).

In the imaging apparatus, light rays may be incident on the first area and the second area in a single image capture.

The filter having the first spectral transmittance characteristic may transmit light rays in a green range, the filter having the second spectral transmittance characteristic may transmit light rays in a blue range, and the filter having the third spectral transmittance characteristic may transmit light rays in a red range.

When a subject distance is within a prescribed range, a point spread function formed by the light incident on the first area may be approximately constant, and a point spread function formed by the light incident on the second area may vary in accordance with the subject distance.

A surface of the first area and a surface of the second area may have different radii of curvature from each other.

The first area and the second area may be separated from each other along a border having an optical axis of the lens optical system as a center thereof.

The plurality of first, second, third and fourth pixels may respectively generate first through fourth luminance information by a single image capture; and the imaging apparatus may further include a first signal processing section for generating a color image by use of the first through fourth luminance information.

The first signal processing section may include a sharpness detection section for detecting a sharpness of the luminance information of at least one pixel component among the luminance information of the plurality of first through fourth pixels for each of prescribed areas in the color image; and based on the pixel component having a highest sharpness among the pixel components, the first signal processing section may sharpen a luminance information component of the other pixels.

The first signal processing section may perform a recovery process on an image formed by luminance information of the pixel reached by the light incident on the first area, by use of a pre-stored point spread function, to generate a recovered sharpened image.

The first signal processing section may perform a recovery process on an entire area of the image formed by the luminance information of the pixel reached by the light incident on the first area, by use of a single unit of the point spread function, to generate a recovered sharpened image.

The first signal processing section may include a sharpness detection section for detecting a sharpness for each of the prescribed areas in the recovered sharpened image; and based on the sharpness of each of the prescribed areas in the recovered sharpened image, the first signal processing section may sharpen a luminance information of the other pixel components.

The imaging apparatus may further include a second signal processing section for calculating the subject distance. The first signal processing section may generate a first image obtained by the plurality of first pixels and a second image obtained by the plurality of second pixels; and the second signal processing section may calculate the subject distance by use of the first image and the second image.

When the subject distance is within a prescribed range, a ratio between a sharpness of the first image and a sharpness of the second image may have a correlation with the subject distance; and the second signal processing section may calculate the subject distance based on the correlation and the ratio between the sharpness of the first image and the sharpness of the second image.

The first signal processing section may include a contrast detection section for detecting a contrast of the first image obtained by the plurality of first pixels and a contrast of the second image obtained by the plurality of second pixels; when the subject distance is within a prescribed range, a ratio between the contrast of the first image and the contrast of the second image may have a correlation with the subject distance; and the second signal processing section may calculate the subject distance based on the correlation and the ratio between the contrast of the first image and the contrast of the second image.

The second signal processing section may calculate the subject distance based on luminance information of an image obtained by adding the first image and the second image and luminance information of the first image or the second image.

When the subject distance is within a prescribed range, a point spread function derived from the recovered sharpened image and an image formed by the light incident on the second area may have a correlation with the subject distance; and the second signal processing section may calculate the subject distance based on the correlation and the point spread function.

The lens optical system may be an image-side telecentric optical system.

The lens optical system may be an image-side non-telecentric optical system; and the optical array element may be located as being offset with respect to the pixels of the imaging element outside the optical axis of the lens optical system.

The optical array element may be a lenticular lens or a microlens array.

The optical array element may be a microlens array; and the second area may include three areas of a 2A area, a 2B area and a 2C area, and the microlens array may cause the light rays which have passed the first area to be incident on the plurality of first pixels, cause the light rays which have passed the 2A area to be incident on the plurality of second pixels, cause the light rays which have passed the 2B area to be incident on the plurality of third pixels, and cause the light rays which have passed the 2C area to be incident on the plurality of fourth pixels.

The 2A area, the 2B area and the 2C area may have different levels of optical power from one another; and focus positions of light in wavelength ranges corresponding to light transmission ranges of the filters provided in the plurality of second pixels, the plurality of third pixels and the plurality of fourth pixels are closer to one another than in the case where the 2A area, the 2B area and the 2C area may have the same level of optical power as one another.

The optical array element may be a microlens array; the microlens array may include a plurality of optical elements; and the plurality of optical elements may each have a rotationally symmetric shape with respect to an optical axis thereof.

The optical array element may be formed on the imaging element.

The imaging apparatus may further include microlenses provided between the optical array element and the imaging element. The optical array element may be formed on the imaging element with the microlenses being provided therebetween.

The imaging apparatus may further include a light blocking member provided at a border between the first area and the second area.

The lens optical system may further include a stop; and the first area and the second area may be located in the vicinity of the stop.

In a pixel group including one of the plurality of first pixels, one of the plurality of second pixels, one of the plurality of third pixels and one of the plurality of fourth pixels which are arrayed in two rows by two columns, the first pixel and the second pixel may be adjacent to each other in any one of an up-down direction, a left-right direction and an oblique direction on an imaging plane of the imaging element.

The second signal processing section may calculate the subject distance for each of the prescribed areas of the color image; and the imaging apparatus may further include a third signal processing section for generating a refocused image by use of the subject distance of each of the prescribed areas calculated by the second signal processing section The second signal processing section may use the subject distance of each of the prescribed areas to generate a point spread function of each of the subject distances.

The strength change of the point spread function may be decreased more at a position farther in a subject distance direction from at least one best focus position, which is the subject distance at which a strength change of the point spread function is maximum.

The at least one best focus position may be input from outside the imaging apparatus or is determined by the second signal processing section.

The third signal processing section may generate the focused image by use of the subject distance of each of the prescribed areas and the point spread function.

The point spread function may be a Gaussian function.

The third signal processing section may generate the refocused image by performing a convolution operation of the point spread function by use of Fourier transform for each of the prescribed areas.

The third signal processing section may generate the refocused image by performing a spatial filtering process based on the subject distance of each of the prescribed areas.

The at least one best focus position may include a plurality of best focus positions present discretely.

An imaging system in still another embodiment of the present invention includes any one of above-described imaging apparatuses; and a first signal processing device for generating a color image. The first signal processing device generates the color image by use of luminance information of the plurality of first pixels, the plurality of second pixels, the plurality of third pixels and the plurality of fourth pixels obtained by the single image capture.

The imaging system may further include a second signal processing device for calculating a subject distance. The second processing device may calculate the subject distance by use of luminance information of the plurality of first pixels and the plurality of second pixels obtained by the single image capture.

An imaging system in still another embodiment of the present invention includes an imaging apparatus and a signal processing device, The imaging apparatus includes a lens optical system including a first area and a second area, the second area having an optical characteristic which provides a focusing characteristic different from the focusing characteristic by light rays which have passed the first area; an imaging element including at least a plurality of first pixels and a plurality of second pixels on which light which has passed the lens optical system is incident; and an optical array element located between the lens optical system and the imaging element, the optical array element causing the light which has passed the first area to be incident on the plurality of first pixels and causing the light which has passed the second area to be incident on the plurality of second pixels. The signal processing device includes a first signal processing section for calculating a subject distance for each of prescribed areas of a picked-up image by use of luminance information of the first image obtained by the plurality of first pixels and the second image obtained by the plurality of second pixels; and a second signal processing section for generating a refocused image by use of the subject distance of each of the prescribed areas calculated by the first signal processing section.

According to the imaging apparatus and the imaging system in the above-described embodiments, luminance information for outputting an color image and measuring the subject distance can be obtained by a single image capture performed by use of a single optical system. Therefore, it is not necessary to match the characteristics or the positions of a plurality of imaging optical systems unlike in the case where an imaging apparatus including the plurality of imaging optical systems is used. Even if the position of the subject is changed due to elapse of time during image capture of a moving image, the distance to the subject can be accurately measured. In addition, any subject position can be focused on arbitrarily. For example, an image can be obtained in which a main person or object appears sharp and only the background is blurred, namely, a sharp area and a blurred area are clearly distinguished from each other.

Hereinafter, embodiments of an imaging apparatus according to the present invention will be described with reference to the drawings.

Embodiment 1

FIG. 1 is a schematic view showing an imaging apparatus A in Embodiment 1. The imaging apparatus A in Embodiment 1 includes a lens optical system L having an optical axis V, an optical array element K located in the vicinity of the focal point of the lens optical system L, an imaging element N, a first signal processing section C1, a second signal processing section C2, and a storage section Me.

The lens optical system L includes an optical element L1 on which light beams B1 and B2 from a subject (not shown) are incident, a stop S on which the light which has passed the optical element L1 is incident, and a lens L2 on which the light which has passed the stop S is incident. The optical element L1 includes an optical area D1 and an optical area D2 having an optical characteristic which provides a focusing characteristic different from the focusing characteristic by light rays which have passed the optical area D1. The optical element L1 may be located in the vicinity of the stop S.

Figure 2:
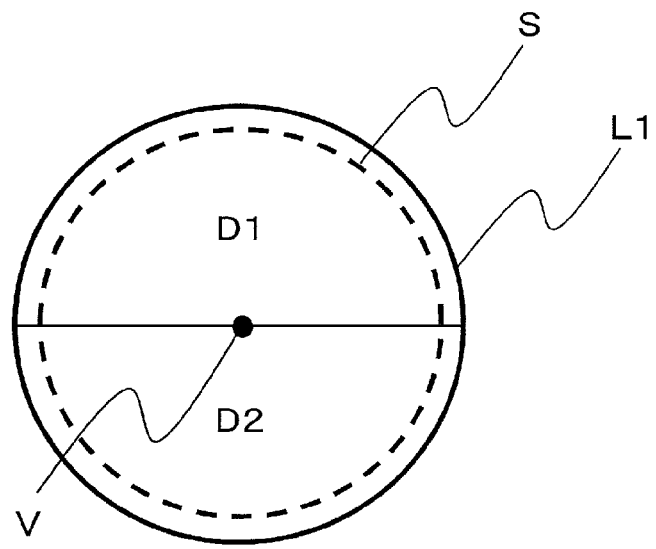
FIG. 2 is a front view of an optical element L1 in Embodiment 1 according to the present invention as seen from the side of a subject.

FIG. 2 is a front view of the optical element L1 as seen from the side of a subject. The optical areas D1 and D2 of the optical element L1 are obtained by dividing a plane vertical to the optical axis V into two, namely, an upper area and a lower area along a border having the optical axis V as the center thereof. In FIG. 2, dashed line S represents the position of the stop S. In FIG. 1, the light beam B1 passes the optical area D1 on the optical element L1, and the light beam B2 passes the optical area D2 on the optical element L1. The light beams B1 and B2 pass the optical element L1, the stop S, the lens L2 and the optical array element K in this order and then reach an imaging plane Ni on the imaging apparatus N (shown in FIG. 4, etc.).

Figure 3:
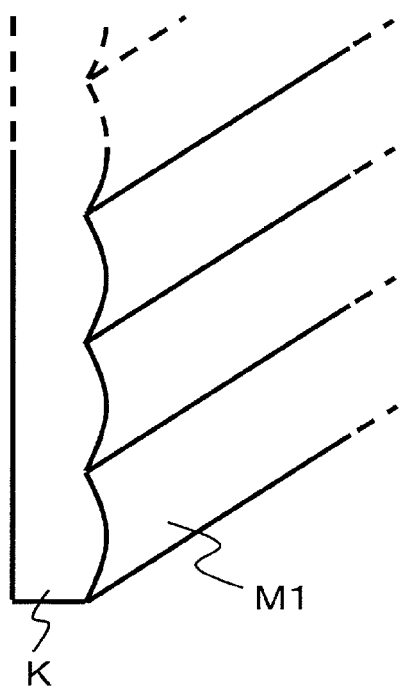
FIG. 3 is an isometric view of an optical array element K in Embodiment 1 according to the present invention.

FIG. 3 is an isometric view of the optical array element K. At a face of the optical array element K on the side of the imaging element N, a plurality of lengthy optical components M1 extending in a lateral direction are arrayed in a longitudinal direction in a plane vertical to the optical axis V. A cross-section of each optical component M1 (cross-section in the longitudinal direction) has an arced shape protruding toward the imaging element N. As can be seen, the optical array element K has a structure of a lenticular lens.

As shown in FIG. 1, the optical array element K is located in the vicinity of the focal point of the lens optical system L, and at a position distanced from an imaging plane Ni by a prescribed distance. In actuality, the optical characteristics of the optical element L1 influence the focusing characteristic of the entire lens optical system L1, but the position of the optical array element K may be determined based on, for example, the focal point of the lens L2.

In this embodiment, the expression "the focusing characteristics are different" means that when comparison is made with light of a prescribed wavelength, at least one of the characteristics contributing to the collection of light in the optical system is different. Specifically, the expression means that when comparison is made with light of a prescribed wavelength, the focal distance of the lens optical system L by the light which has passed the optical areas D1 and D2, the distance to the subject on which the light is focused, the range of distance at which the sharpness is at least a certain value, or the like is different between the light which has passed the optical area D1 and the light which has passed the optical area D2. By adjusting the radius of curvature, the aspheric coefficient or the refractive index of the optical areas D1 and D2, the focusing characteristic of the lens optical system L can be made different.

In this embodiment, light which has passed the two optical areas D1 and D2 in a single image capture passes the lens L2 and then is incident on the optical array element K. The optical array element K causes the light which has, passed the optical area D1 to be incident on pixels P1 and P3 (shown in FIG. 4, etc.) of the image capture N and causes the light which has passed the optical area D2 to be incident on pixels P2 and P4.

FIG. 4A is an enlarged view of the optical array element K and the imaging element N shown in FIG. 1. FIG. 4B shows the positional relationship between the optical array element K and the pixels of the imaging element N. The optical array element K is located such that a face thereof at which the optical components M1 are formed is directed toward the imaging plane Ni.

As shown in FIG. 4B, the pixels P are arrayed in rows and columns on the imaging plane Ni. The pixels P may be classified into pixels P1, P2, P3 and P4.

The pixels P1 and P2 include a filter having a first spectral transmittance characteristic. This filter mainly passes light rays in a green range and absorbs light rays of the other ranges. The pixels P3 include a filter having a second spectral transmittance characteristic. This filter mainly passes light rays in a red range and absorbs light rays of the other ranges. The pixels P4 include a filter having a third spectral transmittance characteristic. This filter mainly passes light rays in a blue range and absorbs light rays of the other ranges.

For the sake of explanation, a group of pixels P1, P2, P3 and P4 arrayed in two rows by two columns are collectively referred to as a "pixel group Pg". In one pixel group Pg, where the position of the pixel P2 is (1,1), the pixel P1 is located at a position (2,2), the pixel P3 is located at a position (2,1), and the pixel P4 is located at a position (1,2). Namely, the pixels P1 and the pixels P3 are located alternately in the same rows. The pixels P2 and the pixels P4 are located alternately in the same rows. The rows of pixels P1 and the pixels P3 and the rows of pixels P2 and the pixels P4 are located alternately in the longitudinal direction (column direction). In this manner, the plurality of pixels P1, P2, P3 and P4 are in a Bayer array. In the case where the pixels P1, P2, P3 and P4 are in the Bayer array, the pixels P1 and P2, which include a filter for transmitting light of a green range, are located obliquely in a plane of the imaging plane Ni. The positions of the pixels P3 and P4 may be opposite to each other.

The optical array element K is located such that one of the optical components M1 corresponds to two rows of the pixels including one row of the pixels P1 and P3 and one row of the pixels P2 and P4 on the imaging plane Ni. On the imaging plane Ni, microlenses Ms are provided so as to cover surfaces of the pixels P1, P2, P3 and P4.

The optical array element K is designed such that the light beam B1 (light beam B1 represented with the solid line in FIG. 1) which has passed the optical area D1 (shown in FIG. 1 and FIG. 2) on the optical element L1 (mostly) reaches the pixels P1 and P3 on the imaging plane Ni and such that the light beam (light beam B2 represented with the dashed line in FIG. 1) which has passed the optical area D2 (mostly) reaches the pixels P2 and P4 on the imaging plane Ni. Specifically, the above-described structure is realized by appropriately setting parameters such as the refractive index of the optical array element K, the distance from the imaging plane Ni, the radius of curvature of the surface of the optical elements M1 and the like.

Each of the filters used for the pixels P1 through P4 is, for example, an absorption-type filter formed of an organic material or a reflection-type filter formed of a dielectric multilayer film. The filters respectively having the first spectral transmittance characteristic, the second spectral transmittance characteristic, and the third spectral transmittance characteristic mainly transmit light rays of different wavelength ranges from one another. However, the wavelength ranges of light transmitted by these filters may partially overlap. The filters may transmit light of complementary colors (cyan, magenta, yellow) instead of light of the RGB primary colors.

The stop S is an area which passes light beams of all the angles of view. Therefore, by inserting a face, having an optical characteristic for controlling the focusing characteristic, in the vicinity of the stop S, the focusing characteristics of the light beams of all the angles of view can be controlled in substantially the same manner. Namely, in this embodiment, the optical element L1 may be provided in the vicinity of the stop S. By locating the optical areas D1 and D2 for providing different focusing characteristics of the optical system L from each other in the vicinity of the stop S, the light beams can be provided with the focusing characteristics suitable to the number of divided optical areas.

In FIG. 1, the optical element L1 is provided at such a position that light which has passed the optical element L1 is incident on the stop S directly (without passing any other optical member). The optical element L1 may be provided on the side of the imaging element N with respect to the stop S. In this case, the optical element L1 may be provided between the stop S and the lens L2 so that the light which has passed the stop S can be incident on the optical element L1 directly (without passing any other optical member).

The optical array element K has a function of distributing the outgoing direction in accordance with the angle of incidence of the light rays. Therefore, the optical array element K can distribute the light beams toward the pixels on the imaging plane Ni so as to correspond to the optical areas D1 and D2 separated from each other in the vicinity of the stop S.

The first signal processing section C1 (shown in FIG. 1) generates a color image by use of a plurality of pieces of luminance information obtained by the pixels P1, P2, P3 and P4 in a single image capture. Hereinafter, a specific method for generating a color image will be described.

In the optical system of the imaging apparatus A shown in FIG. 1, the optical area D1 has a planar face, and the optical area D2 has an aspheric shape. For simplifying the explanation, the following description will be given with an assumption that the lens L2 is an ideal lens with no aberration.

Figure 5:
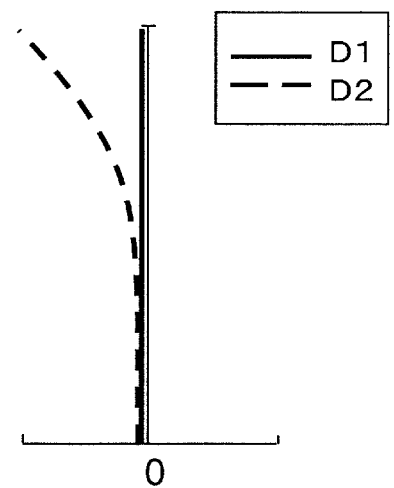
FIG. 5 is a graph showing spherical aberrations by light rays which have passed an optical area D1 and an optical area D2 in Embodiment 1 according to the present invention.

Since the optical area D1 has a planar face, the light rays which have passed the optical area D1 and the lens L2 do not cause a spherical aberration as is shown with the solid line in the graph of FIG. 5. When there is no spherical aberration, a point spread function changes more in a direction shifted from the focal point. Namely, the point spread function changes in accordance with the change of the subject distance.

Owing to the aspheric shape of the optical area D2, the light rays which have passed the optical area D2 and the lens L2 cause a spherical aberration represented with the dashed line in the graph of FIG. 5. By adjusting the aspheric shape of the optical area D2, such a spherical aberration can be provided. Owing to such a spherical aberration, the point spread function by the light rays which have passed the optical area D2 can be made approximately constant in a prescribed range in the vicinity of the focal point of the lens optical system L. Namely, the point spread function can be made approximately constant in a prescribed range of subject distance.

Figure 6:
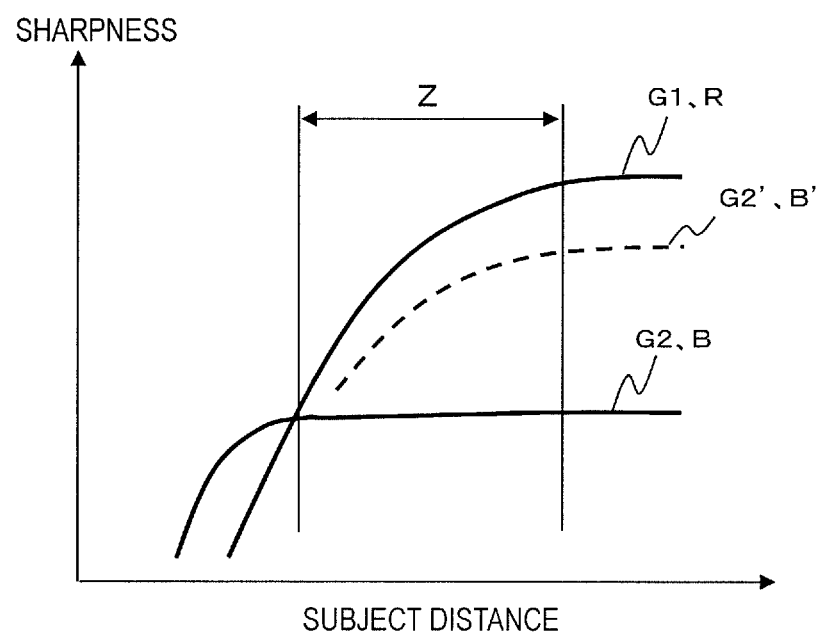
FIG. 6 is a graph showing the relationship between the subject distance and the sharpness (sharpness of the image) in Embodiment 1 according to the present invention.

As the point spread function changes, the sharpness also changes. As the size of the point image is decreased, the sharpness of the image is raised. Therefore, the relationship between the subject distance and the sharpness is as shown in the graph of FIG. 6. In the graph of FIG. 6, G1 and R each represent the sharpness in a prescribed area of an image generated by each of the pixels P1 (green component) and the pixels P3 (red component). G2 and B each represent the sharpness in a prescribed area of an image generated by each of the pixels P2 (green component) and the pixels P4 (blue component).

The sharpness can be found based on the difference between luminance values of pixels adjacent to each other in a prescribed size of image block. Alternatively, the sharpness can be found based a frequency spectrum obtained by Fourier transform performed on the luminance distribution of a prescribed size of image block.

For finding the sharpness of each component of the pixels P1, P2, P3 and P4 based on the difference between luminance values of adjacent pixels, expression 1, for example, is used. E is the sharpness of a prescribed size of block.

$$E = \sum_i \sum_j \sqrt{(\Delta x_{i,j})^2 + (\Delta y_{i,j})^2}$$ [Expression 1]

As described above, the pixels P1, P2, P3 and P4 are in the Bayer array. Therefore, in order to find the sharpness of each component, image information of every other pixel is extracted in both of x and y directions of the image for calculation.

In expression 1, $\Delta x_{i,j}$ is the difference between the luminance value of the pixel at the coordinates (i,j) and the luminance value of the pixel at the coordinates (i+2,j) in a prescribed size of image block. $\Delta y_{i,j}$ is the difference between the luminance value of the pixel at the coordinates (i,j) and the luminance value of the pixel at the coordinates (i,j+2) in the prescribed size of image block.

From the calculation of expression 1, as the difference between the luminance values in the prescribed size of image block is larger, a higher sharpness is obtained.

The sharpness of an image can be found by use of expression 1. Alternatively, the sharpness of an image can be found based on a frequency spectrum obtained by Fourier transform performed on the sharpness in a prescribed size of block.

Figure 7A:
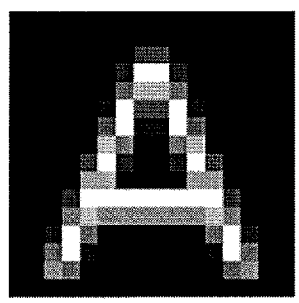
FIGS. 7A through 7C each show a luminance distribution of an image block having a size of 16×16.
Figure 7B:
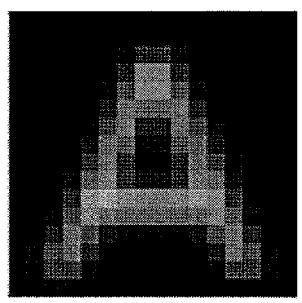
Figure 7C:
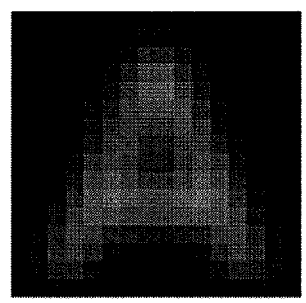
Figure 7D:
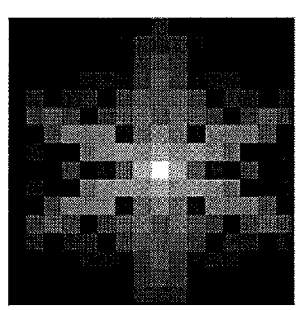
FIGS. 7D through 7F show frequency spectra respectively obtained by two-dimensional Fourier transform of the image blocks shown in FIGS. 7A through 7C.
Figure 7E:
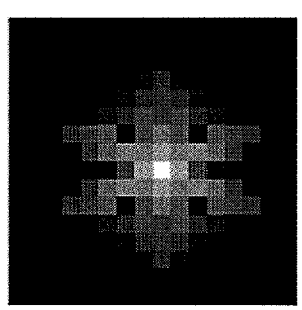
Figure 7F:
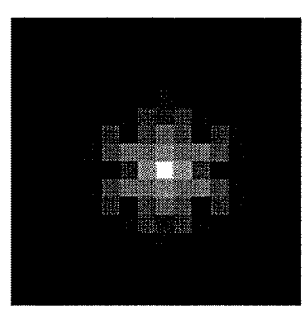

FIGS. 7A through 7C each show a luminance distribution of an image block having a size of 16×16. In the order from FIG. 7A to FIG. 7C, the sharpness is decreased. FIGS. 7D through 7F show frequency spectra respectively obtained by two-dimensional Fourier transform of the image blocks shown in FIGS. 7A through 7C. In FIGS. 7D through 7F, the strength of each frequency spectrum is processed with logarithm conversion for display for easier understanding. As the frequency spectrum is stronger, the image is brighter. In each frequency spectrum, the central part having the highest luminance is a DC component, and the frequency is raised in a direction approaching the periphery.

In FIGS. 7D through 7F, it is seen that as the sharpness of the image is decreased, higher frequency spectra are missing. Therefore, it is seen that the sharpness can be found from such a frequency spectrum by, for example, extracting the entirety, or a part, of the frequency spectrum.

A color image may be generated by simply complementing missing color information for each pixel position based on the luminance information of the pixels P1, P2, P3 and P4. Alternatively, the color image may be generated after the sharpness G2, B is raised because the sharpness G2, B is lower than the sharpness G1, R as shown in FIG. 6.

FIG. 8 shows a method for raising the sharpness G2, B based on the sharpness G1, R. FIG. 8A is a monochromatic chart, which is a subject. FIG. 8B is a cross-sectional view of the luminance of the subject shown in FIG. 8A. As shown in FIG. 8B, the luminance cross-section of the chart is step-like. However, when, for example, the chart is located at a prescribed position which is slightly shifted toward the viewer from the subject position at which the light rays reaching the pixels P1 and P3 are best focused and an image thereof is picked up, the luminance cross-section of the image is as shown in FIG. 8C. In the graph of FIG. 8C, G1 and R each represent a luminance cross-section of an image generated by each of the pixels P1 (green component) and the pixels P3 (red component), and G2 and B each represent a luminance cross-section of an image generated by each of the pixels P2 (green component) and the pixels P4 (blue component). As can be seen, the luminance cross-section G1, R is closer to the luminance cross-section of the actual chart in FIG. 8B, and is considered to have a higher sharpness, than the luminance cross-section G2, B.

Figure 8A:
FIG. 8A is a monochromatic chart, which is a subject.
Figure 8B:
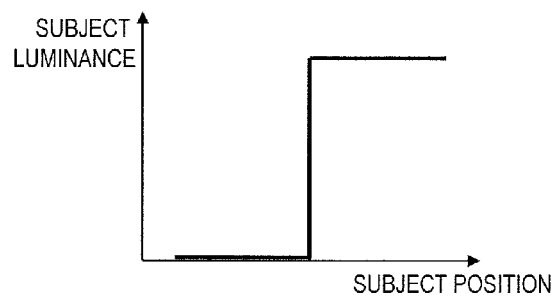
FIG. 8B is a cross-sectional view of the luminance of the subject shown in FIG. 8A.
Figure 8C:
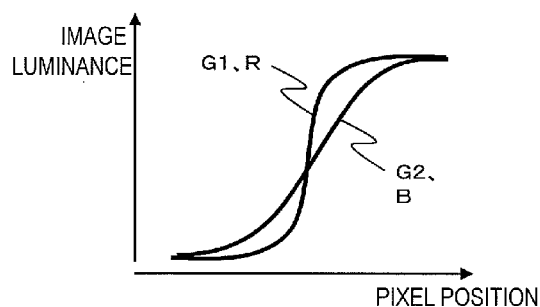
FIG. 8C is a cross-sectional view of the luminance of each color of the image picked up by the imaging apparatus A in FIG. 1.
Figure 8D:
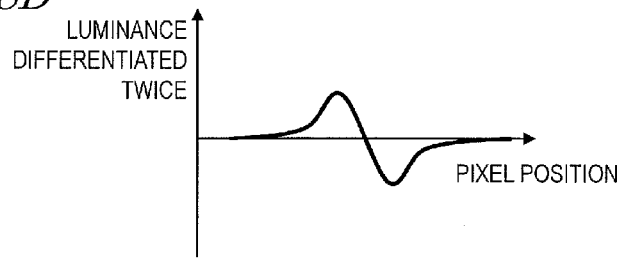
FIG. 8D shows the result of differentiation performed twice on the luminance of G1 (green) and R (red) in FIG. 8C.
Figure 8E:
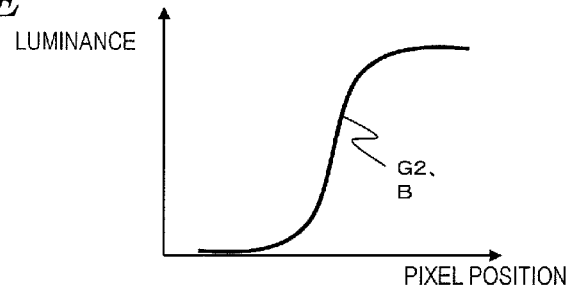
FIG. 8E is a cross-sectional view of the luminance when the result of differentiation performed twice in FIG. 8D is subtracted from the luminance of G2 (green) and B (blue) in FIG. 8C.

When an image of the monochromatic chart as shown in FIG. 8A is picked up, the luminance cross-section G1 and the luminance cross-section R are almost the same. However, in actuality, since the subject image of all the color components is picked up, the luminance cross-section G1 and the luminance cross-section R in FIG. 8C do not match each other in most of the cases. Therefore, the luminance cross-sections G1 and R may be used to detect the respective sharpness so that a color component having a high sharpness is selected to raise the sharpness of the luminance cross-section G2, B. The detection of the sharpness is performed by a sharpness detection section in the first signal processing section C1. When a luminance cross-section having a high sharpness is selected and is differentiated twice, the distribution in FIG. 8D is obtained. Thus, an edge of the image of a color component having a high sharpness can be detected. Next, the distribution of FIG. 8D is subtracted from the luminance distribution of G2, B of FIG. 8C. As a result, the distribution of FIG. 8E is obtained. Thus, the sharpness of the luminance distribution of G2, B can be raised. For subtracting the distribution of FIG. 8D, the distribution of FIG. 8D may be first multiplied by a prescribed coefficient and then the resultant value may be subtracted from the luminance distribution of G2, B. Thus, how much the sharpness G2, B is to be raised can be controlled.

In this embodiment, for simpler explanation, the process of raising the sharpness of the image is performed one-dimensionally. However, since the image is two-dimensional, an actual sharpening process is performed two-dimensionally.

By the above-described image process, the sharpness G2, B represented with the solid line in FIG. 6 can be raised to sharpness G2', B' represented with the dashed line. Thus, the color image to be generated can be sharpened.

Figure 9:
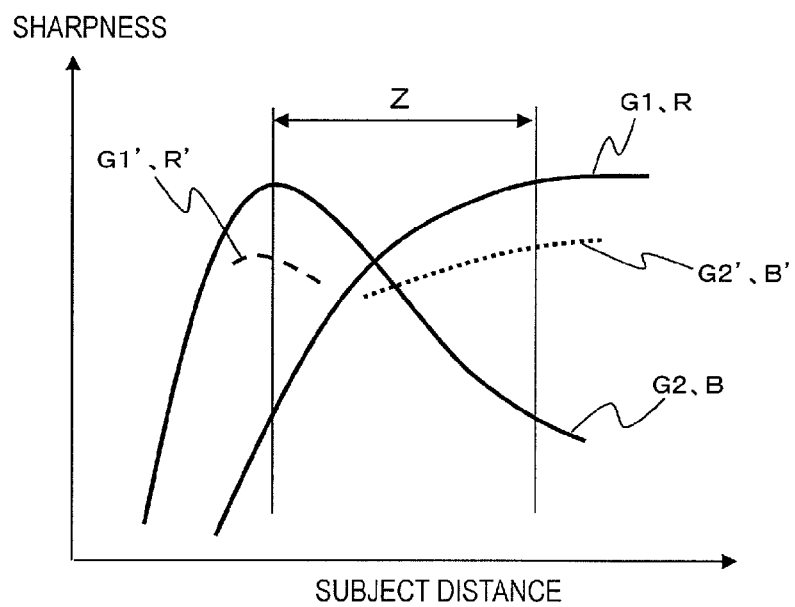
FIG. 9 is a graph showing the relationship between the subject distance and the sharpness (sharpness of the image) in Embodiment 1 according to the present invention.

FIG. 9 is a graph showing the relationship between the subject distance and the sharpness in the case where the optical face of the optical area D2 shown in FIG. 1 is changed from the aspheric shape to a spherical shape. Even in this case, like in the case of FIG. 6, the color image can be sharpened.

In FIG. 9, the color component having a high sharpness is varied in accordance with the subject distance. Therefore, the luminance cross-sections G1, G2, R and B may be used to detect the respective sharpness so that a color component having the highest sharpness is selected to raise the sharpness of the other color components.

By the above-described image process, the sharpness G1, G2, R, B represented with the solid lines in FIG. 9 can be raised to sharpness G1', G2', R', B' represented with the dashed lines. Thus, the color image to be generated can be sharpened.

Figure 10:
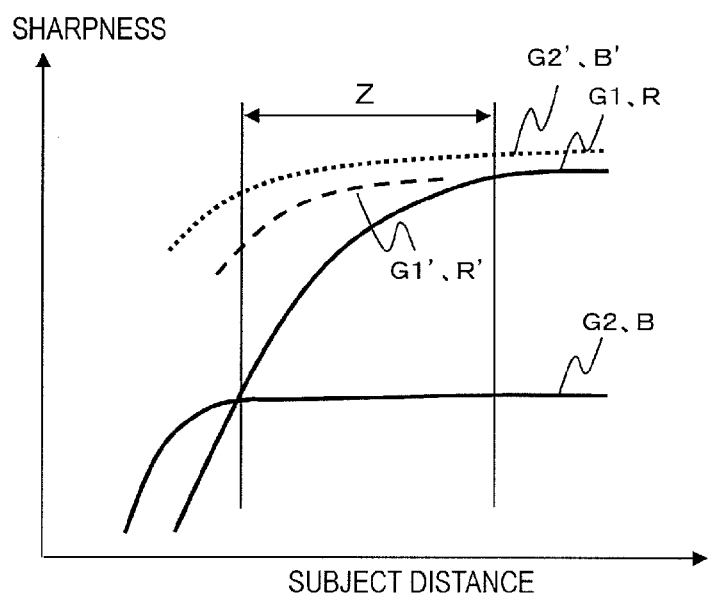
FIG. 10 is a graph showing the relationship between the subject distance and the sharpness (sharpness of the image) in Embodiment 1 according to the present invention.

Now, another technique for raising the sharpness of an image will be described. FIG. 10 shows a method for raising the sharpness G1, R based on the sharpness G2', B' obtained by raising the sharpness G2, B. The structure of the optical areas D1 and D2 is the same as in FIG. 6. The point spread function formed by the light rays which have passed the optical area D2 is approximately constant within a prescribed range of subject distance. Therefore, the point spread function formed by extracting the pixels P2 (G2 component) and the pixels P4 (B component) is approximately constant within a prescribed range of subject distance. When the point spread function is approximately constant within a prescribed range of subject distance, the image formed by extracting each of the pixels P2 (G2 component) and the pixels P4 (B component) can be recovered based on a prescribed point spread function regardless of the subject distance.

Hereinafter, a method for recovering a picked-up image based on the pre-stored point spread function will be described. Where the original image is f(x,y) and the point spread function is h(x,y), the picked-up image g(x,y) can be represented by expression 2.

$$g(x,y)=f(x,y) \otimes h(x,y) \quad \text{[Expression 2]}$$

($\otimes$ represents convolution.)

Expression 3 is obtained by Fourier transform performed on both sides of expression 2.

$$G(u,v)=F(u,v)H(u,v) \quad \text{[Expression 3]}$$

By applying the inverse filter Hinv(u,v) of expression 4 to the deteriorated image G(u,v), the two-dimensional Fourier transform F(u,v) of the original image is found as in expression 5. By processing this by inverse Fourier transform, the original image f(x,y) can be obtained as the recovered image.

$$Hinv(u, v) = \frac{1}{H(u, v)} \quad \text{[Expression 4]}$$

$$F(u, v) = Hinv(u, v)G(u, v) \quad \text{[Expression 5]}$$

However, when H(u,v) is 0 or an extremely small value, Hinv(u,v) is diverged. Therefore, the Wiener filter Hw(u,v) as in expression 6 is used to recover the deteriorated image.

$$Hw(u, v) = \frac{1}{H(u, v)} \frac{|H(u, v)|^2}{|H(u, v)|^2 + |N(u, v)|^2 / |F(u, v)|^2} \quad \text{[Expression 6]}$$

In expression 6, N(u,v) is noise. Usually, the noise and the original image F(u,v) are unknown. Therefore, in actuality, constant k is used to recover the deteriorated image by the filter of expression 7.

$$Hw(u, v) = \frac{1}{H(u, v)} \frac{|H(u, v)|^2}{|H(u, v)|^2 + k} \quad \text{[Expression 7]}$$

By use of such a recovery filter, the sharpness G2, B represented with the solid line in FIG. 10 can be raised to sharpness G2', B' represented with the dotted line. As can be seen, in this embodiment, the entire area of an image which is formed by luminance information of pixels reached by the light which has been incident on the optical area D1 can be recovered by use of the point spread function. In general, the point spread function varies in accordance with the imaging position of the optical system. Therefore, a point spread function corresponding to each imaging position may be used. However, in the case where almost no point spread function is present at the imaging positions in the optical system, the entire area of an image can be recovered by a single point spread function. The point spread function needs to be stored on a memory or the like in advance. Use of a single point spread function can reduce the amount of the memory used. In addition, the sharpness can be raised like in the method described with reference to FIG. 8 as follows. The luminance cross-sections (recovered sharpened images) G2' and B' are used to detect the respective sharpness of each prescribed area (sharpness detection section). The luminance cross-section of a color component having a high sharpness is differentiated twice, and the resultant value is subtracted from G1, R. In this manner, the sharpness G1, R can be raised to the sharpness G1', R' represented with the dashed line in FIG. 10. Thus, a luminance information of another pixel component can be sharpened based on the sharpness.

By the above-described image process, the sharpness G2, B and the sharpness G1, R are improved to the sharpness G2', B' represented with the dotted line and the sharpness G1', R' represented with the dashed line. Thus, the color image to be generated can be sharpened. Such a sharpening process can further extend the depth of the subject than the sharpening process shown in FIG. 6.

Now, a specific method for finding the subject distance will be described.

The first signal processing section C1 shown in FIG. 1 outputs a first image I1 (shown in FIG. 1) obtained by extracting the luminance information from the pixels P1 (G1 component) and a second image I2 obtained by extracting the luminance information from the pixels P2 (G2 component). The optical characteristics of the two optical areas D1 and D2 are different from each other. Therefore, the sharpness (value calculated by use of the luminance) of each of the first and second images I1 and I2 is varied in accordance with the subject distance. On the storage section Me (shown in FIG. 1), the correlation between the sharpness of the light which has passed each of the optical areas D1 and D2 and the subject distance is stored. The second signal processing section C2 (shown in FIG. 1) can obtain the distance to the subject based on the sharpness of each of the first and second images I1 and I2 and the correlation.

Range Z in FIG. 6 and FIG. 10 is an area where G1 changes and G2 does not change almost at all. In the range Z, the subject distance can be found by use of such a relationship. For example, in the range Z, the subject distance and the ratio between the sharpness G1 and the sharpness G2 are correlated to each other. Therefore, the correlation of the subject distance with respect to the ratio between the sharpness G1 and the sharpness G2 is stored in advance on the storage section Me.

When the imaging apparatus is used, the sharpness ratio between the first image I1 generated only of the pixels P1 (G1 component) and the second image I2 generated only of the pixels P2 (G2 component), among the data obtained as a result of a single image capture, is found for each operation block. Then, the subject distance can be found by use of the correlation stored on the storage section Me. Specifically, the value of the sharpness ratio in the correlation and the value of the sharpness ratio between the first image I1 and the second image I2 are compared with each other for each operation block. When the values match each other, the subject distance corresponding to the matching value is set as the distance to the subject at the time of image capture.

In order to uniquely find the subject distance from the ratio between the sharpness of the first image I1 generated only of the pixels P1 and the sharpness of the second image I2 generated only of the pixels P2, all the sharpness ratios need to be different in a prescribe range of subject distance.

In FIG. 6, FIG. 9 and FIG. 10, all the sharpness ratios are different in the range Z. Therefore, the subject distance can be uniquely found. When the value of sharpness is too low, the ratio cannot be found. Therefore, the value of sharpness may be at least a certain value.

The relationship between the subject distance and the sharpness is determined by the radius of curvature, the aspheric coefficient and the refractive index of the optical areas D1 and D2. Namely, the optical areas D1 and D2 need to have such optical characteristics that all the ratios between the sharpness of the first image I1 and the sharpness of the second image I2 are different within a prescribed range of subject distance.

In this embodiment, any value calculated by use of luminance (luminance information), for example, a contrast may be used to find the subject distance, instead of the sharpness. The contrast can be found from, for example, the ratio between the maximum luminance value and the minimum luminance value in a prescribed operation block. The sharpness is a difference between the luminance values, whereas the contrast is a ratio between the luminance values. The contrast may be found from a ratio between one point having the maximum luminance value and one point having the minimum luminance value, or, for example, from a ratio between an average value of several points having higher luminance values and an average value of several points having lower luminance values. In the case where the subject distance is within a certain range, the contrast of the first image I1 and the contrast of the second image I2 are correlated to the subject distance. For finding the subject distance by use of the contrast also, the correlation between the subject distance and the contrast ratio is stored in advance on the storage section Me as in the case where the sharpness is used. In this case, the first signal processing section C1 includes a contrast detection section for detecting the contrast of the first image I1 obtained by the pixels P1 and the contrast of the second image I2 obtained by the pixels P2. By finding the contrast ratio between the first image I1 and the second image I2 for each operation block, the subject distance can be found by use of the correlation (second signal processing section C2).

In this embodiment, the subject distance may be found by use of a value other than the sharpness or the contrast, for example, the point spread function. Hereinafter, a method for finding the point spread function from the first image I1 and the second image I2 will be described.

By recovering the second image I2 generated only of the pixels P2 (G2 component) by use of expression 7 described above, a recovered image i2'(x,y) extremely close to the original image f(x,y) is found. Where the first image generated only of the pixels P1 (G1 component) is i1(x,y) and the point spread function by the light rays which have passed the optical area D1 is h1(x,y), i1(x,y) can be represented by expression 8.

$$i1(x,y) \approx i2'(x,y) \otimes h1(x,y) \qquad \text{[Expression 8]}$$

($\otimes$ represents convolution.)

Expression 9 is obtained by Fourier transform of expression 8.

$$I1(u,v) \approx I2'(u,v)H1(u,v) \qquad \text{[Expression 9]}$$

By deforming expression 9, value $H1(u,v)$ of the frequency area of the point spread function h1(x,y) is found as in expression 10.

$$H1(u,v) \approx \frac{I1(u,v)}{I2'(u,v)} \qquad \text{[Expression 10]}$$

By performing inverse Fourier transform on this expression, the point spread function h1(x,y) by the light rays which have passed the optical area D1 can be found.

The point spread function h1(x,y) by the light rays which have passed the optical area D1 varies in accordance with the subject distance. Therefore, when the subject distance is within a certain range, the point spread function h1(x,y) and the subject distance are correlated to each other. The subject distance can be found by use of this correlation.

When the point spread function is expressed by a representative numerical value, the diameter of the point spread function, for example, is usable. Like in the case where the sharpness or the contrast is used, the correlation between the subject distance and the diameter of the point image is stored in advance on the storage section Me. The point spread function is found from the first image I1 and the second image I2 for each block, and the diameter of the point image is found from the point spread function. Thus, the subject distance can be found by use of the correlation. The diameter of the point image can be found from, for example, the half bandwidth of the point spread function.

In this embodiment, a structure of generating an image which is a sum of the first image I1 and the second image I2 may be included in the case where the optical areas have different radii of curvature as shown in FIG. 9. The range of distance at which the sharpness is at least a certain value in an image generated by adding the first image I1 and the second image I2 together is larger than each of the first image I1 and the second image I2. In this case, the ratio between the sharpness of the image generated by the addition and the sharpness of either the first image I1 or the second image I2 is correlated to the subject distance. By storing this correlation in advance, the subject distance can be found for each prescribed area of the image.

The optical system of the imaging apparatus in this embodiment may be an image-side telecentric optical system. Owing to this, even if the angle of view is changed, the principal light rays are incident on the optical array element K at an angle close to 0°. Therefore, the crosstalk among the light beams reaching the pixels P1, P2, P3 and P4 can be decreased over the entirety of the imaging area.

As described above, in this embodiment, the above description is given with an assumption that the lens L2 is an ideal lens for simplifying the explanation. It is not absolutely necessary to use the ideal lens. For example, a lens which is not an ideal lens has an axial color aberration. As described above, a color component having a high sharpness may be selected to raise the sharpness of the other color components. Therefore, a sharp color image can be generated even if the lens is not an ideal lens. For finding the subject distance, the distance is found based on a single color component (green component in this embodiment). Therefore, the lens may have an axial color aberration.

In this embodiment, the optical element L1 and the lens L2 are separate from each other. Alternatively, the lens L2 may have the optical areas D1 and D2 so that the optical element L1 is removed. In this case, the stop S may be located in the vicinity of the optical areas D1 and D2 of the lens L2.

As described above, in this embodiment, both of color image and the subject distance can be obtained by a single image capture performed by use of a single imaging system. Namely, by performing image capture once by use of an imaging apparatus in this embodiment, luminance information for outputting a color image and for measuring the subject distance can be obtained. By use of the luminance information, both of the color image and the subject distance can be obtained. Since the subject distance can be calculated for each operation block, the subject distance at any position of the color image can be obtained. Therefore, a subject distance map of the entirety of the image can also be obtained. Since the distance to the subject can be obtained by a single imaging system, it is not necessary to match the characteristics or the positions of a plurality of imaging optical systems unlike in the case where an imaging apparatus including the plurality of imaging optical systems is used. When the imaging apparatus in this embodiment is used to pick up a moving image, even if the position of the subject is changed due to elapse of time, the distance to the subject can be accurately measured.

According to this embodiment, the pixels are in the Bayer array. Therefore, a general color imaging element can be used as it is with no need to newly develop an imaging element for a specific color filter array. This can suppress the amount of initial investment.

Embodiment 2

In Embodiment 2, unlike in Embodiment 1, the optical areas of the optical element L1 have different sizes, and the optical array element includes microlenses instead of a lenticular lens. Herein, the same contents as those of Embodiment 1 will not be described in detail.

Figure 11:
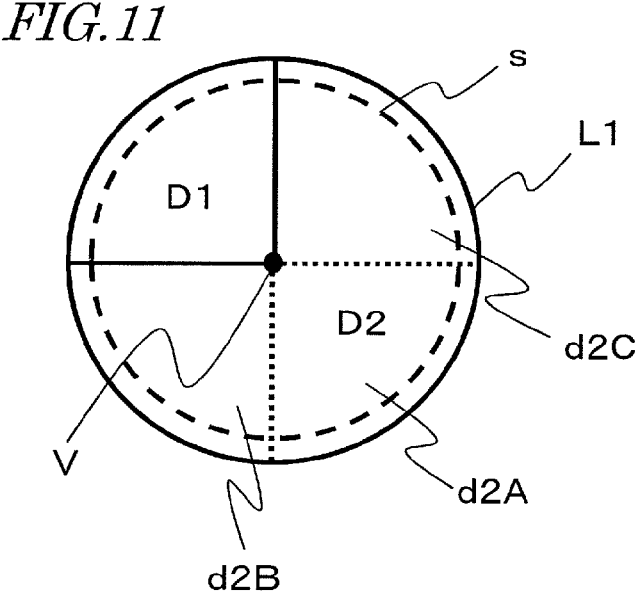
FIG. 11 is a front view of an optical element L1 in Embodiment 2 according to the present invention as seen from the side of a subject.

FIG. 11 is a front view of an optical element L1 as seen from the side of a subject. The optical element L1 is divided into the optical areas D1 and D2. The optical area D2 is further divided into optical areas d2A, d2B and d2C. As shown in FIG. 11, the optical areas D1, d2A, d2B and d2C are obtained by dividing a plane vertical to the optical axis V into four, namely, upper, lower, left and right areas along borders having the optical axis V as the center thereof. The optical areas D1 and D2 respectively have optical characteristics which provide different focusing characteristics by light rays which have passed the respective areas.

Figure 12:
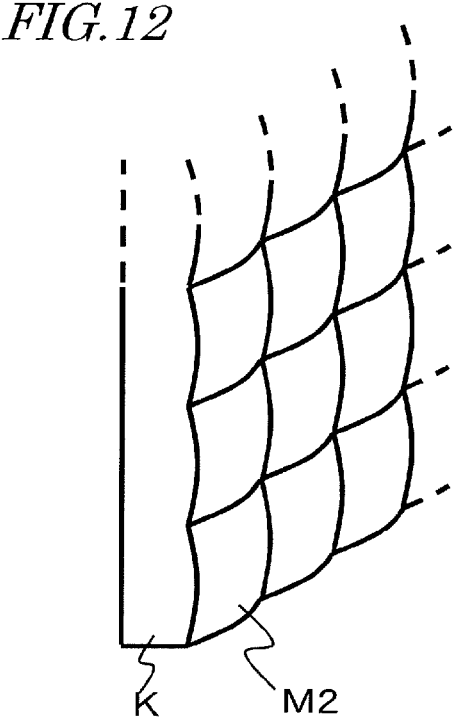
FIG. 12 is an isometric view of an optical array element K in Embodiment 2 according to the present invention.

FIG. 12 is an isometric view of the optical array element K. At a face of the optical array element K on the side of the imaging element N, optical components M2 are arrayed in a lattice. A cross-section of each optical component M2 (cross-section in each of the longitudinal direction and the lateral direction) has an arced shape, and the optical components M2 protrude toward the imaging element N. As can be seen, the optical component M2 is a microlens, and the optical array element K is an microlens array.

Figure 13A:
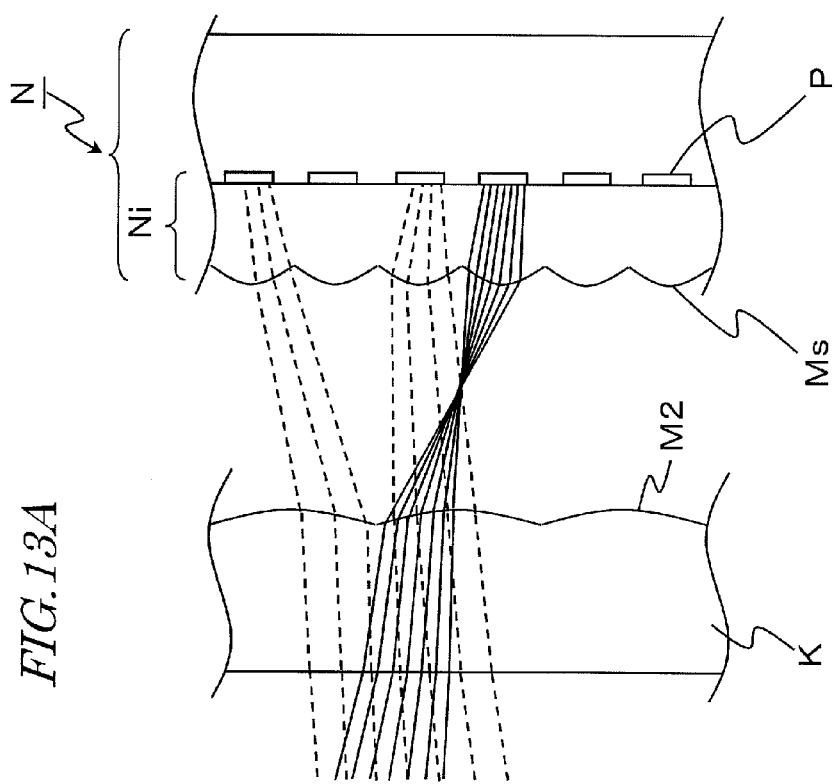
FIG. 13A is an enlarged view of the optical array element K and an imaging element N in Embodiment 2 according to the present invention.
Figure 13B:
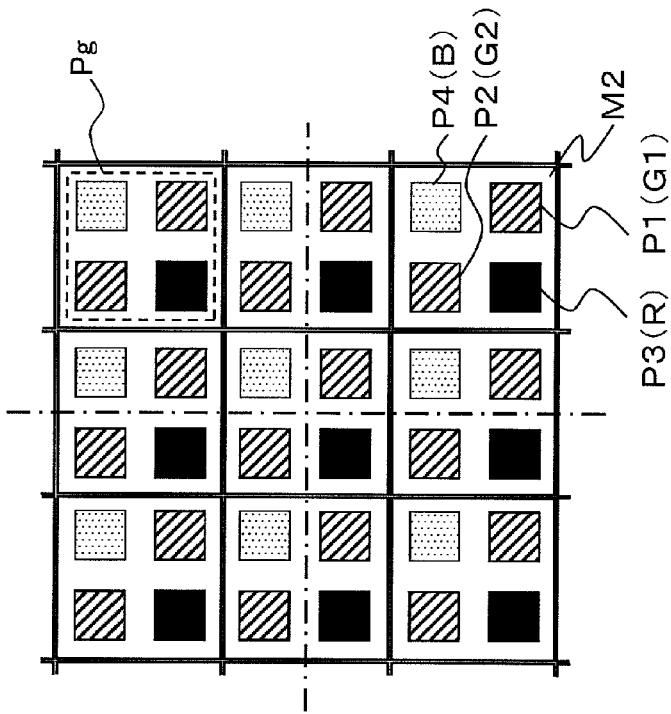
FIG. 13B shows the positional relationship between the optical array element K and the pixels of the imaging element N.

FIG. 13A is an enlarged view of the optical array element K and the imaging element N. FIG. 13B shows the positional relationship between the optical array element K and the pixels of the imaging element N. Like in Embodiment 1, the optical array element K is located in the vicinity of the focal point of the lens optical system L, and at a position distanced from the imaging plane Ni by a prescribed distance. On a surface of the imaging plane Ni, microlenses Ms are provided so as to cover surfaces of the pixels P1, P2, P3 and P4.

The pixels P1, P2, P3 and P4 respectively include filters having the same spectral transmittance characteristics as those of the filters for the pixels P1, P2, P3 and P4 in Embodiment 1.

The optical array element K is located such that a face at which the optical components M2 are formed is directed toward the imaging plane Ni. The optical array element K is located such that one of the optical components M2 corresponds to four pixels P1 through P4 (pixel group Pg) arrayed in two rows by two columns on the imaging plane Ni.

Owing to such a structure, the light beams which have passed the optical areas D1, d2A, d2B and d2C on the optical element L1 (mostly) reach the pixels P1, P2, P3 and P4 on the imaging plane Ni, respectively.

In this embodiment, the light which has passed the optical area D1 reaches the pixels P1, and the light which has passed the optical area D2 (d2A, d2B and d2C) reaches the pixels P2, P3 and P4. In both of Embodiments 1 and 2, the optical array element K causes the light which has passed either the optical area D1 or D2 to be incident on the pixels P3 and causes the light which has passed either the optical area D1 or D2 to be incident on the pixels P4. However, in Embodiment 1, the light which has passed one of the optical areas D1 and D2 reaches the pixels P3 whereas the light which has passed the other of the optical areas D1 and D2 reaches the pixels P4. By contrast, in Embodiment 2, the light which has passed either one of the optical areas D1 and D2 reaches both of the pixels P3 and P4.

In Embodiments 1 and 2, the optical array element K may cause only the light which has passed either one of the optical areas D1 and D2 to be incident on the pixels P3 and cause only the light which has passed either one of the optical areas D1 and D2 to be incident on the pixels P4. However, there is a possibility that a part of the light beam which has passed the optical areas D1, d2A, d2B and d2D is incident on an area of the imaging plane Ni other than the pixels or an adjacent pixel. Therefore, in this specification and the claims, for example, the expression "cause only the light which has passed the optical area D1 to be incident on the pixels P3" does not mean that no light from the optical area D2 is incident on the pixels P3, but means that the light incident on the pixels P3 is mostly (e.g., 80% or higher) from the optical area D1.

Like in Embodiment 1, the first signal processing section C1 generates a color image by use of luminance information of the plurality of pixels P1, P2, P3 and P4. Hereinafter, a specific method for generating a color image will be described.

In FIG. 11, the optical area D1 has an aspheric shape, and the optical area D2 (d2A, d2B and d2C) has a planar face. For simplifying the explanation, the following description will be given with an assumption that the lens L2 is an ideal lens with no aberration.

Owing to the aspheric shape of the optical area D1, like in Embodiment 1, the point spread function by the light rays which have passed the optical area D1 can be made approximately constant in a prescribed range in the vicinity of the focal point of the lens optical system L. Namely, the point spread function can be made approximately constant in a prescribed range of subject distance.

Since the optical area D2 has a planar face, like in Embodiment 1, no spherical aberration is caused. When there is no spherical aberration, the point spread function changes more in a direction shifted from the focal point. Namely, the point spread function changes in accordance with the change of the subject distance.

Figure 14:
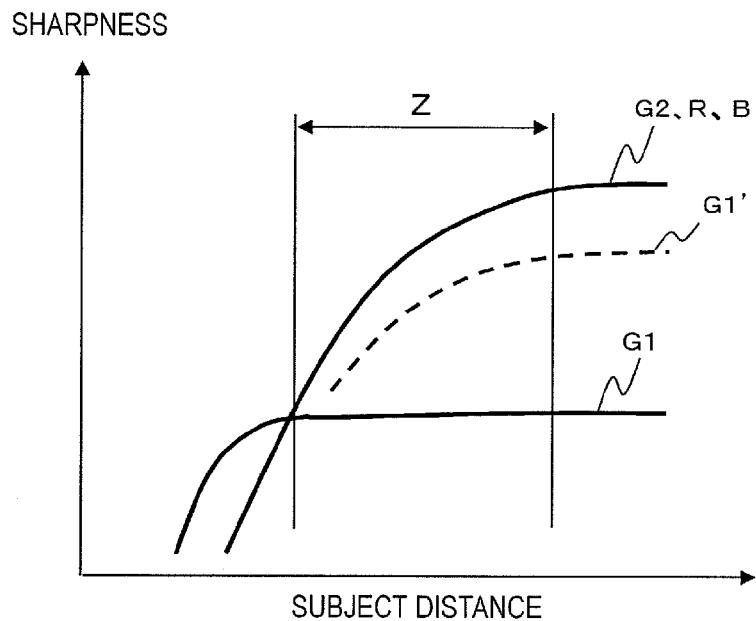
FIG. 14 is a graph showing the relationship between the subject distance and the sharpness (sharpness of the image) in Embodiment 2 according to the present invention.

Like in Embodiment 1, the relationship between the subject distance and the sharpness is as shown in FIG. 14. In the graph of FIG. 14, G1 represents the sharpness of a prescribed area of an image generated by the pixels P1 (green component), and G2, R and B each represent the sharpness of a prescribed area of an image generated by each of the pixels P2 (green component), the pixels P3 (red component) and the pixels P4 (blue component).

Like in Embodiment 1, a color image may be generated by simply complementing missing color information for each pixel position based on the luminance information of the pixels P1, P2, P3 and P4. Alternatively, the color image may be generated after the sharpness G1 is raised as in the method described with reference to FIG. 8 because the sharpness G1 is lower than the sharpness G2, R, B.

By the above-described image process, the sharpness G1 represented with the solid line in FIG. 14 can be raised to the sharpness G1' represented with the dashed line. Thus, the color image to be generated can be sharpened.

Figure 15:
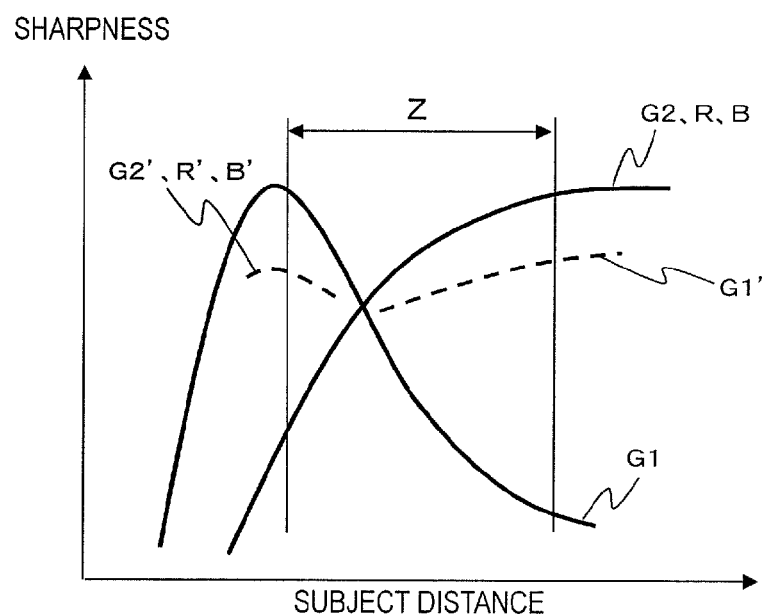
FIG. 15 is a graph showing the relationship between the subject distance and the sharpness (sharpness of the image) in Embodiment 2 according to the present invention.

FIG. 15 is a graph showing the relationship between the subject distance and the sharpness in the case where the optical face of the optical area D1 shown in FIG. 14 is changed from the aspheric shape to a spherical shape. Even in this case, like in the case of FIG. 14, the color image can be sharpened.

In this embodiment, as shown in FIG. 15, the color component having a high sharpness varies in accordance with the subject distance. Therefore, the luminance cross-sections G1, G2, R and B are used to detect the respective sharpness, and a color component having the highest sharpness is selected to sharpen the other color components.

By the above-described image process, the sharpness G1, G2, R, B represented with the solid lines in FIG. 15 can be raised to the sharpness G1', G2', R', B' represented with the dashed line. Thus, the color image to be generated can be sharpened.

Figure 16:
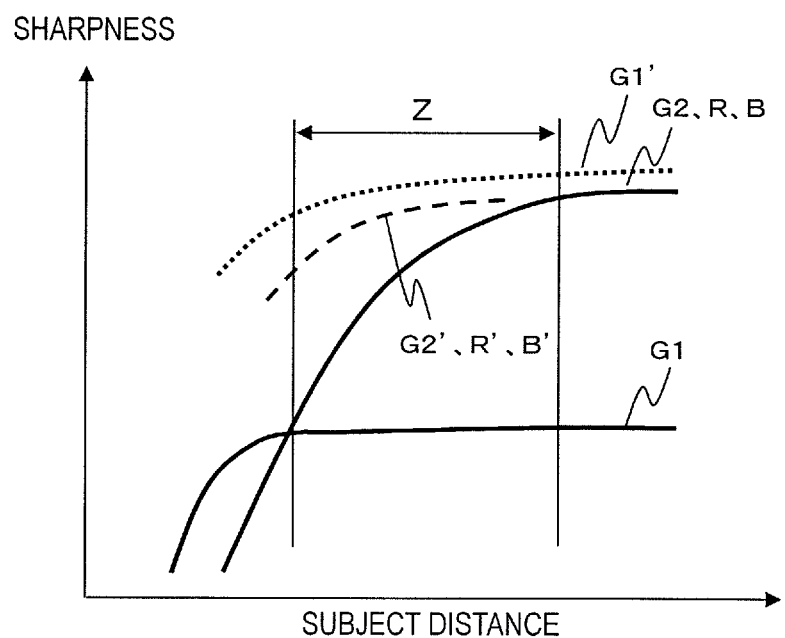
FIG. 16 is a graph showing the relationship between the subject distance and the sharpness (sharpness of the image) in Embodiment 2 according to the present invention.

Now, another technique for sharpening an image will be described. FIG. 16 shows a method for raising the sharpness G2, R, B based on the sharpness G1' obtained by raising the sharpness G1. The structure of the optical area D1 is the same as in FIG. 14. The point spread function formed by the light rays which have passed the optical area D1 is approximately constant within a prescribed range of subject distance. Therefore, the point spread function formed by extracting the pixels P1 (G1 component) is approximately constant within a prescribed range of subject distance. When the point spread function is approximately constant within a prescribed range of subject distance, the image formed by extracting the pixels P1 (G1 component) can be recovered based on a prescribed point spread function regardless of the subject distance.

By use of the recovery filter described in Embodiment 1, the sharpness G1 represented with the solid line in FIG. 16 can be raised to the sharpness G1' represented with the dotted line. Like in the method described with reference to FIG. 8, the luminance cross-section G1' is differentiated twice, and the resultant value is subtracted from G2, R, B. In this manner, the sharpness G2, R, B can be raised to the sharpness G2', R', B' represented with the dashed line in FIG. 16.

In Embodiments 1 and 2, the optical element L1 and the lens L2 are separate from each other. Alternatively, the lens L2 may have the optical areas D1 and D2 so that the optical element L1 is removed. In this case, the stop S may be located in the vicinity of the optical areas D1 and D2 of the lens L2.

As described above, in this embodiment, the above description is given with an assumption that the lens L2 is an ideal lens for simplifying the explanation. It is not absolutely necessary to use the ideal lens. For example, a lens which is not an ideal lens has an axial color aberration. The axial color aberration may be corrected by the optical element L1. In this embodiment, with reference to FIG. 11, the optical area D2 (d2A, d2B and d2C) of the optical element L1 is entirely planar. Alternatively, the optical areas d2A, d2B and d2C may have different optical faces, so that the axial color aberration can be corrected. As described above, the light rays which have passed the optical areas d2A, d2B and d2C respectively reach the pixels P2, the pixels P3 and the pixels P4. The pixels P2, the pixels P3 and the pixels P4 respectively include filters for mainly transmitting light of wavelength components of green, red and blue. Therefore, when a lens having an axial color aberration is used as the lens L2, the optical faces of the optical areas d2A, d2B and d2C may have different levels of optical power from one another such that light components having wavelength ranges of the filters provided in the pixels have the same focus position. Owing to such a structure, as compared with the case where the optical areas d2A, d2B and d2C have an equal level of optical power, the focus positions of the light components which have passed the optical areas d2A, d2B and d2C can be made closer to one another. Therefore, the axial color aberration caused by the lens L2 can be corrected by the optical element L1. By correcting the axial color aberration by the optical element L1, the number of lenses included in the lens L2 can be decreased, which can reduce the size of the optical system.

By the above-described image process, the sharpness G1 and the sharpness G2, R, B represented with the solid line in FIG. 16 can be raised to the sharpness G1' represented with the dotted line and the sharpness G2', R', B' represented with the dashed line. Thus, the color image to be generated can be sharpened. Such a sharpening process can extend the depth of the subject as compared with the sharpening process shown in FIG. 14.

In this embodiment, the relationship between the sharpness G1 and the sharpness G2 are merely opposite to that of Embodiment 1. The method for measuring the distance to the subject can be carried out in substantially the same manner.

As described above, in this embodiment, like in Embodiment 1, both of a color image and the subject distance can be obtained by a single image capture performed by use of a single imaging system.

Embodiment 3

In Embodiment 3, unlike in Embodiments 1 and 2, the lenticular lens or the microlens array are formed on the surface of the imaging plane. Herein, the same contents as those of Embodiment 1 will not be described in detail.

Figure 17A:
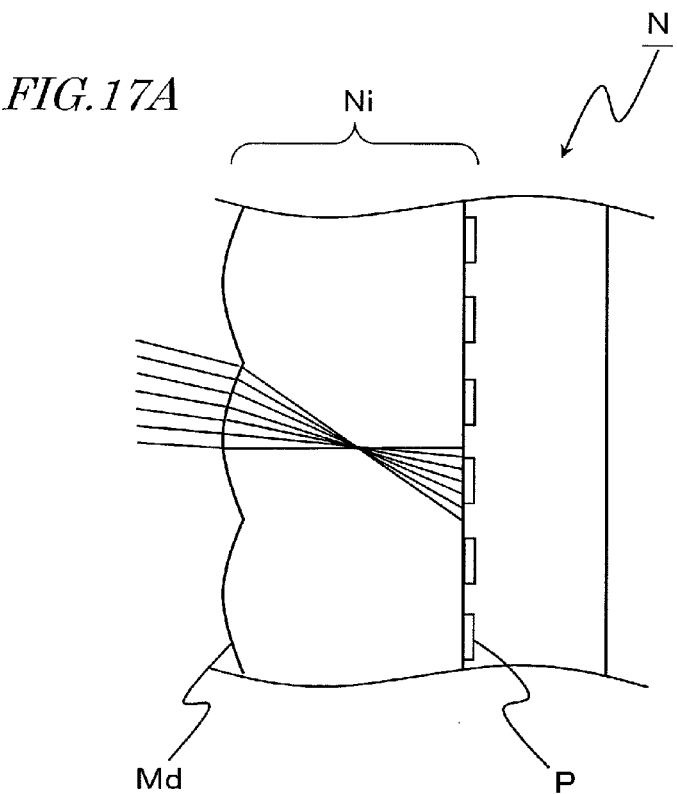
FIGS. 17A and 17B are each an enlarged view of the optical array element K and an imaging element N in Embodiment 3 according to the present invention.
Figure 17B:
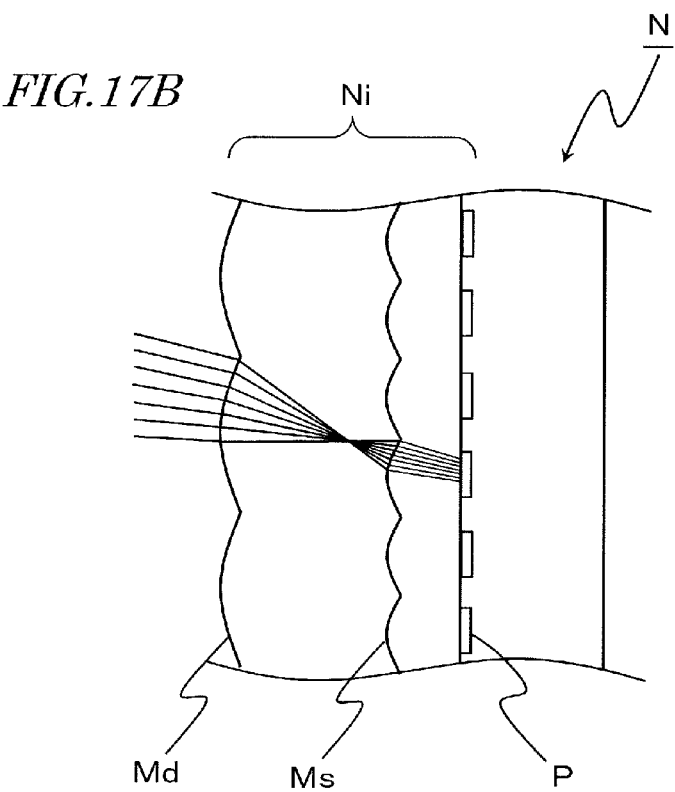

FIGS. 17A and 17B are enlarged views of the optical array element K and the imaging element N. In this embodiment, a lenticular lens (or a microlens array) Md is formed on the imaging plane Ni of the imaging element N. On the imaging plane Ni, the pixels P are arrayed in rows and columns like in Embodiment 1. One optical component of the lenticular lens or one optical component of the microlens array corresponds to a plurality of pixels P. In this embodiment also, like in Embodiments 1 and 2, the light beams which have passed different areas on the optical element L1 can be respectively guided to different pixels. FIG. 17B shows a modification of this embodiment. In the structure of FIG. 17B, the microlens array Ms is formed on the imaging plane Ni so as to cover the pixels P, and the optical array element K is stacked on a surface of the microlens array Ms. The structure of FIG. 17B can raise the light collection efficiency as compared with the structure of FIG. 17A.

Embodiment 4

In Embodiment 4, unlike in Embodiments 1, 2 and 3, a light blocking member is located at a border between the optical areas of the optical element L1. Herein, the same contents as those of Embodiment 1 will not be described in detail.

Figure 18A:
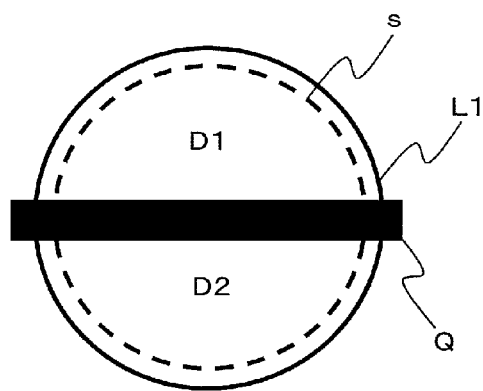
FIGS. 18A, 18B and 18C are each a front view showing the positional relationship between optical areas and a light blocking member in Embodiment 4 according to the present invention.
Figure 18B:
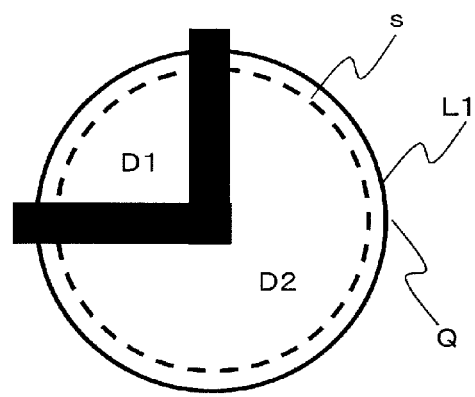
Figure 18C:
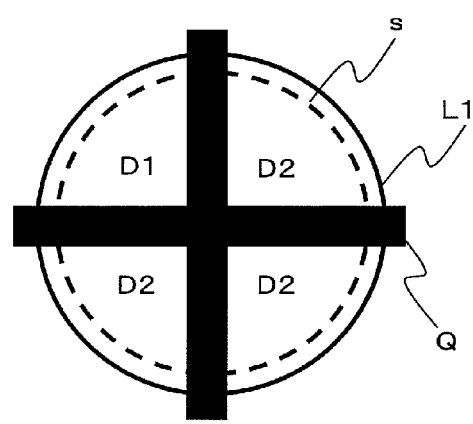

FIG. 18A is a front view of a light blocking member Q located at the border between the optical areas D1 and D2 in Embodiment 1. FIG. 18B is a front view of the light blocking member Q located at the border between the optical areas D1 and D2 in Embodiment 2. FIG. 18C is a front view of the light blocking member Q located at the border between the optical areas D1, d2A, d2B and d2C in Embodiment 2.

Since the shape of the areas is changed discontinuously at the border between the areas, there may be cases where a step is caused and unnecessary light is generated at the border. By locating the light blocking member Q at the border, generation of unnecessary light can be suppressed. As the light blocking member Q, for example, a polyester film or the like having carbon black kneaded therein is usable. The light blocking member Q may be formed integrally with the stop.

FIGS. 18A and 18C each show a state where the areas separated by the light blocking member(s) Q are semicircular or fan-shaped. In this embodiment, a light blocking member having an opening having a circular shape, an elliptical shape, a rectangular shape or the like may be used for the area which transmits light, so that the areas separated by the light blocking member(s) Q are circular, elliptical, rectangular or the like.

Embodiment 5

Figure 19:
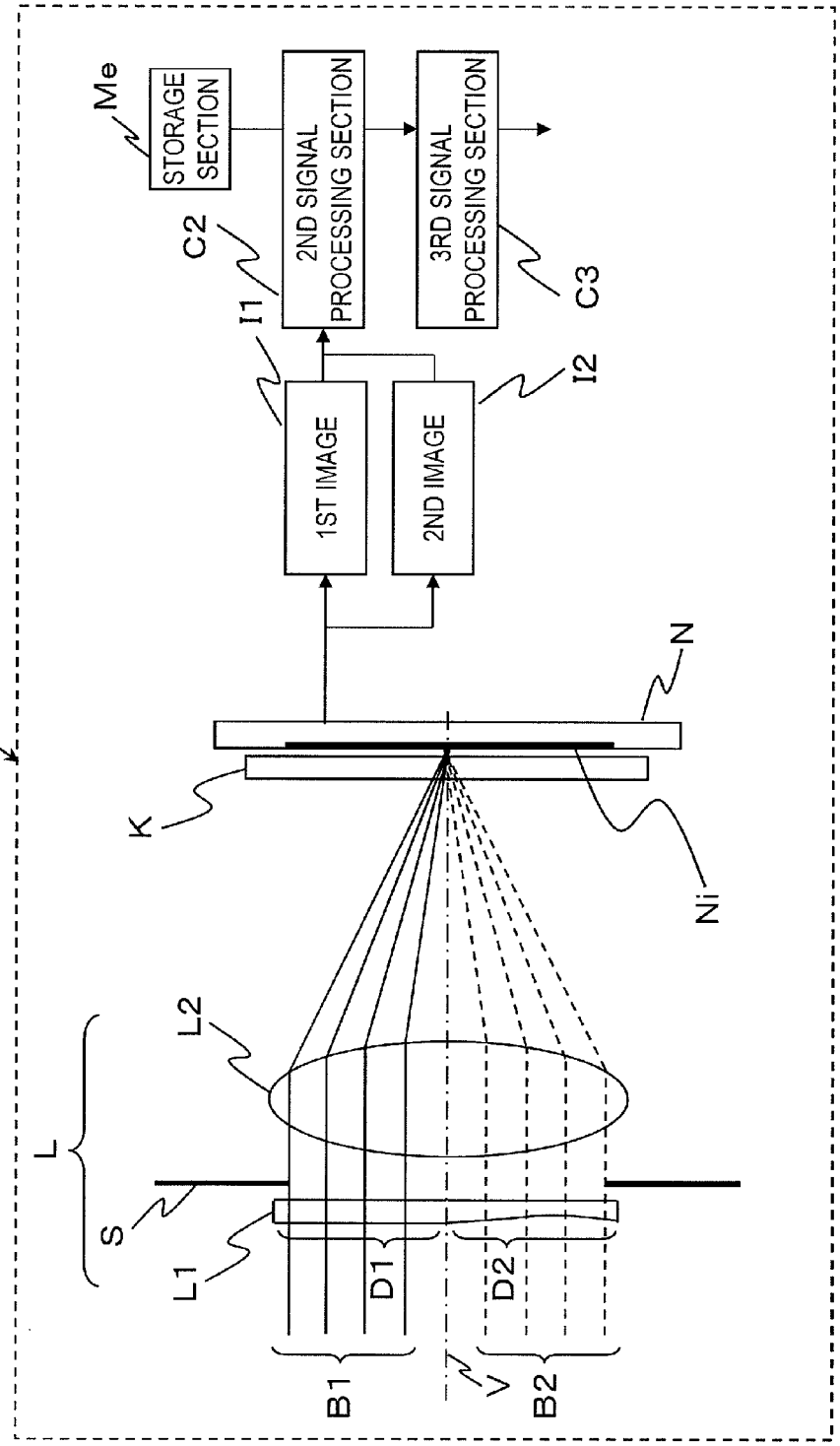
FIG. 19 is a schematic view showing an imaging apparatus A in Embodiment 5 according to the present invention.

FIG. 19 is a schematic view showing an imaging apparatus A in Embodiment 5. The imaging apparatus A in this embodiment includes a lens optical system L having an optical axis V, an optical array element K located in the vicinity of the focal point of the lens optical system L, an imaging element N, a second signal processing section C2, a third signal processing section C3, and a storage section Me.

The lens optical system L includes an optical element L1 which includes two optical areas D1 and D2 having optical characteristics which provide focusing characteristics different from each other and on which light beams B1 and B2 from a subject (not shown) are incident, a stop S on which the light which has passed the optical element L1 is incident, and a lens L2 on which the light which has passed the stop S is incident. The optical element L1 may be located in the vicinity of the stop S.

Figure 20:
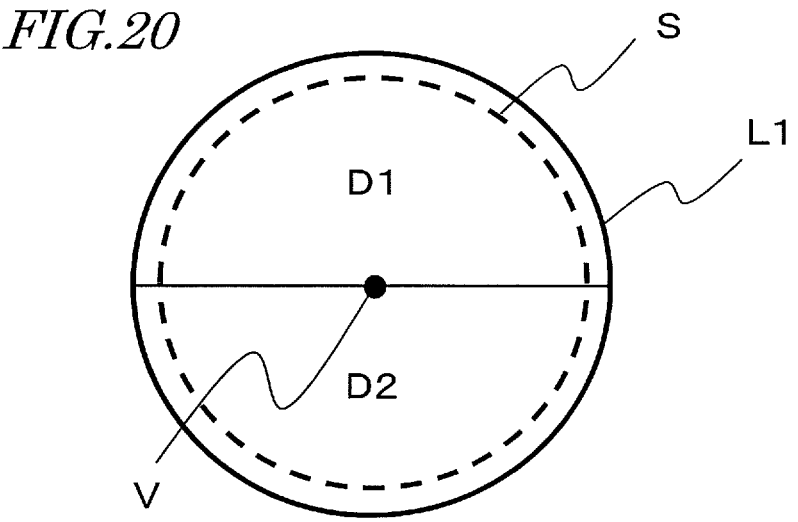
FIG. 20 is a front view of an optical element L1 in Embodiment 5 according to the present invention as seen from the side of a subject.
Figure 22:
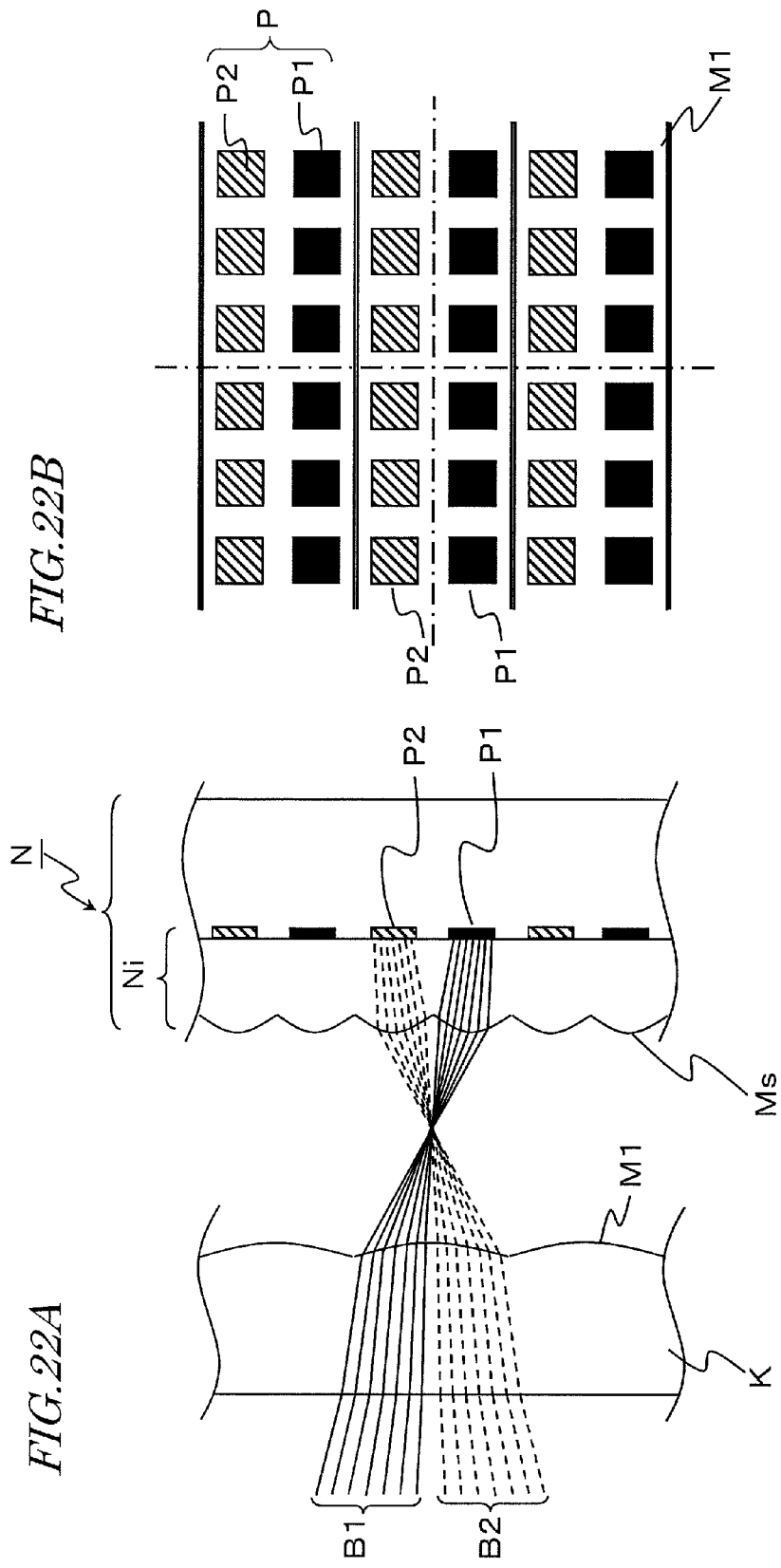
FIG. 22A is an enlarged view of the optical array element K and an imaging element N shown in FIG. 19.
FIG. 22B shows the positional relationship between the optical array element K and the pixels of the imaging element N.

FIG. 20 is a front view of the optical element L1 as seen from the side of a subject. The optical areas D1 and D2 of the optical element L1 are obtained by dividing a plane vertical to the optical axis V into two, namely, an upper area and a lower area along a border having the optical axis V as the center thereof. In FIG. 20, dashed line S represents the position of the stop S. In FIG. 19, the light beam B1 passes the optical area D1 on the optical element L1, and the light beam B2 passes the optical area D2 on the optical element L1. The light beams B1 and B2 pass the optical element L1, the stop S, the lens L2 and the optical array element K in this order and then reach an imaging plane Ni on the imaging apparatus N (shown in FIG. 22, etc.).

Figure 21:
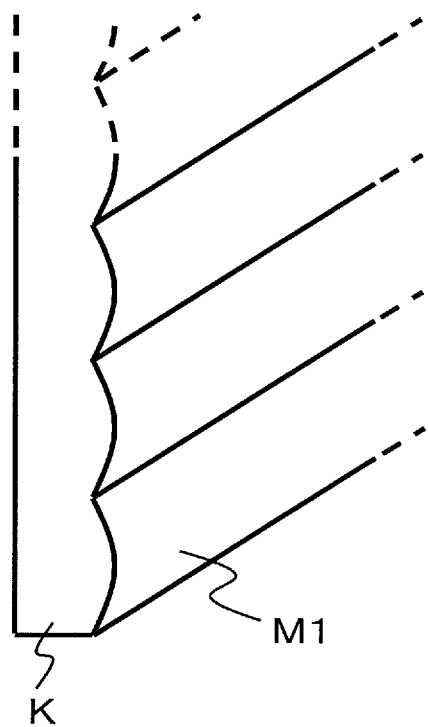
FIG. 21 is an isometric view of an optical array element K in Embodiment 5 according to the present invention.

FIG. 21 is an isometric view of the optical array element K. At a face of the optical array element K on the side of the imaging element N, a plurality of lengthy optical components M1 extending in a lateral direction are arrayed in a longitudinal direction in a plane vertical to the optical axis V. A cross-section of each optical component M1 (cross-section in the longitudinal direction) has an arcked shape protruding toward the imaging element N. As can be seen, the optical array element K has a structure of a lenticular lens.

As shown in FIG. 19, the optical array element K is located in the vicinity of the focal point of the lens optical system L, and at a position distanced from the imaging plane Ni by a prescribed distance. In actuality, the optical characteristics of the optical element L1 influence the focusing characteristic of the entire lens optical system L1, but the position of the optical array element K may be determined based on, for example, the focal point of the lens L2. In this embodiment, the expression "the focusing characteristics are different" means that at least one of the characteristics contributing the collection of light in the optical system is different. Specifically, the expression means that the focal distance, the distance to the subject at which the light is focused, the range of distance at which the sharpness is at least a certain value, or the like is different. By adjusting the radius of curvature, the aspheric coefficient or the refractive index of the optical areas D1 and D2, the focusing characteristic of the lens optical system L can be made different.

In this embodiment, light which has passed the two optical areas D1 and D2 passes the lens L2 and then is incident on the optical array element K. The optical array element K causes the light which has passed the optical area D1 to be incident on pixels P1 (shown in FIG. 22, etc.) of the image capture N and causes the light which has passed the optical area D2 to be incident on pixels P2.

FIG. 22A is an enlarged view of the optical array element K and the imaging element N shown in FIG. 19. FIG. 22B shows the positional relationship between the optical array element K and the pixels of the imaging element N. The optical array element K is located such that a face thereof at which the optical components M1 are formed is directed toward the imaging plane Ni. On the imaging plane Ni, the pixels P are arrayed in rows and columns. The pixels P may be classified into pixels P1 and P2.

The pixels P1 are arrayed in rows in the lateral direction (row direction). In the longitudinal direction (column direction), every other pixel is the pixel P1. The pixels P2 are arrayed in rows in the lateral direction (row direction). In the longitudinal direction (column direction), every other pixel is the pixel P2. The rows of the pixels P1 and the rows of the pixels P2 are located alternately in the longitudinal direction (column direction).

The optical array element K is located such that one of the optical components M1 corresponds to two rows of the pixels including one row of the pixels P1 and one row of the pixels P2 on the imaging plane Ni. On the imaging plane Ni, microlenses Ms are provided so as to cover surfaces of the pixels P1 and P2.

The optical array element K is designed such that the light beam B1 (light beam B1 represented with the solid line in FIG. 19) which has passed the optical area D1 (shown in FIG. 19 and FIG. 20) on the optical element L1 mostly reaches the pixels P1 on the imaging plane Ni and such that the light beam (light beam B2 represented with the dashed line in FIG. 19) which has passed the optical area D2 mostly reaches the pixels P2 on the imaging plane Ni. Specifically, the above-described structure is realized by appropriately setting parameters such as the refractive index of the optical array element K, the distance from the imaging plane Ni, the radius of curvature of the surface of the optical elements M1 and the like.

The stop S is an area which passes light beams of all the angles of view. Therefore, by inserting a face, having an optical characteristic for controlling the focusing characteristic, in the vicinity of the stop S, the focusing characteristics of the light beams of all the angles of view can be controlled. Namely, in this embodiment, the optical element L1 may be provided in the vicinity of the stop S. By locating the optical areas D1 and D2 having optical characteristics which provide different focusing characteristics from each other in the vicinity of the stop S, the light beams can be provided with the focusing characteristics suitable to the number of divided optical areas.

In FIG. 19, the optical element L1 is provided at such a position that light which has passed the optical element L1 is incident on the stop S directly (without passing any other optical member). The optical element L1 may be provided on the side of the imaging element N with respect to the stop S. In this case, the optical element L1 may be provided between the stop S and the lens L2 so that the light which has passed the stop S can be incident on the optical element L1 directly (without passing any other optical member).

The optical array element K has a function of distributing the outgoing direction in accordance with the angle of incidence of the light rays. Therefore, the optical array element K can distribute the light beams toward the pixels on the imaging plane Ni so as to correspond to the optical areas D1 and D2 separated from each other in the vicinity of the stop S.

Figure 23:
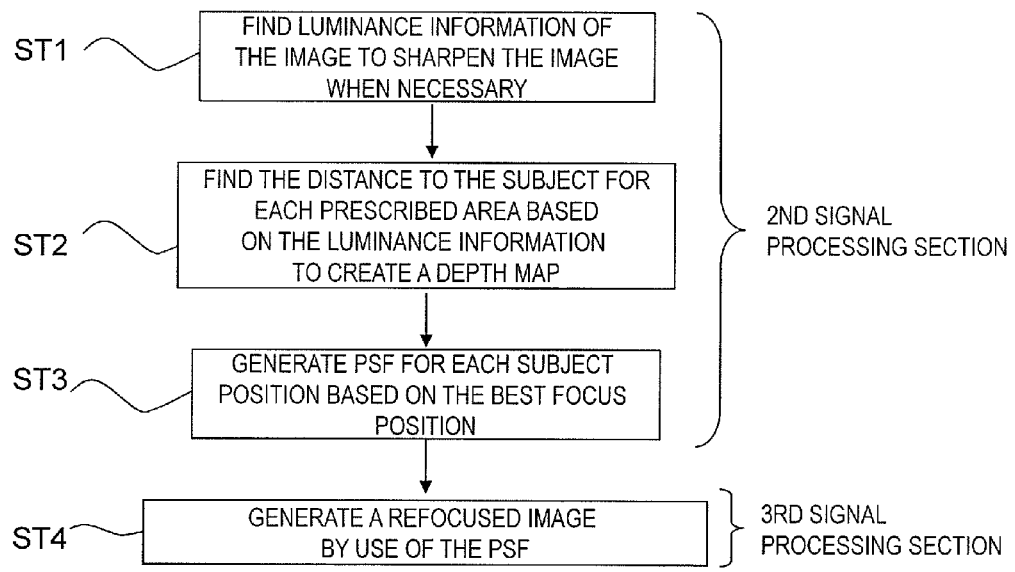
FIG. 23 is a flowchart of a signal processing section in Embodiment 5 according to the present invention.

FIG. 23 is a flowchart showing a process performed by the signal processing sections in this embodiment. The signal processing sections have a function of generating a refocused image. Herein, the term "refocusing" means re-constructing an image focused on a subject located at a desired (any) subject distance by use of an image (picked-up image) obtained by the imaging apparatus. The term "subject distance" means a distance from the imaging apparatus to the subject. By performing refocusing, the sharpness of the subject located at a desired subject distance is made higher than the sharpness of the surrounding area in an image. The "refocused image" means an image in which the sharpness of the subject located at a desired subject distance is made higher than the sharpness of the surrounding area.

As shown in FIG. 23, first in step ST1, luminance information of an image obtained from the imaging element N is found, and the image is sharpened when necessary. A specific example of the "luminance information" is the sharpness, contrast or point spread function. As shown in FIG. 19, the image obtained from the imaging element N can be divided into a first image I1 by the first pixels P1 and a second image I2 by the second pixels P2. In step ST1, the luminance information of the two images I1 and I2 are found.

Next, in step ST2, the luminance information is used to calculate a distance to the subject for each prescribed area of the image, and thus a depth map is created.

Next, in step ST3, a PSF is generated for each subject position based on the position at which the light is to be focused (best focus position). The best focus position may be input by a user from outside the imaging apparatus A or may be determined by the second signal processing section C2 of the imaging apparatus A.

Finally in step ST4, the PSF determined based on the depth map is convoluted to the sharpened image to generate a refocused image at any position. For example, steps ST1 through ST3 are carried out by the second signal processing section C2, and step ST3 is carried out by the third signal processing section C3. The order of step ST1 of sharpening the image and steps ST2 and ST3 may be exchanged with each other when necessary. Hereinafter, each step of the flowchart will be specifically described.

First, step ST1 will be described. In the following example, the "luminance information" is the sharpness.

In the optical system of the imaging apparatus A in FIG. 19, the optical area D1 has a planar face, and the optical area D2 has an aspheric shape. For simplifying the explanation, the following description will be given with an assumption that the lens L2 is an ideal lens with no aberration.

Figure 24:
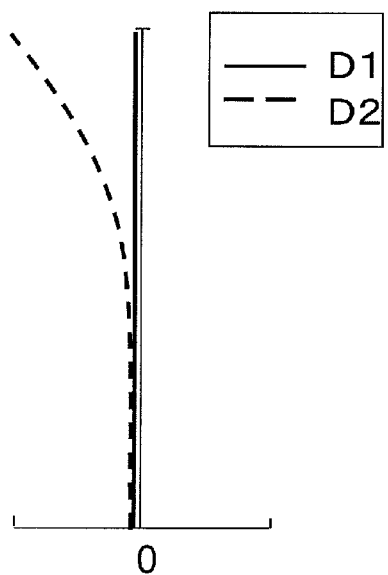
FIG. 24 is a graph showing spherical aberrations by light rays which have passed an optical area D1 and an optical area D2 in Embodiment 5 according to the present invention.

Since the optical area D1 has a planar face, the light rays which have passed the optical area D1 and the lens L2 do not cause a spherical aberration as is shown with the solid line in FIG. 24. When there is no spherical aberration, the point spread function changes more in a direction shifted from the focal point. Namely, the point spread function changes in accordance with the change of the subject distance.

Owing to the aspheric shape of the optical area D2, the light rays which have passed the optical area D2 and the lens L2 cause a spherical aberration represented with the dashed line in the graph of FIG. 24. By adjusting the aspheric shape of the optical area D2, such a spherical aberration can be provided. Owing to such a spherical aberration, the point spread function by the light rays which have passed the optical area D2 can be made approximately constant in a prescribed range in the vicinity of the focal point of the lens optical system L. Namely, the point spread function can be made approximately constant in a prescribed range of subject distance.

Figure 25:
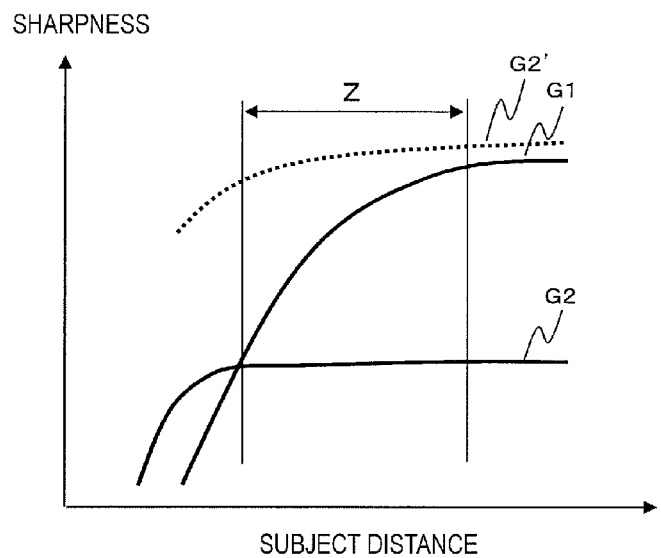
FIG. 25 is a graph showing the relationship between the subject distance and the sharpness (sharpness of the image) in Embodiment 5 according to the present invention.

As the point spread function changes, the sharpness also changes. As the size of the point image is decreased, the sharpness of the image is raised. Therefore, the relationship between the subject distance and the sharpness is as shown in the graph of FIG. 25. In the graph of FIG. 25, G1 represents the sharpness in a prescribed area of an image obtained by the pixels P1 (first image I1). G2 represents the sharpness in a prescribed area of an image obtained by the pixels P2 (second image I2).

The sharpness can be found based on the difference between luminance values of pixels adjacent to each other in a prescribed size of image block. Alternatively, the sharpness can be found based a frequency spectrum obtained by Fourier transform performed on the luminance distribution of a prescribed size of image block.

For finding the sharpness based on the difference between luminance values of adjacent pixels, expression 11, for example, is used. E is the sharpness of a prescribed size of image block.

$$E = \sum_i \sum_j \sqrt{(\Delta x_{i,j})^2 + (k\Delta y_{i,j})^2}$$ [Expression 11]

In expression 11, $\Delta x_{i,j}$ is the difference between the luminance value of the pixel at the coordinates (i,j) and the luminance value of the pixel at the coordinates (i+1,j) in a prescribed size of image block. $\Delta y_{i,j}$ is the difference between the luminance value of the pixel at the coordinates (i,j) and the luminance value of the pixel at the coordinates (i,j+2) in the prescribed size of image block. k is the coefficient. A reason why the luminance value of $\Delta y_{i,j}$ in the y direction is calculated by use of the coordinate j and the coordinate j+2 is that in an image obtained by each of the pixels P1 and P2, the luminance information in the longitudinal direction (y direction) is formed for every other pixel. It is desirable to multiply $\Delta y_{i,j}$ by a prescribed coefficient (e.g., k=0.5).

In each of the first and second images I1 and I2, the luminance information of the image in the y direction is missing at every other pixel. The missing pixel luminance information of the pixels may be generated by interpolation by use of the luminance information of the pixel adjacent in the y direction to the pixel, the luminance information of which is missing. For example, in the case where the luminance information at the coordinates (i, j+1) is missing, the luminance information at the coordinates (i,j) and the luminance information at the coordinates (i, j+1) may be averaged to interpolate the luminance information at the coordinates (i,j+1). For finding the sharpness E of the coordinates (i, j+1) by expression 11, k may be set to k=1. $\Delta y_{i,j}$ is the difference between the luminance value of the pixel at the coordinates (i,j) and the luminance value of the pixel at the coordinates (i,j+1) (value interpolated by use of the luminance information at the coordinates (i,j+2)) in the prescribed size of image block. From the calculation of expression 2, as the difference between the luminance values in the prescribed size of image block is larger, a higher sharpness is obtained.

The sharpness of an image can be found by use of expression 11. Alternatively, the sharpness of the image can be found based on a frequency spectrum obtained by Fourier transform performed on the sharpness in a prescribed size of block.

Figure 26A:
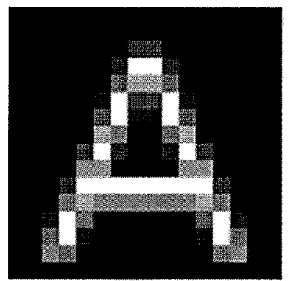
FIGS. 26A through 26C each show a luminance distribution of an image block having a size of 16×16.
Figure 26B:
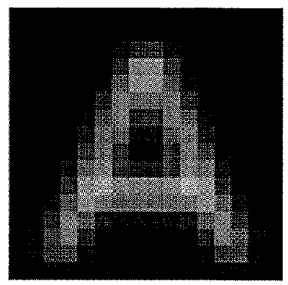
Figure 26C:
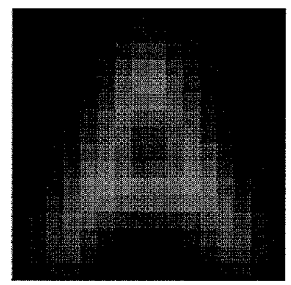
Figure 26D:
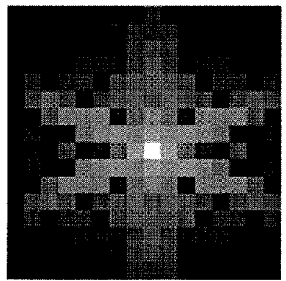
FIGS. 26D through 26F show frequency spectra respectively obtained by two-dimensional Fourier transform of the image blocks shown in FIGS. 26A through 26C.
Figure 26E:
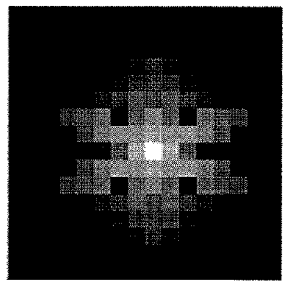
Figure 26F:
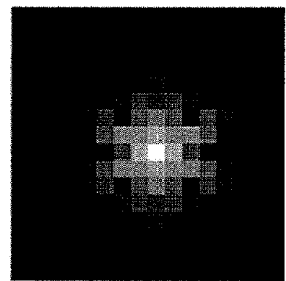

FIGS. 26A through 26C each show a luminance distribution of an image block having a size of 16×16. In the order of FIG. 26A, FIG. 26B and FIG. 26C, the sharpness is decreased. FIGS. 26D through 26F show frequency spectra respectively obtained by two-dimensional Fourier transform of the image blocks shown in FIGS. 26A through 26C. In FIGS. 26D through 26F, the strength of each frequency spectrum is processed with logarithm conversion for display. As the frequency spectrum is stronger, the image is brighter. In each frequency spectrum, the central part having the highest luminance is a DC component, and the frequency is raised in a direction approaching the periphery.

In FIGS. 26D through 26F, it is seen that as the sharpness of the image is decreased, higher frequency spectra are missing. Therefore, the sharpness can be found from such a frequency spectrum by, for example, extracting the entirety, or a part, of the frequency spectrum.

FIG. 27 shows a method for raising the sharpness G2 based on the sharpness G1. FIG. 27A is a monochromatic chart, which is a subject. FIG. 27B is a cross-sectional view of the luminance of the subject shown in FIG. 27A. As shown in FIG. 27B, the luminance cross-section of the chart is step-like. However, when, for example, the chart is located at a prescribed position which is slightly shifted toward the viewer from the subject position at which the light rays reaching the pixels P1 are best focused and an image thereof is picked up, the luminance cross-section of the image is as shown in FIG. 27C. In the graph of FIG. 27C, G1 represents a luminance cross-section of an image generated by the pixels P1, and G2 represents a luminance cross-section of an image generated by the pixels P2. As can be seen, the luminance cross-section G1 is closer to the luminance cross-section of the actual chart in FIG. 27B, and is considered to have a higher sharpness, than the luminance cross-section G2.

Figure 27A:
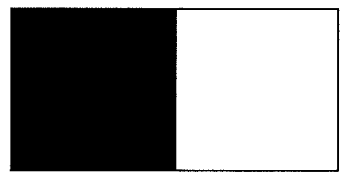
FIG. 27A is a monochromatic chart, which is a subject.
Figure 27B:
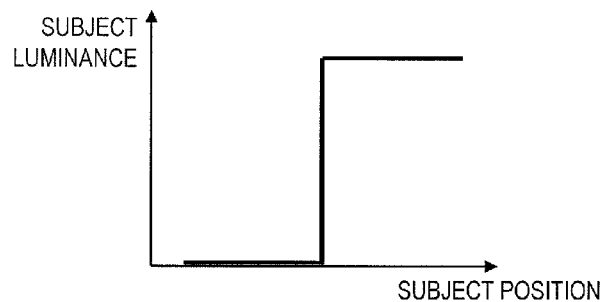
FIG. 27B is a cross-sectional view of the luminance of the subject shown in FIG. 27A.
Figure 27C:
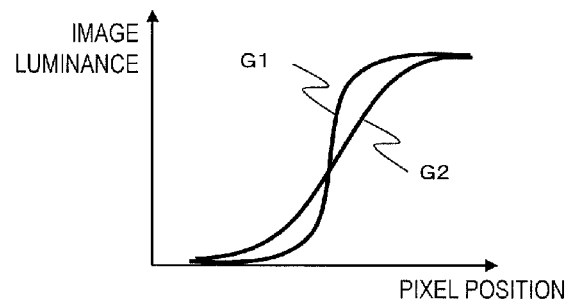
FIG. 27C is a cross-sectional view of the luminance of the image picked up by the imaging apparatus A in FIG. 19.
Figure 27D:
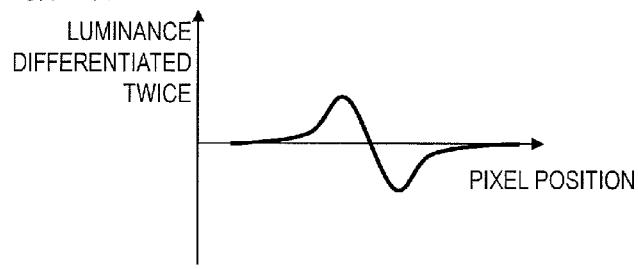
FIG. 27D shows the result of differentiation performed twice on the luminance of G1 in FIG. 27C.
Figure 27E:
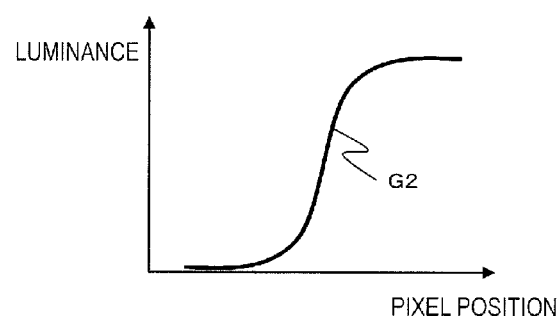
FIG. 27E is a cross-sectional view of the luminance when the result of differentiation performed twice in FIG. 27D is subtracted from the luminance of G2 in FIG. 27C.

When the luminance cross-section G1 having a high sharpness is differentiated twice, the distribution in FIG. 27D is obtained. Thus, an edge of the image of G1 can be detected. Next, the distribution of FIG. 27D is subtracted from the luminance distribution of G2 in FIG. 27C. As a result, the distribution of FIG. 27E is obtained. Thus, the sharpness of the luminance distribution of G2 can be raised. For subtracting the distribution of FIG. 27D, the distribution of FIG. 27D may be first multiplied by a prescribed coefficient and then the resultant value may be subtracted from the luminance distribution of G2. Thus, how much the sharpness G2 is to be raised can be controlled.

In this embodiment, for simpler explanation, the process of sharpening the image is performed one-dimensionally. However, since the image is two-dimensional, an actual sharpening process is performed two-dimensionally.

By the above-described image process, the sharpness G2 represented with the solid line in FIG. 25 can be raised to sharpness G2' represented with the dashed line. Thus, the image to be generated can be sharpened.

Figure 28:
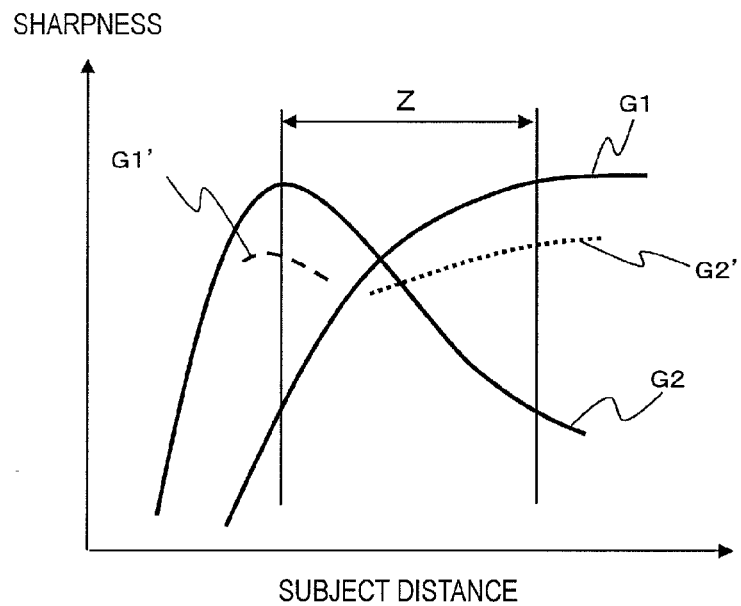
FIG. 28 is a graph showing the relationship between the subject distance and the sharpness (sharpness of the image) in Embodiment 5 according to the present invention.

FIG. 28 is a graph showing the relationship between the subject distance and the sharpness in the case where the surface of the optical area D2 shown in FIG. 19 is changed from the aspheric shape to a spherical shape. Even in this case, like in the case FIG. 25, the image can be sharpened.

In this embodiment, as shown in FIG. 28, the component having a high sharpness is varied in accordance with the subject distance. Therefore, the luminance cross-sections G1 and G2 may be used to detect the respective sharpness so that a component having the higher sharpness is selected to sharpen the other component.

By the above-described image process, the sharpness G1 and the sharpness G2 represented with the solid lines in FIG. 28 can be raised to the sharpness G1' and the sharpness G2' represented with the dashed lines. Thus, the image to be generated can be sharpened.

Figure 29:
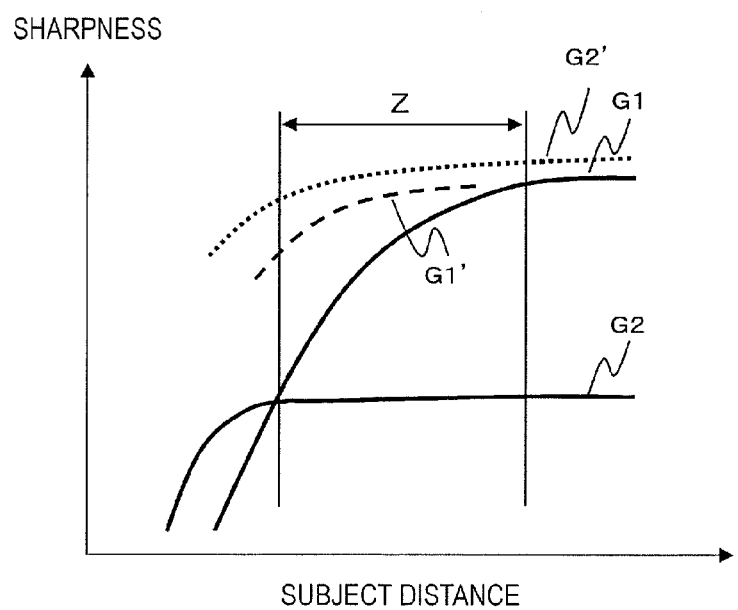
FIG. 29 is a graph showing the relationship between the subject distance and the sharpness (sharpness of the image) in Embodiment 5 according to the present invention.

Now, another technique for sharpening an image will be described. FIG. 29 shows a method for raising the sharpness G1 based on the sharpness G2' obtained by raising the sharpness G2. The structure of the optical areas D1 and D2 is the same as in FIG. 25. The point spread function formed by the light rays which have passed the optical area D2 is approximately constant within a prescribed range of subject distance. Therefore, the point spread function formed by extracting the pixels P2 (G2 component) is approximately constant within a prescribed range of subject distance. When the point spread function is approximately constant within a prescribed range of subject distance, the image formed by extracting the pixels P2 (G2 component) can be recovered based on a prescribed point spread function regardless of the subject distance.

Hereinafter, a method for recovering a picked-up image based on the point spread function will be described. Where the original image is f(x,y) and the point spread function is h(x,y), the picked-up image g(x,y) can be represented by expression 12.

$$g(x,y)=f(x,y) \otimes h(x,y) \qquad \text{[Expression 12]}$$

($\otimes$ represents convolution.)

Expression 13 is obtained by Fourier transform performed on both sides of expression 12.

$$G(u,v)=F(u,v)H(u,v) \qquad \text{[Expression 13]}$$

By applying the inverse filter Hinv(u,v) of expression 14 to the deteriorated image G(u,v), the two-dimensional Fourier transform F(u,v) of the original image is found as in expression 15. By processing this by inverse Fourier transform, the original image f(x,y) can be obtained as the recovered image.

$$Hinv(u, v) = \frac{1}{H(u, v)} \qquad \text{[Expression 14]}$$

$$F(u, v) = Hinv(u, v)G(u, v) \qquad \text{[Expression 15]}$$

However, when H(u,v) is 0 or an extremely small value, Hinv(u,v) is diverged. Therefore, the Wiener filter Hw(u,v) as in expression 16 is used to recover the deteriorated image.

$$Hw(u, v) = \frac{1}{H(u, v)} \frac{|H(u, v)|^2}{|H(u, v)|^2 + |N(u, v)|^2/|F(u, v)|^2} \qquad \text{[Expression 16]}$$

In expression 16, N(u,v) is noise. Usually, the noise and the original image F(u,v) are unknown. Therefore, in actuality, constant k is used to recover the deteriorated image by the filter of expression 17.

$$Hw(u, v) = \frac{1}{H(u, v)} \frac{|H(u, v)|^2}{|H(u, v)|^2 + k} \qquad \text{[Expression 7]}$$

By use of such a recovery filter, the sharpness G2 represented with the solid line in FIG. 29 can be raised to the sharpness G2' represented with the dotted line. In addition, like in the method described with reference to FIG. 27, the luminance cross-section G2' is differentiated twice, and the resultant value is subtracted from G1. In this manner, the sharpness G1 can be raised to the sharpness G1' represented with the dashed line in FIG. 29.

By the above-described image process, the sharpness G2 and the sharpness G1 represented with the solid lines in FIG. 29 are improved to the sharpness G2' represented with the dotted line and the sharpness G1' represented with the dashed line. Such a sharpening process can extend the depth of the subject as compared with the sharpening process shown in FIG. 25.

Now, the creation of a depth map in step ST2 in FIG. 23 will be specifically described. The depth map is created by finding the subject distance for each prescribed area of the picked-up image (for each operation block).

To the second signal processing section C2 shown in FIG. 19, the first image I1 (shown in FIG. 19) obtained by extracting the pixels P1 (G1 component) and the second image I2 obtained by extracting the pixels P2 (G2 component) are input. Since the optical characteristics of the two optical areas D1 and D2 are different from each other, the sharpness of each of the first and second images I1 and I2 (value calculated by use of the luminance) varies in accordance with the subject distance. On the storage section Me (shown in FIG. 19), the correlation between the light which has passed each of the optical areas D1 and D2 and the subject distance is stored. The third signal processing section C3 (shown in FIG. 19) can obtain the distance to the subject based on the sharpness of each of the first and second images I1 and I2 and the correlation.

Range Z in FIG. 25 and FIG. 29 is an area where G1 changes and G2 does not change almost at all. In the range Z, the subject distance can be found by use of such relationship. For example, in the range Z, the subject distance and the ratio between the sharpness G1 and the sharpness G2 are correlated to each other. Therefore, the correlation of the subject distance with respect to the ratio between the sharpness G1 and the sharpness G2 is stored in advance on the storage section Me.

When the imaging apparatus is used, the sharpness ratio between the first image I1 generated only of the pixels P1 (G1 component) and the second image I2 generated only of the pixels P2 (G2 component), among the data (picked-up image) obtained as a result of a single image capture, is found for each operation block. Then, the subject distance can be found by use of the correlation stored on the storage section Me. Specifically, the value of the sharpness ratio in the correlation and the value of the sharpness ratio between the first image I1 and the second image I2 are compared with each other for each operation block. When the values match each other, the subject distance corresponding to the matching value is set as the distance to the subject at the time of image capture.

In order to uniquely find the subject distance from the ratio between the sharpness of the first image I1 generated only of the pixels P1 and the sharpness of the second image I2 generated only of the pixels P2, all the sharpness ratios need to be different in a prescribe range of subject distance.

In FIG. 25, FIG. 28 and FIG. 29, all the sharpness ratios are different in the range Z. Therefore, the subject distance can be uniquely found. When the value of sharpness is too low, the ratio cannot be found. Therefore, the value of sharpness may be at least a certain value.

The relationship between the subject distance and the sharpness is determined by the radius of curvature, the aspheric coefficient and the refractive index of the optical areas D1 and D2. Namely, the optical areas D1 and D2 need to have such optical characteristics that all the ratios between the sharpness of the first image I1 and the sharpness of the second image I2 are different within a prescribed range of subject distance.

In this embodiment, any value calculated by use of luminance (luminance information), for example, a contrast may be used to find the subject distance, instead of the sharpness. The contrast can be found from, for example, the ratio between the maximum luminance value and the minimum luminance value in a prescribed operation block. The sharpness is a difference between the luminance values, whereas the contrast is a ratio between the luminance values. The contrast may be found from a ratio between one point having the maximum luminance value and one point having the minimum luminance value, or, for example, from a ratio between an average value of several points having higher luminance values and an average value of several points having lower luminance values. For finding the subject distance by use of the contrast, the correlation between the subject distance and the contrast ratio is stored in advance on the storage section Me as in the case where the sharpness is used. By finding the contrast ratio between the first image I1 and the second image I2 for each operation block, the subject distance can be found by use of the correlation.

In this embodiment, the subject distance may be found by use of a value other than the sharpness or the contrast, for example, the point spread function. Hereinafter, a method for finding the point spread function from the first image I1 and the second image I2 will be described.

By recovering the second image I2 generated only of the pixels P2 (G2 component) by use of expression 17 described above, a recovered image i2'(x,y) extremely close to the original image f(x,y) is found. Where the first image generated only of the pixels P1 (G1 component) is i1(x,y) and the point spread function by the light rays which have passed the optical area D1 is h1(x,y), i1(x,y) can be represented by expression 18.

$$i1(x,y) \approx i2'(x,y) \otimes h1(x,y) \qquad \text{[Expression 18]}$$

($\otimes$ represents convolution.)

Expression 19 is obtained by Fourier transform of expression 18.

$$I1(u,v) \approx I2'(u,v)H1(u,v) \qquad \text{[Expression 9]}$$

By deforming expression 19, value H1(u,v) of the frequency area of the point spread function h1(x,y) is found as in expression 20.

$$H1(u, v) \approx \frac{I1(u, v)}{I2'(u, v)} \quad \text{[Expression 20]}$$

By performing inverse Fourier transform on this expression, the point spread function h1(x,y) by the light rays which have passed the optical area D1 can be found.

The point spread function h1(x,y) by the light rays which have passed the optical area D1 varies in accordance with the subject distance. Therefore, the point spread function h1(x,y) and the subject distance are correlated to each other. The subject distance can be found by use of this correlation.

When the point spread function is expressed by a representative numerical value, the diameter of the point spread function, for example, is usable. Like in the case where the sharpness or the contrast is used, the correlation between the subject distance and the diameter of the point image is stored in advance on the storage section Me. The point spread function is found from the first image I1 and the second image I2 for each block, and the diameter of the point image is found from the point spread function. Thus, the subject distance can be found by use of the correlation. The diameter of the point image can be found from, for example, the half bandwidth of the point spread function.

In this embodiment, a structure of generating an image which is a sum of the first image I1 and the second image I2 may be included in the case where the optical areas have different radii of curvature as shown in FIG. 28. The range of distance at which the sharpness is at least a certain value in an image generated by adding the first image I1 and the second image I2 together is larger than each of the first image I1 and the second image I2. In this case, the ratio between the sharpness of the image generated by the addition and the sharpness of either the first image I1 or the second image I2 is correlated to the subject distance. By storing this correlation in advance, the subject distance can be found for each prescribed area of the image.

Figure 30A:
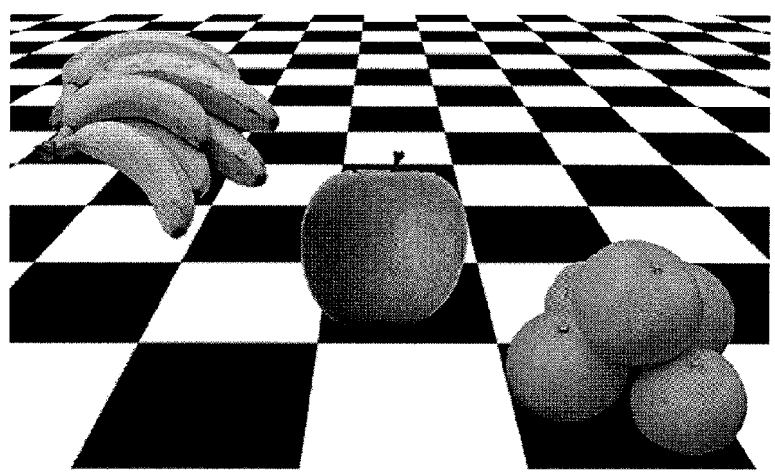
FIG. 30A show a subject image in Embodiment 5 according to the present invention.
Figure 30B:
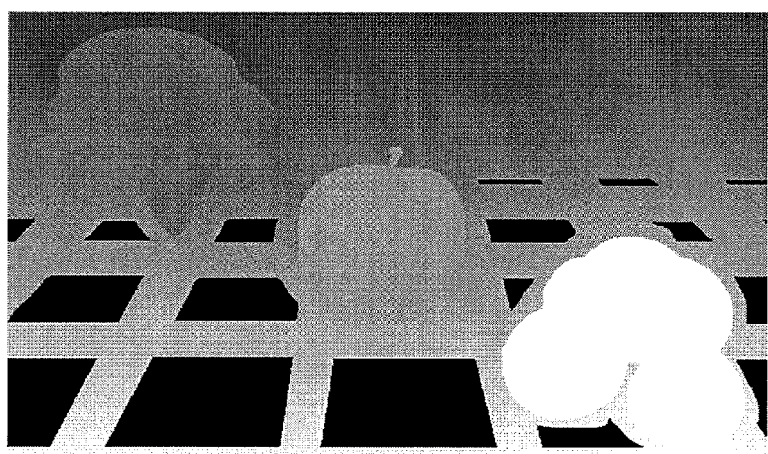
FIG. 30B shows a depth map of the subject image in FIG. 30A.

By calculating the subject distance of the picked-up image and representing the subject distance with a monochromatic luminance value (e.g., 256 gray scales), an image representing depth information is obtained. This is a depth map. FIG. 30A shows a subject image (picked-up image) in this embodiment, and FIG. 30B is a depth map of the subject image of FIG. 30A. The depth map is represented by 256 gray scales. A subject represented with a color closer to white is located closer to the viewer and a subject represented with a color closer to black is located farther from the viewer. In FIG. 30B, completely black areas of the checkered pattern are error areas in distance measurement. Such an error occurs because in a subject image, the sharpness does not change at or in the vicinity the center of a wide area having a uniform luminance value and thus the distance to such a position cannot be measured. However, even an area, the distance to which cannot be measured, does not influence the generation of a refocused image. A reason for this is that at or in the vicinity of the center of a wide area having a uniform luminance value, the sharpness of the image does not change regardless of whether or not there is refocus calculation. The depth map does not need to be represented with 256 gray scales. The depth map may be a 16-bit (65536 gray scale) image. The depth map does not need to be image data but may be numerical data in accordance with the distance. The depth map may include a negative value, and merely needs to represent the relative positions of the subjects.

Now, the generation of the PSF in step ST3 in FIG. 23 will be specifically described. The PSF is generated, for, for example, each subject position (subject distance). Alternatively, the PSF may be generated for each angle of view (pixel or prescribed area).

The shape of the PSF may be represented with a numerical expression, for example, a Gaussian distribution (Gaussian function) shown in expression 21. The reason is as follows. The Gaussian distribution can be obtained each time by simple calculation by applying the PSF of any subject position to the numerical expression, and it is not necessary to store a huge amount of subject PSF data on a memory in advance.

$$\text{Weight}(i, j) = \exp\left(-\frac{i^2 + j^2}{2\sigma^2}\right) \quad \text{[Expression 21]}$$
$$\sigma = k \cdot d + 0.001$$

Here, i is the coordinate of the PSF in the lateral direction, j is the coordinate of the PSF in the longitudinal lateral direction, and (i,j)=(0,0) represents the center of the PSF. Weight(i,j) represents the strength (weight) of the PSF at i,j. d is the subject distance, and the best focus position is represented as the origin (d=0). Herein, the "best focus position" is the position of the subject (subject distance) at which the strength change of the PSF is maximum. When the "strength change of the PSF" is large, the peak of the PSF is sharp, and, for example, the half bandwidth of the peak is small. By contrast, when the "strength change of the PSF" is small, the peak of the PSF is gentle, and, for example, the half bandwidth of the peak is large. k is the coefficient for gain adjustment and adjusts the strength change of the PSF. σ is obtained by adding "0.001". This is the constant for preventing divergence when (i,j)=(0,0), and is set to a sufficiently small value with respect to k·d. This constant does not need to be 0.001, and may be varied when necessary.

FIG. 31 shows a PSF cross-section strength distribution found by the Gaussian distribution of expression 21. The PSF cross-section strength is plotted with j=0, i=−5.5 to 5, and σ=1.4. When i=0 and j=0, the strength of the PSF is maximum, and the distribution is bilaterally symmetric (rotationally symmetric). The PSF strength distribution does not needs to be rotationally symmetric, but desirably is rotationally symmetric in order to generate a natural refocused image with no deviation.

The strength change (sharpness) of the PSF is adjusted by k. The strength change of the PSF needs to be set such that when the subject position is the best focus position, the PSF is sharpest, and as the subject position is farther from the subject position, the PSF becomes gentler. Which subject position is to be the best focus position may be arbitrarily set. The best focus position may be input by a user from outside, or may be determined by the second signal processing section C2. When the best focus position is determined by the user, the user may select an area on the image, and the second signal processing section C2 may find the subject distance of the area selected by user and set the corresponding position as the best focus position. Alternatively, the user may directly select the subject distance. Once the best focus position is determined, the corresponding subject position is set as the origin.

FIG. 32 is a conceptual view of a change of the PSF cross-section strength distribution in the case where a subject position d2 is focused on. In FIG. 32A, at a subject position d3, which is slightly far from the subject position d2, the gradient of the PSF strength is gentler than at the subject position d2. At a subject position d1, which is farther from the subject position d2, the gradient of the PSF strength is still gentler. In the case where the origin of d (=0) is set to the best focus position in expression 21, as the subject position is farther from the best focus position, the absolute value of a becomes greater, and thus the gradient of the PSF strength can be set to be gentler. In the case where the value of k is set to large in expression 21, the degree of change of the PSF strength distribution with respect to the subject position can be adjusted. FIG. 32B shows a case where the value of k is larger than in FIG. 32A. In FIG. 32B, the PSF strength distribution changes more drastically with respect to the subject position than in FIG. 32A. At the same subject position d1 (or d3), the gradient of the PSF strength distribution is gentler in FIG. 32B. In this manner, the value of k may be appropriately adjusted, so that the change of blur of the image described later is adjusted. In expression 21, the expression regarding a linearly changes with respect to d. Instead of a linear function, a nonlinear function such as a quadratic function, a polynomial expression or the like may be used. Use of a nonlinear function can nonlinearly adjust the PSF strength change with respect to the subject position d, namely, the change of blur.

Figure 34A:
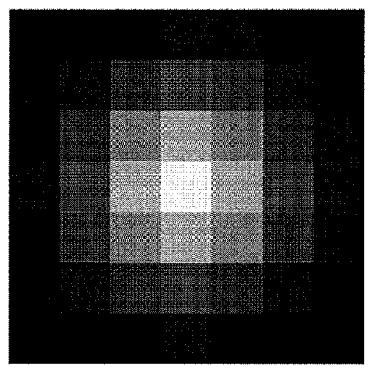
FIGS. 34A and 34B each show a PSF two-dimensional strength distribution in Embodiment 5 according to the present invention.
Figure 34B:
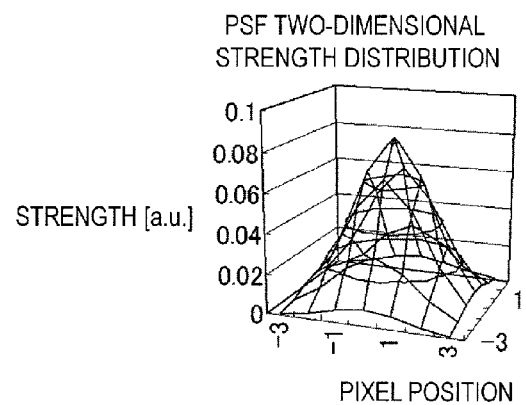

FIG. 32 shows one cross-section of the PSF strength, but PSF is two-dimensional data also present in the depth direction. For actual calculation, a two-dimensional matrix of strength as shown in FIG. 33 may be used. The PSF strength can be found from expression 21 where (i,j)=(0,0) is set as the origin. It is desirable that the number of rows and the number of columns of the matrix are equal to each other, and are an odd number. A reason for this is that the origin can be set to one position at the center of the matrix, and the rotationally symmetric PSF having the center as the axis can be formed. The numbers of rows and columns of the matrix are arbitrary, but as the numbers are larger, the amount of blur can be increased. By contrast as the numbers of rows and columns are smaller, the calculation time can be shortened. FIG. 33A shows a two-dimensional distribution of the PSF strength of a 3×3 matrix, FIG. 33B shows a two-dimensional distribution of the PSF strength of a 5×5 matrix, and FIG. 33C shows a two-dimensional distribution of the PSF strength of a 7×7 matrix. Like in FIG. 31, σ=1.4. The values in the matrix may be normalized such that the sum of all the values in the matrix is 1. Specifically, a numerical value is found by expression 21, then the sum of all the components in the matrix is found, and each component is divided by the sum. Normalization is performed in order to prevent the luminance of the post-convolution image at the time of refocusing from changing. By normalizing the sum of the PSF strength values to 1, the brightness of the image can be kept constant before and after the refocusing. The normalization of the PSF data may be carried out at the time of finding the PSF, or immediately before the refocusing process. As reference, FIG. 34A shows an image obtained by representing the numerical data of the PSF strength distribution in the 7×7 matrix shown in FIG. 33C with 256 gray scales. Similarly, FIG. 34B shows a three-dimensional graph corresponding to FIG. 33C.

For calculating the PSF, an actual PSF value of the optical system may be used instead of the numerical expression. In this case, the PSF of each subject distance needs to be calculated in advance by simulation at a certain interval. This requires a huge capacity of memory for database. By contrast, when the Gaussian distribution represented with a numerical expression is used, the PSF at any subject position can be generated at the time of refocus calculation, which can save the memory and the calculation time. When the PSF is represented with the Gaussian distribution, the PSF when the subject position is the best focus position is 1 at the center and 0 in the surrounding area. Thus, the image at the best focus position is not deteriorated. In other words, the PSF strength change at the best focus position is larger than the PSF strength change at other subject positions, and the PSF strength change is decreased in a direction separating from the best focus position in the direction of the subject distance.

A numerical expression representing the PSF may be anything other than of the Gaussian distribution, and may be, for example, an aspheric expression including high orders.

Now, the generation of a refocused image in step ST4 will be described. This process is performed by use of the subject distance found in step ST2 and the PSF generated in step ST3. This process is carried out by the third signal processing section C3. Convolution of the PSF is performed for each pixel of the sharpened image in correspondence with the depth map in FIG. 30B. For example, assuming that the subject position at a pixel $(i,j)=(i_0,j_0)$ in the depth map is d1 in FIG. 32, a convolution operation is performed on the matrix centered around the pixel $(i_0,j_0)$ of the sharpened image (=matrix having the same numbers of rows and columns as those of the PSF) by use of the PSF of d1. This manipulation is performed on all the pixel in the sharpened image. Owing to this process, the sharpened image has little blur at an arbitrary subject position, whereas in the refocused image, only a desired area is focused in a splendid manner and the remaining area is blurred, namely the focused area and the blurred area are clearly distinguished from each other.

Figure 35:
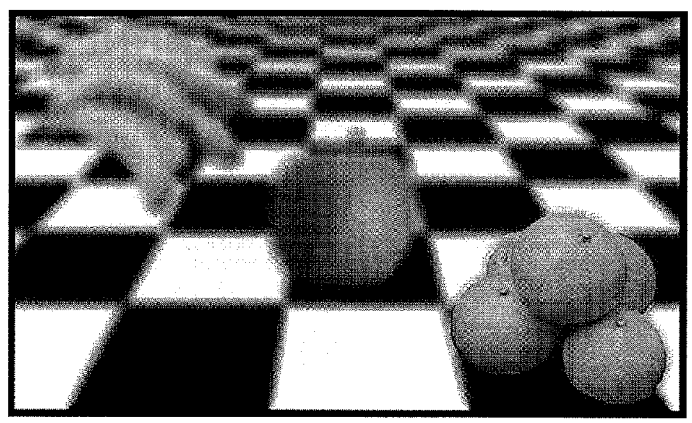
FIG. 35 shows an image obtained by refocusing the subject image of FIG. 30A based on the depth map of FIG. 30B in Embodiment 5 according to the present invention.

FIG. 35 shows an image obtained by refocusing the subject image of FIG. 30A based on the depth map of FIG. 30B. The refocusing process is performed with the best focus position (corresponding to d2 in FIG. 32) being at the mandarin oranges close to the viewer and the matrix area of the PSF being 15×15 (k=1). The image in FIG. 30A is uniformly focused. By contrast, it is seen that in the refocused image in FIG. 35, the focus is on an area closer to the viewer and the remaining background is increasingly blurred in a direction separating from the focused area. The areas where error occurs in distance measurement in FIG. 30B may not be subjected to the refocusing process by separate exception handling. Alternatively, a refocused image may be generated for such areas by an appropriate value of subject distance. A reason for this is that the luminance value is constant in such areas and thus the sharpness is not changed regardless whether the refocusing process is performed or not.

In this embodiment, among the processes in step ST1, only the process of finding the sharpness of the image (luminance information) may be performed and the image sharpening process may be omitted. In this case, the refocusing process may be performed directly on the image (picked-up image) obtained from a sensor (photodiode). The image obtained from the sensor may be the first and second images I1 and I2 shown in FIG. 19 or an image including the images from the first and second pixels P1 and P2. In the case where the sharpening process is omitted, the image of G1 (first image I1) having a higher sharpness in FIG. 29 may be used. Such a process is especially effective for further blurring the blurred area in an emphasizing manner.

Alternatively, the refocusing process may be performed only on a specific area of the image. Since only an area wished to be blurred is blurred, the calculation time is shortened.

It is not absolutely necessary to use the PSF. For example, blur may be provided by performing a spatial filtering process such as an averaged filtering process or the like only on an area wished to be blurred. Alternatively, an intended subject image may be sharpened by performing a spatial filtering process such as a sharpening filtering process or the like only on an area wished to be sharpened. In these cases, step ST3 in the flowchart in FIG. 23 may not be performed, and in step ST4, an area wished to be blurred (or an area wished to be sharpened) may be determined based on the depth map and the spatial filtering process may be performed.

Now, an example of a method for generating a refocused image in the case where the sharpening process in step ST1 is omitted will be described.

In step ST1, the luminance information of the image is found. After this, a prescribed area having a highest sharpness (focused area) is detected. Based on the depth map created in step ST2, a blurring process is performed on each prescribed area in accordance with the distance from the subject detected as an area having the highest sharpness. For example, the blurring process is performed such that the degree of blurring is higher in an area having a longer distance from the subject detected as an area having the highest sharpness than in an area having a shorter distance from the subject. Owing to this, the area which is not focused on and blurs can be further blurred in an emphasizing manner. In addition, the area detected as having the highest sharpness may be sharpened by use of a recovery filter or a spatial filter. Owing to this, a sharp area and a blurred area in an picked-up image can be distinguished more clearly. When the sharpening is performed by use of a recovery filter in this method, a PSF (point spread function) held by a function may be used or a PSF pre-found for each subject distance based on the characteristics of the optical system may be held and used. It is desirable that the PSF for each angle view is held and used. Owing to this, sharpening can be performed more precisely.

Regarding the convolution of the ends of the image, a separate bifurcation calculation may be performed because the number of pixels of the original image is insufficient. For example, a part of the PSF may be used for the calculation in accordance with a part of the vignetting at the ends of the image.

For the PSF convolution operation, Fourier transform may be used. For example, DFT (Discrete Fourier Transform) or FFT (Fast Fourier Transform) may be used to shorten the calculation time. Such a manner of calculation is especially effective when an area having a constant subject distance (prescribed area) is large. For the operation, the area having a constant subject distance is set as one block. For example, a PSF matrix matching the size of the image block for the operation may be generated and subjected to Fourier transform, and the calculation may be performed on the frequency space. When Fourier transform is used, the convolution operation can be made by use of the logical product of components on the frequency space. Therefore, the amount of calculation is significantly reduced. The logical product is obtained on the frequency space, and then is subjected to inverse Fourier transform. Thus, substantially the same image as obtained by the convolution operation can be obtained.

The optical system of the imaging apparatus in this embodiment may be an image-side telecentric optical system. Owing to this, even if the angle of view is changed, the principal light rays are incident on the optical array element K at an angle close to 0°. Therefore, the crosstalk among the light beams reaching the pixels P1 and P2 can be decreased over the entirety of the imaging area.

As described above, in this embodiment, the above description is given with an assumption that the lens L2 is an ideal lens for simplifying the explanation. It is not absolutely necessary to use the ideal lens.

In this embodiment, the optical element L1 and the lens L2 are separate from each other. Alternatively, the lens L2 may have the optical areas D1 and D2 so that the optical element L1 is removed. In this case, the stop S may be located in the vicinity of the optical areas D1 and D2 of the lens L2.

As described above, in this embodiment, both of an image and the subject distance can be obtained by image capture performed by use of a single imaging system (e.g., by a single image capture). Since the subject distance can be calculated for each operation block, the subject distance from any position of the image can be obtained. Therefore, a depth map of the entirety of the image can also be obtained. Owing to this, after the image capture is performed, all the subjects in the image can be focused on.

Since the distance to the subject can be obtained by a single imaging system, it is not necessary to match the characteristics or the positions of a plurality of imaging optical systems unlike in the case where an imaging apparatus including a plurality of imaging optical systems is used. When the imaging apparatus in this embodiment is used to pick up a moving image, even if the position of the subject is changed due to elapse of time, the accurate distance to the subject can be accurately measured.

Embodiment 6

In Embodiment 6, unlike in Embodiment 5, plurality of best focus positions are provided discretely. Herein, the same contents as those of Embodiment 5 will not be described in detail.

Figure 36:
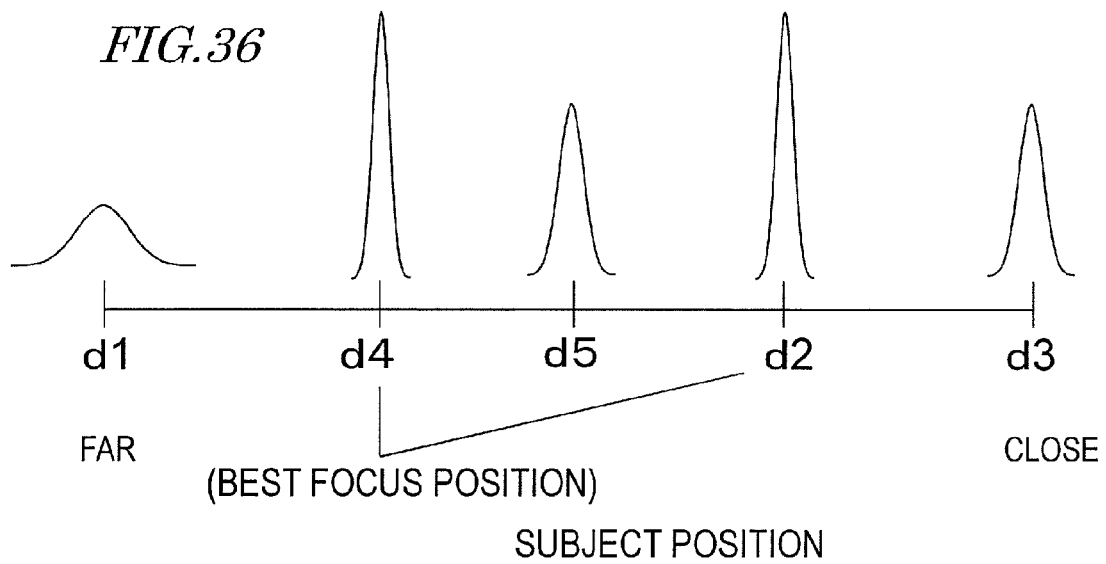
FIG. 36 shows the relationship between the subject position and the PSF in Embodiment 6 according to the present invention.

In this embodiment, as shown in FIG. 36, two or any number of plurality of best focus positions are provided. In addition to the position d2, a position d4 is also the best focus position. At a position d5 between the positions d2 and d4, the PSF strength distribution is gentler than at the positions d2 and d4. The expression that "a plurality of best focus positions are provided discretely" means that there are a plurality of points (best focus positions) at which the PSF strength change is maximum, and the PSF strength change at a position between the plurality of best focus positions is smaller than the strength change at the best focus positions. The degree of the PSF strength change may be different among the plurality of best focus positions.

For setting two best focus positions, $\sigma$ in expression 21 may be represented with a quartic function. It is not absolutely necessary to use a quartic function, and a function of a higher order, an exponent or a logarithmic representation may be used. By use of the method shown in FIG. 36, in the case where a picked-up image including one person closer to the viewer and another person farther from the viewer, both of the two persons can be focused on while the remaining background can be blurred. This is a technology which cannot be realized by the conventional optical system. Even with a blurring effect provided by a single-lens reflex camera having an extremely small F no., only one subject position, namely, the person closer to the viewer, the person farther from the viewer, or a position therebetween, can be focused on. The number of positions focused on is not limited to two, and objects at a larger number of positions can be focused on while the remaining part is blurred.

Embodiment 7

In Embodiment 7, unlike in Embodiment 5, the pixels include filters having spectral transmittance characteristics. Herein, the same contents as those of Embodiment 5 will not be described in detail.

Figure 37:
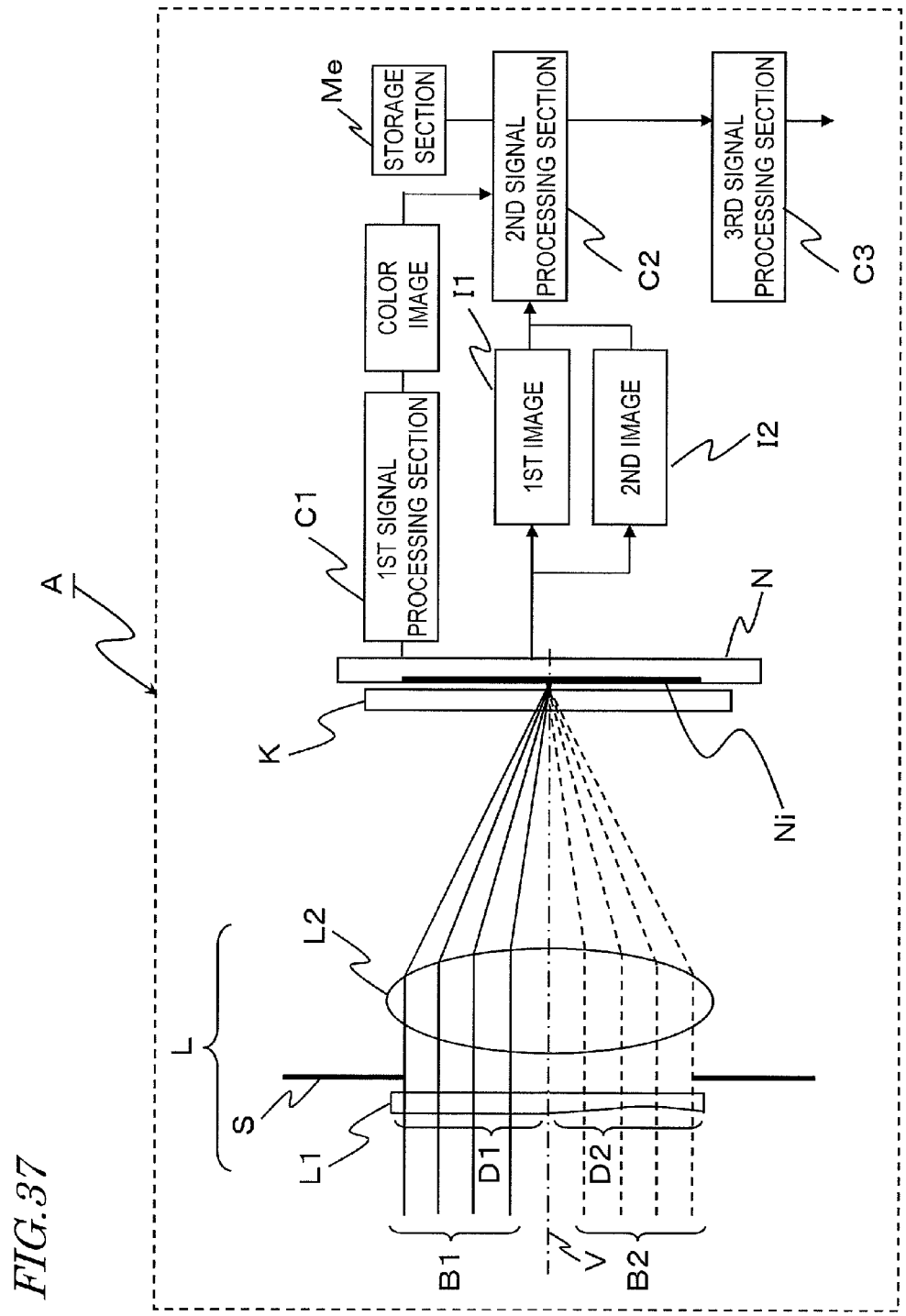
FIG. 37 is a schematic view showing an imaging apparatus A in Embodiment 7 according to the present invention.

FIG. 37 is a schematic view of an imaging apparatus A in Embodiment 7. The imaging apparatus A in this embodiment includes a lens optical system L having an optical axis V, an optical array element K located in the vicinity of the focal point of the lens optical system L, an imaging element N, a first signal processing section C1, a second signal processing section C2, a third signal processing section C3 and a storage section Me.

FIG. 38A is an enlarged view of the optical array element K and the imaging element N shown in FIG. 37.

FIG. 38B shows the positional relationship between the optical array element K and the pixels of the imaging element N. The optical array element K is located such that a face thereof at which the optical components M1 are formed is directed toward an imaging plane Ni. Pixels P are arrayed in rows and columns on the imaging plane Ni. The pixels P may be classified into pixels P1, P2, P3 and P4.

The pixels P1 and P2 include a filter having a first spectral transmittance characteristic. This filter mainly passes light rays in a green range and absorbs light rays of the other ranges. The pixels P3 include a filter having a second spectral transmittance characteristic. This filter mainly passes light rays in a red range and absorbs light rays of the other ranges. The pixels P4 include a filter having a third spectral transmittance characteristic. This filter mainly passes light rays in a blue range and absorbs light rays of the other ranges.

The pixels P1 and the pixels P3 are located alternately in the same rows. The pixels P2 and the pixels P4 are located alternately in the same rows. The rows of pixels P1 and the pixels P3 and the rows of pixels P2 and the pixels P4 are located alternately in a longitudinal direction (column direction). In this manner, the plurality of pixels P1, P2, P3 and P4 are in the Bayer array. In the case where the pixels P1, P2, P3 and P4 are in the Bayer array, the pixels P1 and P2, which include a filter for transmitting light of a green range, are located obliquely in a plane of the imaging plane Ni. The positions of the pixels P3 and P4 may be opposite to each other.

The optical array element K is located such that one of the optical components M1 corresponds to two rows of the pixels including one row of the pixels P1 and P3 and one row of the pixels P2 and P4 on the imaging plane Ni. On the imaging plane Ni, microlenses Ms are provided so as to cover surfaces of the pixels P1, P2, P3 and P4.

The optical array element K is designed such that a light beam B1 (light beam B1 represented with the solid line in FIG. 37) which has passed the optical area D1 (shown in FIG. 37 and FIG. 20) on the optical element L1 mostly reaches the pixels P1 and P3 on the imaging plane Ni and such that a light beam (light beam B2 represented with the dashed line in FIG. 37) which has passed the optical area D2 mostly reaches the pixels P2 and P4 on the imaging plane Ni. Specifically, the above-described structure is realized by appropriately setting parameters such as the refractive index of the optical array element K, the distance from the imaging plane Ni, the radius of curvature of the surface of the optical elements M1 and the like.

The stop S is an area which passes light beams of all the angles of view. Therefore, by inserting a face, having an optical characteristic for controlling the focusing characteristic, in the vicinity of the stop S, the focusing characteristics of the light beams of all the angles of view can be controlled. Namely, in this embodiment, the optical element L1 may be provided in the vicinity of the stop S. By locating the optical areas D1 and D2 having optical characteristics which provide different focusing characteristics from each other in the vicinity of the stop S, the light beams can be provided with the focusing characteristics suitable to the number of divided optical areas.

In FIG. 37, the optical element L1 is provided at such a position that light which has passed the optical element L1 is incident on the stop S directly (without passing any other optical member). The optical element L1 may be provided on the side of the imaging element N with respect to the stop S. In this case, the optical element L1 may be provided between the stop S and the lens L2 so that the light which has passed the stop S can be incident on the optical element L1 directly (without passing any other optical member).

The optical array element K has a function of distributing the outgoing direction in accordance with the angle of incidence of the light rays. Therefore, the optical array element K can distribute the light beams toward the pixels on the imaging plane Ni so as to correspond to the optical areas D1 and D2 separated from each other in the vicinity of the stop S.

The first signal processing section C1 (shown in FIG. 37) generates a color image by use of luminance information of the plurality of pixels P1, P2, P3 and P4. Hereinafter, a specific method for generating a color image will be described.

In the optical system of the imaging apparatus A shown in FIG. 37, the optical area D1 has a planar face, and the optical area D2 has an aspheric shape. For simplifying the explanation, the following description will be given with an assumption that the lens L2 is an ideal lens with no aberration.

Since the optical area D1 has a planar face, the light rays which have passed the optical area D1 and the lens L2 do not cause a spherical aberration as is shown with the solid line in the graph of FIG. 24. When there is no spherical aberration, the point spread function changes more in a direction shifted from the focal point. Namely, the point spread function changes in accordance with the change of the subject distance.

Owing to the aspheric shape of the optical area D2, the light rays which have passed the optical area D2 and the lens L2 cause a spherical aberration represented with the dashed line in the graph of FIG. 24. By adjusting the aspheric shape of the optical area D2, such a spherical aberration can be provided. Owing to such a spherical aberration, the point spread function by the light rays which have passed the optical area D2 can be made approximately constant in a prescribed range in the vicinity of the focal point of the lens optical system L. Namely, the point spread function can be made approximately constant in a prescribed range of subject distance.

Figure 39:
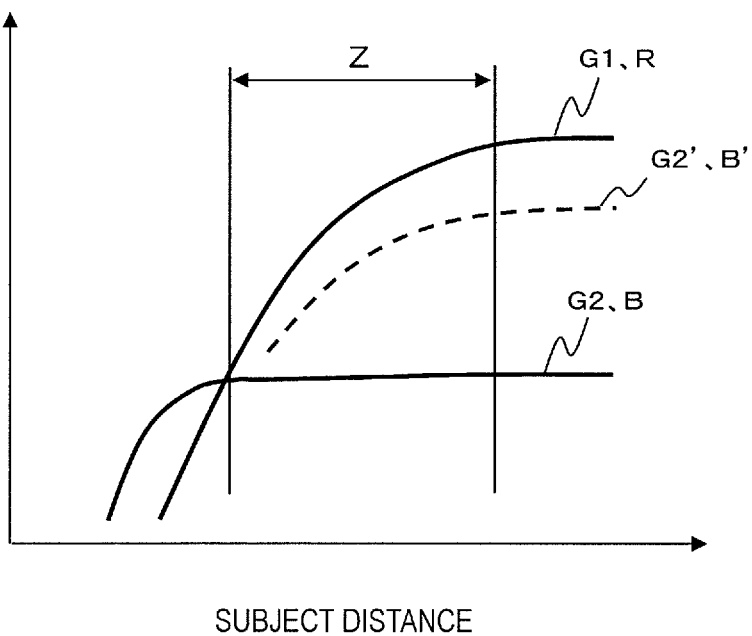
FIG. 39 is a graph showing the relationship between the subject distance and the sharpness (sharpness of the image) in Embodiment 7 according to the present invention.

As the point spread function changes, the sharpness also changes. As the size of the point image is decreased, the sharpness of the image is raised. Therefore, the relationship between the subject distance and the sharpness is as shown in the graph of FIG. 39. In the graph of FIG. 39, G1 and R each represent the sharpness in a prescribed area of an image generated by each of the pixels P1 (green component) and the pixels P3 (red component). G2 and B each represent the sharpness in a prescribed area of an image generated by the pixels P2 (green component) and the pixels P4 (blue component).

The sharpness can be found based on the difference between luminance values of pixels adjacent to each other in a prescribed size of image block. Alternatively, the sharpness can be found based a frequency spectrum obtained by Fourier transform performed on the luminance distribution of a prescribed size of image block.

For finding the sharpness for each component of the pixels P1, P2, P3 and P4 based on the difference between luminance values of adjacent pixels, expression 22, for example, is used. E is the sharpness of a prescribed size of block.

$$E = \sum_i \sum_j \sqrt{(\Delta x_{i,j})^2 + (\Delta y_{i,j})^2} \qquad \text{[Expression 22]}$$

As described above, the pixels P1, P2, P3 and P4 are in the Bayer array. Therefore, in order to find the sharpness of each component, image information of every other pixel is extracted in both of x and y directions of the image for calculation.

In expression 22, $\Delta x_{i,j}$ is the difference between the luminance value of the pixel at the coordinates (i,j) and the luminance value of the pixel at the coordinates (i+2,j) in a prescribed size of image block. $\Delta y_{i,j}$ is the difference between the luminance value of the pixel at the coordinates (i,j) and the luminance value of the pixel at the coordinates (i,j+2) in the prescribed size of image block.

From the calculation of expression 22, as the difference between the luminance values in the prescribed size of image block is larger, a higher sharpness is obtained.

A color image may be generated by simply complementing missing color information for each pixel position based on the luminance information of the pixels P1, P2, P3 and P4. Alternatively, the color image may be generated after the sharpness G1, R is raised because the sharpness G2, B is lower than the sharpness G1, R as shown in FIG. 39.

FIG. 40 shows a method for raising the sharpness G2, B based on the sharpness G1, R. FIG. 40A is a monochromatic chart, which is a subject. FIG. 40B is a cross-sectional view of the luminance of the subject shown in FIG. 40A. As shown in FIG. 40B, the luminance cross-section of the chart is step-like. However, when, for example, the chart is located at a prescribed position which is slightly shifted toward the viewer from the subject position at which the light rays reaching the pixels P1 and P3 are best focused and an image thereof is picked up, the luminance cross-section of the image is as shown in FIG. 40C. In the graph of FIG. 40C, G1 and R each represent a luminance cross-section of an image generated by each of the pixels P1 (green component) and the pixels P3 (red component), and G2 and B each represent a luminance cross-section of an image generated by each of the pixels P2 (green component) and the pixels P4 (blue component). As can be seen, the luminance cross-section G1, R is closer to the luminance cross-section of the actual chart in FIG. 40B, and is considered to have a higher sharpness, than the luminance cross-section G2, B.

Figure 40A:
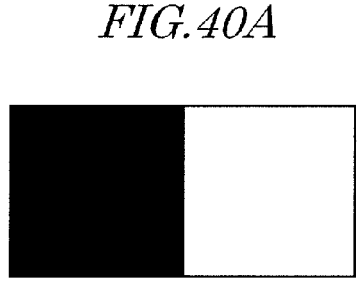
FIG. 40A is a monochromatic chart, which is a subject.
Figure 40B:
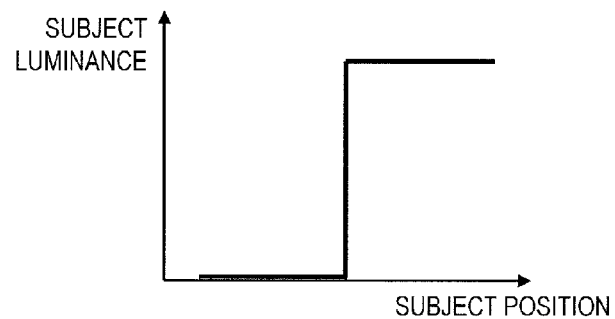
FIG. 40B is a cross-sectional view of the luminance of the subject shown in FIG. 40A.
Figure 40C:
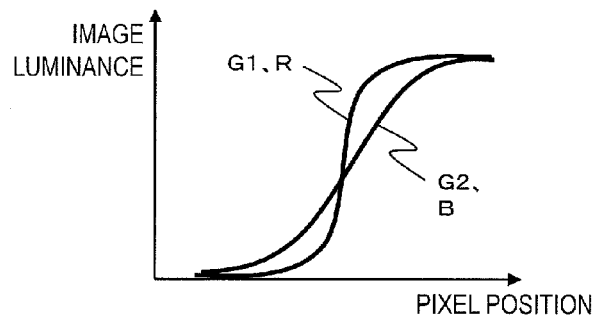
FIG. 40C is a cross-sectional view of the luminance of each color of the image picked up by the imaging apparatus A in FIG. 37.
Figure 40D:
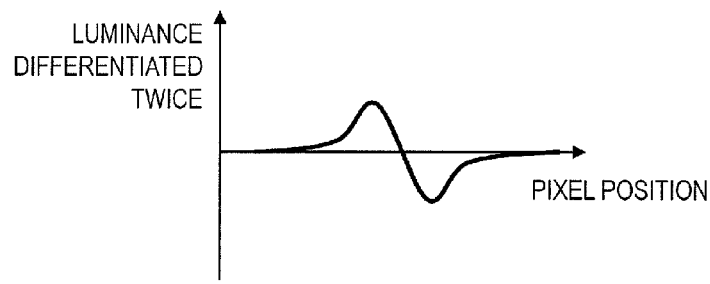
FIG. 40D shows the result of differentiation performed twice on the luminance of G1 (green) and R (red) in FIG. 40C.
Figure 40E:
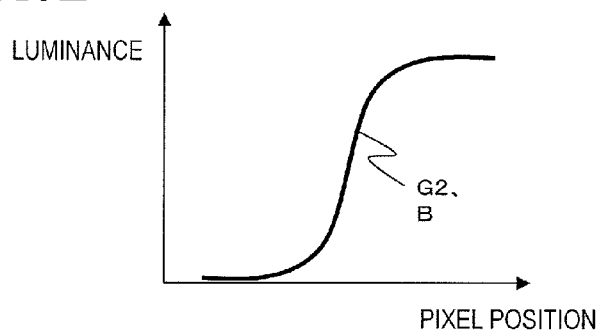
FIG. 40E is a cross-sectional view of the luminance when the result of differentiation performed twice in FIG. 40D is subtracted from the luminance of G2 (green) and B (blue) in FIG. 40C.

When an image of the monochromatic chart as shown in FIG. 40A is picked up, the luminance cross-section G1 and the luminance cross-section B are almost the same. However, in actuality, since the subject image of all the color components is picked up, the luminance cross-section G1 and the luminance cross-section R in FIG. 40C do not match each other in most of the cases. Therefore, the luminance cross-sections G1 and R may be used to detect the respective sharpness so that a color component having a high sharpness is selected to raise the sharpness of the luminance cross-section G2, B. When a luminance cross-section having a high sharpness is selected and differentiated twice, the distribution in FIG. 40D is obtained. Thus, an edge of the image of a color component having a high sharpness can be detected. Next, the distribution of FIG. 40D is subtracted from the luminance distribution of G2, B of FIG. 40C. As a result, the distribution of FIG. 40E is obtained. Thus, the sharpness of the luminance distribution of G2, B can be raised. For subtracting the distribution of FIG. 40D, the distribution of FIG. 40D may be first multiplied by a prescribed coefficient and then the resultant value may be subtracted from the luminance distribution of G2, B. Thus, how much the sharpness G2, B is to be raised can be controlled.

In this embodiment, for simpler explanation, the process of raising the sharpness of the image is performed one-dimensionally. However, since the image is two-dimensional, an actual sharpening process is performed two-dimensionally.

By the above-described image process, the sharpness G2, B represented with the solid line in FIG. 39 can be raised to sharpness G2', B' represented with the dashed line. Thus, the color image to be generated can be sharpened.

Figure 41:
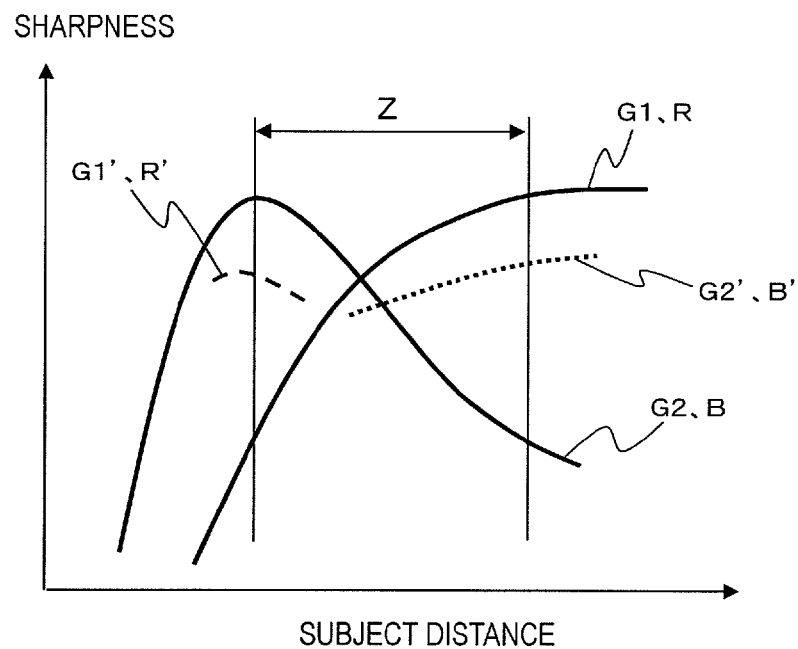
FIG. 41 is a graph showing the relationship between the subject distance and the sharpness (sharpness of the image) in Embodiment 7 according to the present invention.

FIG. 41 is a graph showing the relationship between the subject distance and the sharpness in the case where the optical face of the optical area D2 shown in FIG. 37 is changed from the aspheric shape to a spherical shape. Even in this case, like in the case of FIG. 39, the color image can be sharpened.

In this embodiment, as shown in FIG. 41, the color component having a high sharpness is varied in accordance with the subject distance. Therefore, the luminance cross-sections G1, G2, R and B may be used to detect the respective sharpness so that a color component having the highest sharpness is selected to raise the sharpness of the other color components.

By the above-described image process, the sharpness G1, G2, R, B represented with the solid lines in FIG. 41 can be raised to the sharpness G1', G2', R', B' represented with the dashed lines. Thus, the color image to be generated can be sharpened.

Figure 42:
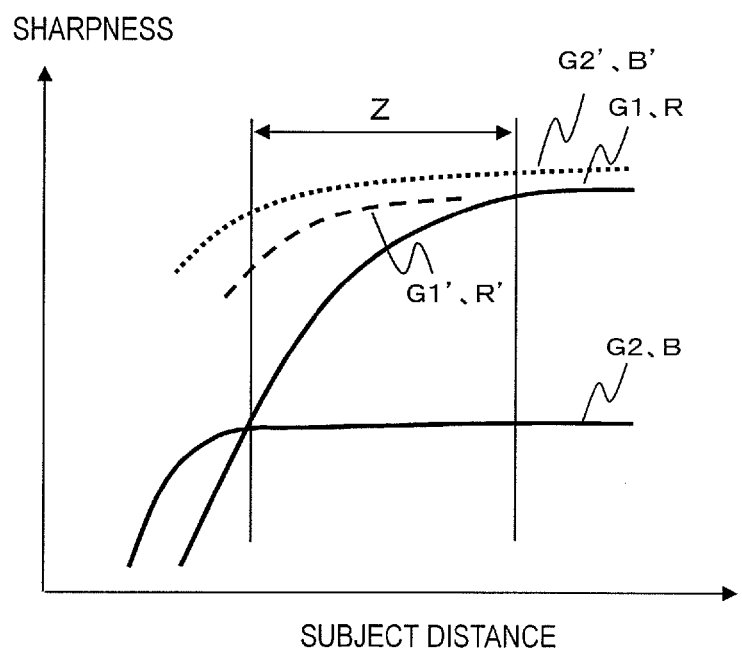
FIG. 42 is a graph showing the relationship between the subject distance and the sharpness (sharpness of the image) in Embodiment 7 according to the present invention.

Now, another technique for raising the sharpness of an image will be described. FIG. 42 shows a method for raising the sharpness G1, R based on the sharpness G2', B' obtained by raising the sharpness G2, B. The structure of the optical areas D1 and D2 is the same as in FIG. 39. The point spread function formed by the light rays which have passed the optical area D2 is approximately constant within a prescribed range of subject distance. Therefore, the point spread function formed by extracting the pixels P2 (G2 component) and the pixels P4 (B component) is approximately constant within a prescribed range of subject distance. When the point spread function is approximately constant within a prescribed range of subject distance, the image formed by extracting each of the pixels P2 (G2 component) and the pixels P4 (B component) can be recovered based on a prescribed point spread function regardless of the subject distance.

Hereinafter, a method for recovering a picked-up image based on the point spread function will be described. Where the original image is f(x,y) and the point spread function is h(x,y), the picked-up image g(x,y) can be represented by expression 23.

$$g(x,y) = f(x,y) \otimes h(x,y) \qquad \text{[Expression 23]}$$

($\otimes$ represents convolution.)

Expression 24 is obtained by Fourier transform performed on both sides of expression 23.

$$G(u,v) = F(u,v) H(u,v) \qquad \text{[Expression 24]}$$

By applying the inverse filter Hinv(u,v) of expression 25 to the deteriorated image G(u,v), the two-dimensional Fourier transform F(u,v) of the original image is found as in expression 26. By processing this by inverse Fourier transform, the original image f(x,y) can be obtained as the recovered image.

$$Hinv(u, v) = \frac{1}{H(u, v)} \qquad \text{[Expression 25]}$$

-continued $$F(u, v) = H_{inv}(u, v) G(u, v) \qquad \text{[Expression 26]}$$

However, when H(u,v) is 0 or an extremely small value, Hinv(u,v) is diverged. Therefore, the Wiener filter Hw(u,v) as in expression 27 is used to recover the deteriorated image.

$$Hw(u, v) = \frac{1}{H(u, v)} \frac{|H(u, v)|^2}{|H(u, v)|^2 + |N(u, v)|^2 / |F(u, v)|^2} \qquad \text{[Expression 27]}$$

In expression 27, N(u,v) is noise. Usually, the noise and the original image F(u,v) are unknown. Therefore, in actuality, constant k is used to recover the deteriorated image by the filter of expression 28.

$$Hw(u, v) = \frac{1}{H(u, v)} \frac{|H(u, v)|^2}{|H(u, v)|^2 + k} \qquad \text{[Expression 28]}$$

By use of such a recovery filter, the sharpness G2, B represented with the solid line in FIG. 42 can be raised to the sharpness G2', B' represented with the dotted line. In addition, the sharpness can be raised like in the method described with reference to FIG. 40 as follows. The luminance cross-sections G2' and B' are used to detect the respective sharpness. The luminance cross-section of a color component having a high sharpness is differentiated twice, and the resultant value is subtracted from G1, R. In this manner, the sharpness G1, R can be raised to the sharpness G11, R' represented with the dashed line in FIG. 42.

By the above-described image process, the sharpness G2, B and the sharpness G1, R represented with the solid lines in FIG. 42 are improved to the sharpness G2', B' represented with the dotted line and the sharpness G1', R'represented with the dashed line. Thus, the color image to be generated can be sharpened. Such a sharpening process can extend the depth of the subject as compared with the sharpening process shown in FIG. 39.

The optical system of the imaging apparatus in this embodiment may be an image-side telecentric optical system. Owing to this, even if the angle of view is changed, the principal light rays are incident on the optical array element K at an angle close to 0°. Therefore, the crosstalk among the light beams reaching the pixels P1, P2, P3 and P4 can be decreased over the entirety of the imaging area.

As described above, in this embodiment, the above description is given with an assumption that the lens L2 is an ideal lens for simplifying the explanation. It is not absolutely necessary to use the ideal lens. For example, a lens which is not an ideal lens has an axial color aberration. As described above, a color component having high sharpness may be selected to raise the sharpness of the other color components. Therefore, a sharp color image can be generated even if the lens is not an ideal lens. For finding the subject distance, the distance is found based on a single color component (green component in this embodiment). Therefore, the lens may have an axial color aberration.

In this embodiment, the optical element L1 and the lens L2 are separate from each other. Alternatively, the lens L2 may have the optical areas D1 and D2 so that the optical element L1 is removed. In this case, the stop S may be located in the vicinity of the optical areas D1 and D2 of the lens L2.

As described above, in this embodiment, both of a color image and the subject distance can be obtained by image capture performed by use of a single imaging system (e.g., by a single image capture). Since the subject distance can be calculated for each operation block, the subject distance from any position of the color image can be obtained. Therefore, a subject distance map of the entirety of the image can also be obtained. Since the distance to the subject can be obtained by a single imaging system, it is not necessary to match the characteristics or the positions of a plurality of imaging optical systems unlike in the case where an imaging apparatus including the plurality of imaging optical systems is used. When the imaging apparatus in this embodiment is used to pick up a moving image, even if the position of the subject is changed due to elapse of time, the distance to the subject can be accurately measured.

The refocusing can be carried out like in Embodiment 5 for each of the R, G and B components. Specifically, in step ST1 shown in FIG. 23, luminance information (sharpness, etc.) is found for each of the R, G and B components. When necessary, a color having a low sharpness among the R, G and B colors is sharpened. Next, in step ST2, the distance to the subject is found. The color image generated by the first signal processing section C1 is used to generate a depth map. Next, in step ST3, the PSF is generated for each subject position based on the best focus positions. In this step, one PSF may be generated for three colors of RGB. However, in consideration of the axial color aberration or the like, a PSF may be generated for each of the three RGB colors. Next, in step ST4, refocused image can be generated in a color at any subject position.

Embodiment 8

In Embodiment 8, unlike in Embodiment 7, the optical areas of the optical element L1 have different sizes, and the optical array element includes microlenses instead of a lenticular lens. Herein, the same contents as those of Embodiment 5 will not be described in detail.

Figure 43:
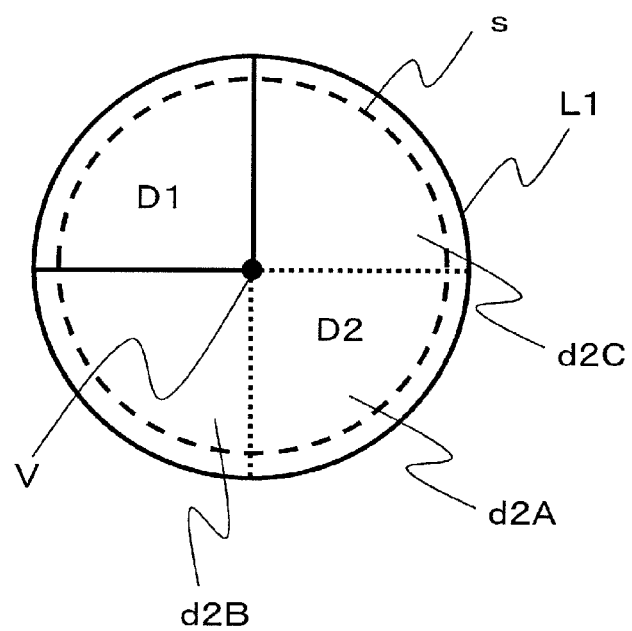
FIG. 43 is a front view of an optical element L1 in Embodiment 8 according to the present invention as seen from the side of a subject.

FIG. 43 is a front view of the optical element L1 as seen from the side of a subject. The optical element L1 is divided into optical areas D1 and D2. The optical area D2 is further divided into sub optical areas d2A, d2B and d2C. As shown in FIG. 43, the optical area D1 and the sub optical areas d2A, d2B and d2C are obtained by dividing a plane vertical to the optical axis V into four, namely, upper, lower, left and right areas along borders having the optical axis V as the center thereof. The optical areas D1 and D2 respectively have optical characteristics which provide different focusing characteristics from each other.

Figure 44:
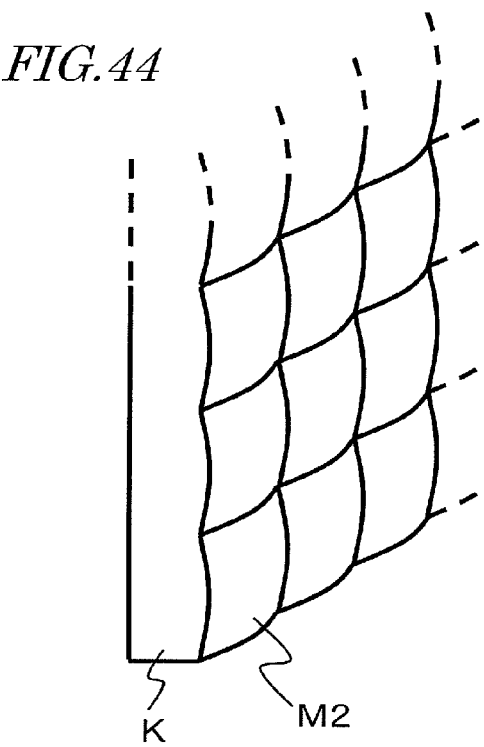
FIG. 44 is an isometric view of an optical array element K in Embodiment 8 according to the present invention.

FIG. 44 is an isometric view of the optical array element K. At a face of the optical array element K on the side of the imaging element N, optical components M2 are arrayed in a lattice. A cross-section of each optical component M2 (cross-section in each of the longitudinal direction and the lateral direction) has an arced shape, and the optical component M2 protrudes toward the imaging element N. As can be seen, the optical component M2 is a microlens, and the optical array element K is an microlens array.

FIG. 45A is an enlarged view of the optical array element K and the imaging element N. FIG. 45B shows the positional relationship between the optical array element K and the pixels of the imaging element N. Like in Embodiment 5, the optical array element K is located in the vicinity of the focal point of the lens optical system L, and at a position distanced from an imaging plane Ni by a prescribed distance. On the surface of the imaging plane Ni, microlenses Ms are provided so as to cover surfaces of the pixels P1, P2, P3 and P4.

The pixels P1, P2, P3 and P4 respectively include filters having the same spectral transmittance characteristics as those of the filters in Embodiment 7.

The optical array element K is located such that a face at which the optical components M2 are formed is directed toward the imaging plane Ni. The optical array element K is located such that one of the optical components M2 corresponds to four pixels P1 through P4 arrayed in two rows by two columns on the imaging plane Ni.

Owing to such a structure, the light beams which have passed the optical area D1 and the sub optical areas d2A, d2B and d2C on the optical element L1 shown in FIG. 43 mostly reach the pixels P1, P2, P3 and P4 on the imaging plane Ni, respectively.

Like in Embodiment 7, the first signal processing section C1 generates a color image by use of luminance information of the plurality of pixels P1, P2, P3 and P4. Hereinafter, a specific method for generating a color image will be described.

In FIG. 43, the optical area D1 has an aspheric shape, and the sub optical areas d2A, d2B and d2C all have a planar face. For simplifying the explanation, the following description will be given with an assumption that the lens L2 is an ideal lens with no aberration.

Owing to the aspheric shape of the optical area D1, like in Embodiment 5, the point spread function by the light rays which have passed the optical area D1 can be made approximately constant in a prescribed range in the vicinity of the focal point of the lens optical system L. Namely, the point spread function can be made approximately constant in a prescribed range of subject distance.

Since the optical area D2 has a planar face, like in Embodiment 7, no spherical aberration is caused. When there is no spherical aberration, the point spread function changes more in a direction shifted from the focal point. Namely, the point spread function changes in accordance with the change of the subject distance.

Figure 46:
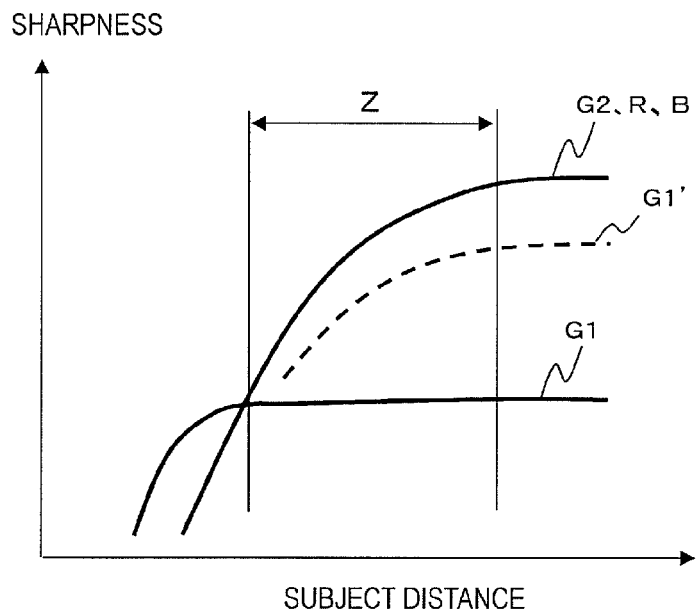
FIG. 46 is a graph showing the relationship between the subject distance and the sharpness (sharpness of the image) in Embodiment 8 according to the present invention.

Like in Embodiment 7, the relationship between the subject distance and the sharpness is as shown in FIG. 46. In the graph of FIG. 46, G1 represents the sharpness of a prescribed area of an image generated by the pixels P1 (green component), and G2, R and B each represent the sharpness of a prescribed area of an image generated by each of the pixels P2 (green component), the pixels P3 (red component) and the pixels P4 (blue component).

Like in Embodiment 7, a color image may be generated by simply complementing missing color information for each pixel position based on the luminance information of the pixels P1, P2, P3 and P4. Alternatively, the color image may be generated after the sharpness G1 is raised as in the method described with reference to FIG. 27 because the sharpness G1 is lower than the sharpness G2, R, B.

By the above-described image process, the sharpness G1 represented with the solid line in FIG. 46 can be raised to the sharpness G1' represented with the dashed line. Thus, the color image to be generated can be sharpened.

Figure 47:
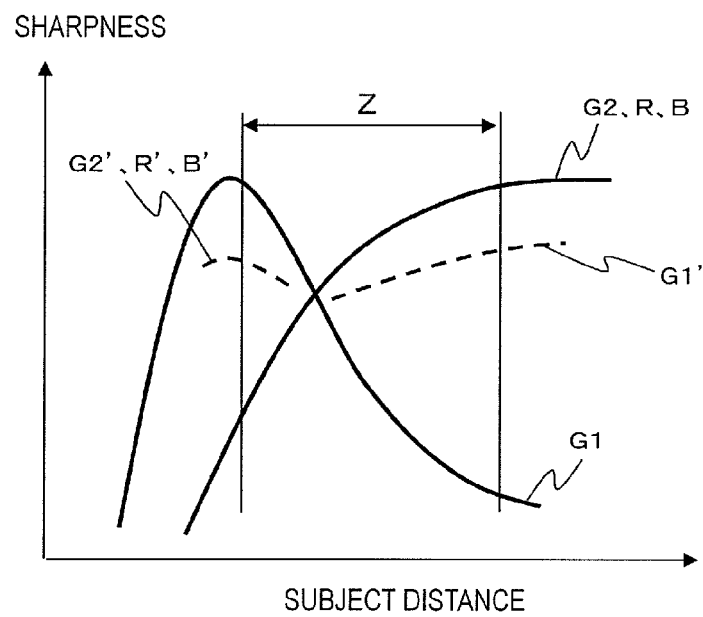
FIG. 47 is a graph showing the relationship between the subject distance and the sharpness (sharpness of the image) in Embodiment 8 according to the present invention.

FIG. 47 is a graph showing the relationship between the subject distance and the sharpness in the case where the optical face of the optical area D1 shown in FIG. 46 is changed from the aspheric shape to a spherical shape. Even in this case, like in the case of FIG. 46, the color image can be sharpened.

In this embodiment, as shown in FIG. 47, the color component having a high sharpness varies in accordance with the subject distance. Therefore, the luminance cross-sections G1, G2, R and B are used to detect the respective sharpness, and a color component having the highest sharpness is selected to sharpen the other color components.

By the above-described image process, the sharpness G1, G2, R, B represented with the solid lines in FIG. 47 can be raised to the sharpness G1', G2', R', B' represented with the dashed line. Thus, the color image to be generated can be sharpened.

Figure 48:
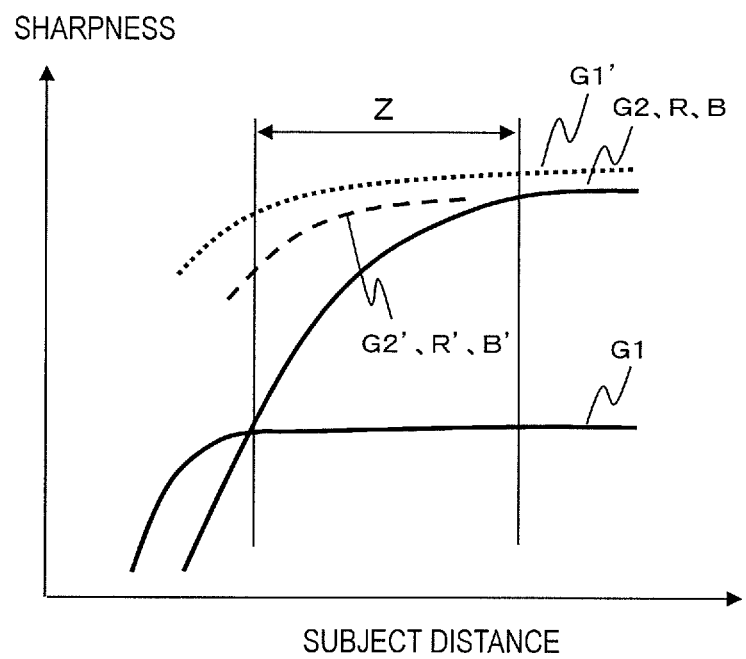
FIG. 48 is a graph showing the relationship between the subject distance and the sharpness (sharpness of the image) in Embodiment 8 according to the present invention.

Now, another technique for sharpening an image will be described. FIG. 48 shows a method for raising the sharpness G2, R, B based on the sharpness G1' obtained by raising the sharpness G1. The structure of the optical area D1 is the same as in FIG. 46. The point spread function formed by the light rays which have passed the optical area D1 is approximately constant within a prescribed range of subject distance. Therefore, the point spread function formed by extracting the pixels P1 (G1 component) is approximately constant within a prescribed range of subject distance. When the point spread function is approximately constant within a prescribed range of subject distance, the image formed by extracting the pixels P1 (G1 component) can be recovered based on a prescribed point spread function regardless of the subject distance.

By use of the recovery filter described in Embodiment 7, the sharpness G1 represented with the solid line in FIG. 48 can be raised to the sharpness G1' represented with the dotted line. Like in the method described with reference to FIG. 27, the luminance cross-section G1' is differentiated twice, and the resultant value is subtracted from G2, R, B. In this manner, the sharpness G2, R, B can be raised to the sharpness G2', R', B' represented with the dashed line in FIG. 48.

In this embodiment, the optical element L1 and the lens L2 are separate from each other. Alternatively, the lens L2 may have the optical areas D1 and D2 so that the optical element L1 is removed. In this case, the stop S may be located in the vicinity of the optical areas D1 and D2 of the lens L2.

As described above, in this embodiment, the above description is given with an assumption that the lens L2 is an ideal lens for simplifying the explanation. It is not absolutely necessary to use the ideal lens. For example, a lens which is not an ideal lens has an axial color aberration. The axial color aberration may be corrected by the optical element L1. In this embodiment, with reference to FIG. 43, the optical areas d2A, d2B and d2C of the optical element L1 all have a planar face. Alternatively, the optical areas d2A, d2B and d2C may have different optical faces, so that the axial color aberration can be corrected. As described above, the light rays which have passed the sub optical areas d2A, d2B and d2C respectively reach the pixels P2, the pixels P3 and the pixels P4. The pixels P2, the pixels P3 and the pixels P4 respectively include filters for mainly transmitting light of wavelength components of green, red and blue. Therefore, when a lens having an axial color aberration is used as the lens L2, the faces of the sub optical areas d2A, d2B and d2C may have different levels of optical power from one another such that light components of light transmission wavelength ranges of the filters provided in the pixels have the same focus position. Owing to such a structure, as compared with the case where the sub optical areas d2A, d2B and d2C have an equal level of optical power, the focus positions of the light components which have passed the sub optical areas d2A, d2B and d2C can be made closer to one another. Therefore, the axial color aberration caused by the lens L2 can be corrected by the optical element L1. By correcting the axial color aberration by the optical element L1, the number of lenses included in the lens L2 can be decreased, which can reduce the size of the optical system.

Owing to the above-described structure, the sharpness G1 and the sharpness G2, R, B represented with the solid lines in FIG. 48 can be raised to the sharpness G1' represented with the dotted line and the sharpness G2', R', B' represented with the dashed line. Thus, the color image to be generated can be sharpened. Such a sharpening process can extend the depth of the subject as compared with the sharpening process shown in FIG. 46.

In this embodiment, the relationship between the sharpness G1 and the sharpness G2 are merely opposite to that of Embodiment 7. The method for measuring the distance to the subject can be carried out in substantially the same manner. The method for obtaining a refocused image can be carried out in substantially the same manner as in Embodiment 7.

As described above, in this embodiment, like in Embodiment 7, both of a color image and the subject distance can be obtained by image capture performed by use of a single imaging system (e.g., by a single image capture), and also a refocused image can be generated.

Other Embodiments

In Embodiments 1 through 8, the optical areas are located on a face of the optical element L1 on the side of the subject. Alternatively, the optical areas may be located on a face of the optical element L1 on the side of the image.

The lens L2 is formed of one lens, but may be formed of a plurality groups of lenses or a plurality of lenses.

The plurality of optical areas may be formed on the lens L2 located in the vicinity of the stop.

The optical element L1 is located on the side of the subject with respect to the position of the stop. Alternatively, the optical element L1 may be located on the side of the image with respect to the position of the stop.

In Embodiments 1 through 8, the lens optical system L is an image-side telecentric optical system. Alternatively, lens optical system L may be an image-side non-telecentric optical system. FIG. 49A is an enlarged view of an image capture section and the vicinity thereof. In FIG. 49A, only the light beam passing one optical area, among the light passing the optical array element K, is shown. As shown in FIG. 49A, in the case where the lens local system L is a non-telecentric optical system, crosstalk easily occurs due to leak of light to an adjacent pixel. By offsetting the optical array element by Δ with respect to the pixel array as shown in FIG. 49B, the crosstalk can be reduced. The angle of incidence of the light beam varies in accordance with the image height. Therefore, the offset amount Δ may be set in accordance with the angle of incidence of the light beam on the imaging plane.

In Embodiments 1 through 8, the imaging apparatus includes the first signal processing section C1, the second processing section C2, the third processing section C3, and the storage section Me (shown in FIG. 1, etc.). The imaging apparatus does not need to include these signal processing sections and the storage section. In such a case, a PC or the like outside the imaging apparatus may perform the processes which are to be performed by the first signal processing section C1, the second processing section C2 and the third processing section C3. Namely, a system including the imaging apparatus including the lens optical system L, the optical array element K and the imaging element N, and an external signal processing device may be realized. Such an imaging apparatus in this form can obtain luminance information for outputting a multiple color image and measuring the subject distance by a single image capture performed by use of a single imaging optical system. The process performed by the external signal processing section by use of the luminance information can obtain both of the multiple color image and the subject distance.

The method for measuring the distance in these embodiments does not need to use the correlation between the sharpness and the subject distance. For example, to an expression representing the relationship between the sharpness, contrast or diameter of the point image and the subject distance, the obtained sharpness, contrast or the diameter of the point image may be substituted to obtain the subject distance.

In Embodiments 2 and 4, the optical components of the microlens array (microlenses) may each have a rotationally symmetric shape with respect to the optical axis of the respective optical component (microlens). Hereinafter, such a microlens will be described in comparison with a microlens having a rotationally asymmetric shape with respect to the optical axis thereof.

FIG. 50(a1) is an isometric view of an array of microlenses having a rotationally asymmetric shape with respect to the optical axis thereof. Such an array of microlenses is formed as follows. A quadrangular prism-shaped resist is formed on an array and thermally treated to round the corners of the resist, and then the resist is used for patterning. A contour line of each microlens shown in FIG. 50(a1) is shown in FIG. 50(a2). In the microlens having a rotationally asymmetric shape, the radius of curvature in the longitudinal and lateral directions (directions parallel to the four sides of the bottom surface of the microlens) is different from the radius of curvature in oblique directions (directions of diagonal lines of the bottom surface of the microlens).

FIG. 50(a3) shows results of light ray tracing simulation when the microlens shown in FIGS. 50(a1) and 50(a2) is applied to the optical array element in the embodiments. In FIG. 50(a3), only the light beam passing one optical area, among the light passing the optical array element K, is shown. As can be seen, in the case of the microlens having a rotationally asymmetric shape, light leaks to an adjacent pixel to cause crosstalk.

FIG. 50(b1) is an isometric view of an array of microlenses having a rotationally symmetric shape with respect to the optical axis thereof. Such a microlens having a rotationally symmetric shape can be formed on a glass plate or the like by thermal imprint or UV imprint.

A contour line of each microlens having a rotationally symmetric shape is shown in FIG. 50(b2). In the microlens having a rotationally symmetric shape, the radius of curvature is equal in the longitudinal and lateral directions and in oblique directions.

FIG. 50(a3) shows results of light ray tracing simulation when the microlens shown in FIGS. 50(b1) and 50(b2) is applied to the optical array element in the embodiments. In FIG. 50(b3), only the light beam passing one optical area, among the light passing the optical array element K, is shown. It is seen that crosstalk as in FIG. 50(a3) is not caused. In this manner, use of the microlenses having a rotationally symmetric shape can reduce the crosstalk, and therefore can suppress precision deterioration in the distance measuring operation.

Figure 51A:
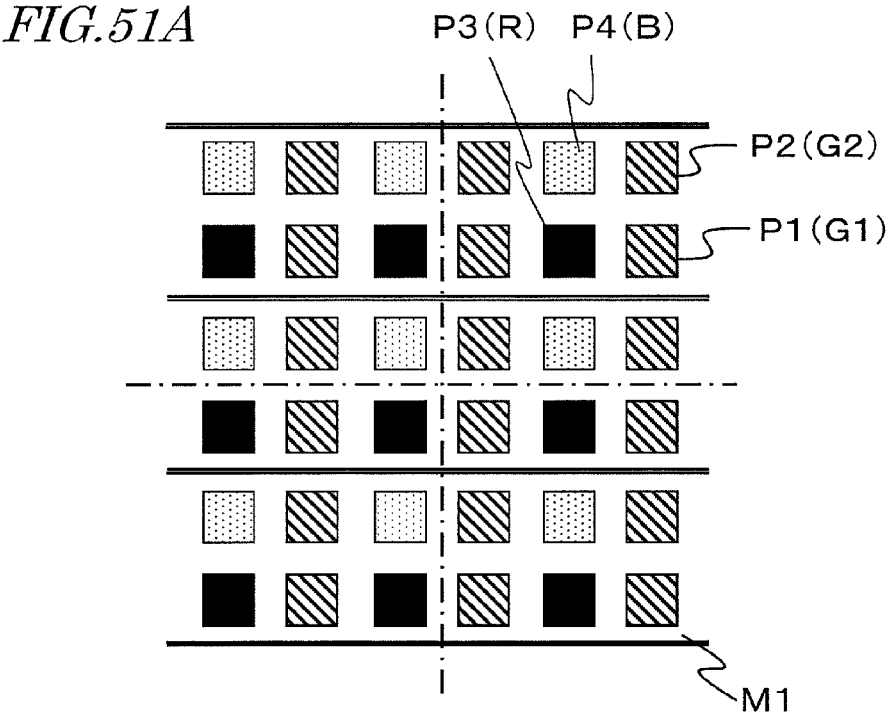
FIGS. 51A and 51B each show an arrangement of filters on the imaging element in other embodiments according to the present invention.
Figure 51B:
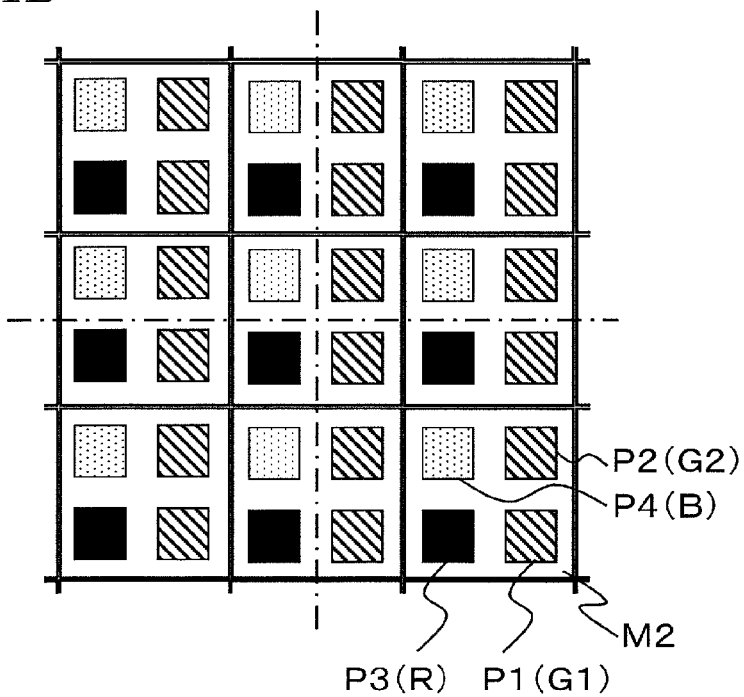

In Embodiments 1 through 8, the first pixel and the second pixel are adjacent to each other in an oblique direction. As shown in FIG. 51A or FIG. 51B, the first pixel and the second pixel may be adjacent to each other in the up-down direction (or left-right direction depending on the relationship with the optical elements L1).

The imaging apparatus disclosed in the present application is useful as an imaging apparatus of a digital still camera, a digital video camera or the like. The imaging apparatus disclosed in the present application is also applicable to a distance measuring device for monitoring the environment or the crew of an automobile, and a distance measuring device for three-dimensional information input in a game, a PC, a mobile terminal, an endoscope or the like.

What is claimed is:

1. An imaging apparatus, comprising:
a lens optical system including a first area and a second area, the second area having an optical characteristic which provides a focusing characteristic different from the focusing characteristic by light rays which have passed the first area;
an imaging element including a plurality of pixel groups, wherein each pixel group comprises: a first pixel and a second pixel on which light which has passed the lens optical system is incident and which includes a filter having a first spectral transmittance characteristic, a third pixel on which light which has passed the lens optical system is incident and which include a filter having a second spectral transmittance characteristic different from the first spectral transmittance characteristic, and a fourth pixel on which light which has passed the lens optical system is incident and which include a filter having a third spectral transmittance characteristic different from the first spectral transmittance characteristic and the second spectral transmittance characteristic, wherein pixels forming each of the plurality of pixel groups are neighboring pixels; and
an optical array element located between the lens optical system and the imaging element, the optical array element causing the light which has passed the first area to be incident on the plurality of first pixels and causing the light which has passed the second area to be incident on the plurality of second pixels, the optical array element having a plurality of lenses, each of the plurality of lenses cover at least:
(a) one of the plurality of first pixels,
(b) one of the plurality of second pixels,
(c) one of the plurality of third pixels, and
d) one of the plurality of fourth pixels,
wherein the optical array element causes the light which has passed one of the first area and the second area to be incident on the plurality of third pixels, and causes the light which has passed one of the first area and the second area to be incident on the plurality of fourth pixels;
wherein the optical array element causes only the light which has passed one of the first area and the second area to be incident on the plurality of third pixels, and causes only the light which has passed one of the first area and the second area to be incident on the plurality of fourth pixels.

2. The imaging apparatus of claim 1, wherein:
the optical array element is a lenticular lens; and
the optical array element causes the light which has passed one of the first area and the second area to be incident on the plurality of third pixels, and causes the light which has passed the other of the first area and the second area to be incident on the plurality of fourth pixels.

3. The imaging apparatus of claim 1, wherein:
the optical array element is a microlens array; and
the optical array element causes the light which has passed one of the first area and the second area to be incident on the plurality of third pixels and the plurality of fourth pixels.

4. An imaging apparatus, comprising:
a lens optical system including a first area and a second area, the second area having an optical characteristic which provides a focusing characteristic different from the focusing characteristic by light rays which have passed the first area;
an imaging element including a plurality of pixel groups, wherein each pixel group comprises: a first pixel and a second pixel on which light which has passed the lens optical system is incident and which includes a filter having a first spectral transmittance characteristic, a third pixel on which light which has passed the lens optical system is incident and which include a filter having a second spectral transmittance characteristic different from the first spectral transmittance characteristic, and a fourth pixel on which the light which has passed the lens optical system is incident and which include a filter having a third spectral transmittance characteristic different from the first spectral transmittance characteristic and the second spectral transmittance characteristic, wherein pixels forming each of the plurality of pixel groups are neighboring pixels; and
an optical array element located between the lens optical system and the imaging element, the optical array element causing the light which has passed the first area to be incident on the plurality of first pixels and causing the light which has passed the second area to be incident on the plurality of second pixels, the optical array element having a plurality of lenses, each of the plurality of lenses covers at least:
(a) one of the plurality of first pixels,
(b) one of the plurality of second pixels,
(c) one of the plurality of third pixels and
(d) one of the plurality of fourth pixels,
wherein in a pixel group including one of the plurality of first pixels, one of the plurality of second pixels, one of the plurality of third pixels and one of the plurality of fourth pixels which are arrayed in two rows by two columns, the first pixel and the second pixel are respectively located at positions of (1,1) and (2,2) or (2,2) and (1,1) or are respectively located at positions of (1,2) and (2,1) or (2,1) and (1,2);
wherein the optical array element causes only the light which has passed one of the first area and the second area to be incident on the plurality of third pixels, and causes only the light which has passed one of the first area and the second area to be incident on the plurality of fourth pixels.

5. The imaging apparatus of claim 1, wherein light rays are incident on the first area and the second area in a single image capture.

6. The imaging apparatus of claim 1, wherein the filter having the first spectral transmittance characteristic transmits light rays in a green range, the filter having the second spectral transmittance characteristic transmits light rays in a blue range, and the filter having the third spectral transmittance characteristic transmits light rays in a red range.

7. The imaging apparatus of claim 1, wherein when a subject distance is within a prescribed range, a point spread function formed by the light incident on the first area is approximately constant, and a point spread function formed by the light incident on the second area varies in accordance with the subject distance.

8. The imaging apparatus of claim 1, wherein a surface of the first area and a surface of the second area have different radii of curvature from each other.

9. The imaging apparatus of claim 1, wherein:
the plurality of first, second, third and fourth pixels respectively generate first through fourth luminance information by a single image capture; and the imaging apparatus further includes a first signal processing section for generating a color image by use of the first through fourth luminance information.

10. The imaging apparatus of claim 9, wherein:
the first signal processing section includes a sharpness detection section for detecting a sharpness of the luminance information of at least one pixel component among the luminance information of the plurality of first through fourth pixels for each of prescribed areas in the color image; and
based on the pixel component having a highest sharpness among the pixel components, the first signal processing section sharpens a luminance information of the other pixel components.

11. The imaging apparatus of claim 9, wherein the first signal processing section performs a recovery process on an image formed by luminance information of the pixel reached by the light incident on the first area, by use of a pre-stored point spread function, to generate a recovered sharpened image.

12. The imaging apparatus of claim 11, wherein the first signal processing section performs a recovery process on an entire area of the image formed by the luminance information of the pixel reached by the light incident on the first area, by use of a single point spread function of the point spread function, to generate a recovered sharpened image.

13. The imaging apparatus of claim 12, wherein:
the first signal processing section includes a sharpness detection section for detecting a sharpness for each of the prescribed areas in the recovered sharpened image; and
based on the sharpness of each of the prescribed areas in the recovered sharpened image, the first signal processing section sharpens a luminance information of the other pixel components.

14. The imaging apparatus of claim 9, further comprising a second signal processing section for calculating the subject distance; wherein:
the first signal processing section generates a first image obtained by the plurality of first pixels and a second image obtained by the plurality of second pixels; and
the second signal processing section calculates the subject distance by use of the first image and the second image.

15. The imaging apparatus of claim 14, wherein:
when the subject distance is within a prescribed range, a ratio between a sharpness of the first image and a sharpness of the second image has a correlation with the subject distance; and
the second signal processing section calculates the subject distance based on the correlation and the ratio between the sharpness of the first image and the sharpness of the second image.

16. The imaging apparatus of claim 14, wherein:
the first signal processing section includes a contrast detection section for detecting a contrast of the first image obtained by the plurality of first pixels and a contrast of the second image obtained by the plurality of second pixels;
when the subject distance is within a prescribed range, a ratio between the contrast of the first image and the contrast of the second image has a correlation with the subject distance; and
the second signal processing section calculates the subject distance based on the correlation and the ratio between the contrast of the first image and the contrast of the second image.

17. The imaging apparatus of claim 13, wherein:
when the subject distance is within a prescribed range, a point spread function derived from the recovered sharpened image and an image formed by the light incident on the second area has a correlation with the subject distance; and
the second signal processing section calculates the subject distance based on the correlation and the point spread function.

18. The imaging apparatus of claim 1, wherein:
the lens optical system further includes a stop; and
the first area and the second area are located at the stop.

19. The imaging apparatus of claim 1, wherein in a pixel group including one of the plurality of first pixels, one of the plurality of second pixels, one of the plurality of third pixels and one of the plurality of fourth pixels which are arrayed in two rows by two columns, the first pixel and the second pixel are adjacent to each other in any one of an up-down direction, a left-right direction and an oblique direction on an imaging plane of the imaging element.

20. The imaging apparatus of claim 14, wherein:
the second signal processing section calculates the subject distance for each of the prescribed areas of the color image; and
the imaging apparatus further comprises a third signal processing section for generating a refocused image by use of the subject distance of each of the prescribed areas calculated by the second signal processing section.

21. An imaging system, comprising:
the imaging apparatus of claim 1; and
a first signal processing device for generating a color image;
wherein the first signal processing device generates the color image by use of luminance information of the plurality of first pixels, the plurality of second pixels, the plurality of third pixels and the plurality of fourth pixels obtained by the single image capture.

* * * * *